US012763391B2

(12) United States Patent
Haardt et al.

(10) Patent No.: US 12,763,391 B2
(45) Date of Patent: Oct. 13, 2026

(54) METHOD FOR OPERATING PRODUCTION PLANTS BASED ON RECYCLED MATERIAL

(71) Applicant: BASF SE, Ludwigshafen am Rhein (DE)

(72) Inventors: Dennis Haardt, Ludwigshafen am Rhein (DE); Henning Schwabe, Ludwigshafen am Rhein (DE); Uwe Wolf, Ludwigshafen am Rhein (DE); Henrik Faelsch, Ludwigshafen am Rhein (DE); Yannick Karsten Pinger, Ludwigshafen am Rhein (DE); Martin Binder, Ludwigshafen am Rhein (DE); Gabriele Eckardt, Ludwigshafen am Rhein (DE); Adrian Von Muehlenen, Zofingen (CH); Holger Kai Peter Jelich, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 18/848,393

(22) PCT Filed: Mar. 17, 2023

(86) PCT No.: PCT/EP2023/056905
§ 371 (c)(1),
(2) Date: Sep. 18, 2024

(87) PCT Pub. No.: WO2023/175151
PCT Pub. Date: Sep. 21, 2023

(65) Prior Publication Data

US 2025/0209428 A1 Jun. 26, 2025

(30) Foreign Application Priority Data

Mar. 18, 2022 (EP) .................................... 22162950
Mar. 18, 2022 (EP) .................................... 22162951
(Continued)

(51) Int. Cl.
*H01M 10/54* (2006.01)
*G05B 15/02* (2006.01)
(Continued)

(52) U.S. Cl.
CPC ............ *H01M 10/54* (2013.01); *G05B 15/02* (2013.01); *G05B 19/4183* (2013.01);
(Continued)

(58) Field of Classification Search
CPC ... H01M 10/54; G05B 15/02; G05B 19/4183; G06Q 10/0631; G06Q 10/0639;
(Continued)

(56) References Cited

U.S. PATENT DOCUMENTS

2011/0225098 A1 9/2011 Wolff et al.
2013/0063073 A1 3/2013 Kawasaki et al.
(Continued)

FOREIGN PATENT DOCUMENTS

WO 2013/184217 A1 12/2013
WO 2020/069882 A1 4/2020
(Continued)

OTHER PUBLICATIONS

European Search Report for EP Patent Application No. 22162950.4, issued on Jul. 25, 2022, 3 pages.
(Continued)

*Primary Examiner* — Jeffrey D Carlson
(74) *Attorney, Agent, or Firm* — ArentFox Schiff LLP

(57) ABSTRACT

Disclosed is a computer-implemented method for providing plant assignment data usable for processing recycled material, the method comprising the steps of:
(Continued)

providing one or more recycled material identifier(s) and corresponding recycled material data associated with the recycled material;
determining at least one plant identifier associated with a plant for processing the recycled material as provided by recycled material data;
providing plant assignment data comprising the at least one plant identifier and related recycled material identifier(s).

17 Claims, 21 Drawing Sheets

(30) Foreign Application Priority Data

Mar. 18, 2022 (EP) .................................... 22162988
Mar. 18, 2022 (EP) .................................... 22163003
Mar. 18, 2022 (EP) .................................... 22163004
Mar. 18, 2022 (EP) .................................... 22163005
Apr. 12, 2022 (EP) .................................... 22167945

(51) Int. Cl.
*G05B 19/418* (2006.01)
*G06Q 10/0631* (2023.01)
*G06Q 10/0639* (2023.01)
*G06Q 10/30* (2023.01)

(52) U.S. Cl.
CPC ..... *G06Q 10/0631* (2013.01); *G06Q 10/0639* (2013.01); *G06Q 10/30* (2013.01)

(58) Field of Classification Search
CPC ........ G06Q 10/30; G06Q 50/04; G06Q 50/10; Y02W 30/84
See application file for complete search history.

(56) References Cited

U.S. PATENT DOCUMENTS

2014/0106185 A1 4/2014 Kruglick
2016/0371658 A1 12/2016 Borges et al.
2018/0264347 A1 9/2018 Tran et al.
2022/0085424 A1* 3/2022 Searl ..................... H01M 10/54

FOREIGN PATENT DOCUMENTS

WO 2021/198637 A1 10/2021
WO 2021/244963 A1 12/2021

OTHER PUBLICATIONS

European Search Report for EP Patent Application No. 22162951.2, issued on Jul. 25, 2022, 3 pages.
European Search Report for EP Patent Application No. 22162988.4, issued on Jul. 22, 2022, 3 pages.
European Search Report for EP Patent Application No. 22163003.1, issued on Jul. 22, 2022, 3 pages.
European Search Report for EP Patent Application No. 22163004.9, issued on Aug. 5, 2022, 3 pages.
European Search Report for EP Patent Application No. 22163005.6, issued on Jul. 26, 2022, 3 pages.
European Search Report for EP Patent Application No. 22167945.9, issued on Sep. 7, 2022, 3 pages.
International Search Report for PCT Patent Application No. PCT/EP2023/056905, issued on May 25, 2023, 3 pages.
Tewfik, et al., “New Baseline document for draft Recommendation ITU-T L.SM_B “Sustainable Management of Batteries”—Input of Q7 /5 e-meeting to be held on Jul. 15, 2021”, International Telecommunication Union, Study Group 5, Jul. 15, 2021, pp. 1-48.

* cited by examiner

Material packets classified by material configuration

New material produced from recycled material packets

METHOD FOR OPERATING PRODUCTION PLANTS BASED ON RECYCLED MATERIAL

CROSS-REFERENCE TO RELATED APPLICATIONS

The present application is a national stage application filed under 35 U.S.C. 371 based on International Patent Application No. PCT/EP2023/056905, filed Mar. 17, 2023, which claims priority to EP patent application Ser. No. 22/162,950.4, filed Mar. 18, 2022, EP patent application Ser. No. 22/162,951.2, filed Mar. 18, 2022, EP patent application Ser. No. 22/162,988.4, filed Mar. 18, 2022, EP patent application Ser. No. 22/163,003.1, filed Mar. 18, 2022, EP patent application Ser. No. 22/163,004.9, filed Mar. 18, 2022, EP patent application Ser. No. 22/163,005.6, filed Mar. 18, 2022 and EP patent application Ser. No. 22/167,945.9, filed Apr. 12, 2022 the disclosures of each of which are hereby incorporated by reference in their entireties.

TECHNICAL FIELD

The present disclosure relates to a computer-implemented method for providing plant assignment data usable for processing recycled material, and respective systems, apparatuses, uses or computer elements.

TECHNICAL BACKGROUND

The general background of this disclosure concerns the processing of recycled materials. The processing of recycled materials is highly decentral, i.e. normally plants which are able to process recycled materials are spatially distributed to many different places. This makes operating recycling processes cumbersome. Hence, there is a need to operate the recycling processes in a more reliable and flexible way. U.S. Pat. No. 20,163,71658 discloses (i) identifying, using a mobile device, a recyclable material based on a detected oscillation frequency of an oscillator associated with the recyclable material; and (iii) creating, by the controller, scheduling instructions for the identified recyclable material. WO2013184217 discloses methods, systems, and apparatuses for receiving a first plurality of product identifiers associated with products purchased by a consumer to form a purchase record. A second plurality of product identifiers associated with products recycled by the consumer is received. A record of recycled purchased products by the consumer is authenticated. U.S. Pat. No. 20,141,06185 discloses that a rechargeable battery may be recycled through a cycle that includes one or more of determining a battery condition while the rechargeable battery may be used in a networkable device, updating a rechargeable battery database with the battery condition over a network, determining recycling instructions, and outputting the recycling instructions on the networkable device.

SUMMARY OF THE INVENTION

Disclosed is a computer-implemented method for providing plant assignment data usable for processing recycled material, the method comprising the steps of:

- providing one or more recycled material identifier(s) and corresponding recycled material data associated with the recycled material;
- determining at least one plant identifier associated with a plant for processing the recycled material as provided by recycled material data;
- providing plant assignment data comprising the at least one plant identifier and related recycled material identifier(s).

Disclosed is a computer-implemented method for providing plant assignment data usable for processing recycled material or for operating a recycling process, preferably for processing recycled material, the method comprising the steps of:

- providing one or more recycled material identifier(s) and corresponding recycled material data associated with the recycled material;
- determining at least one plant identifier associated with a plant for processing the recycled material as provided by recycled material data;
- providing plant assignment data comprising the at least one plant identifier and related recycled material identifier(s).

Disclosed is a computer-implemented method for operating a recycling process, preferably for processing recycled material, the method comprising the steps of:

- providing one or more recycled material identifier(s) and corresponding recycled material data associated with the recycled material, wherein the recycled material data associated with the recycled material is provided by a decentral computing node associated with one or more recycling system(s), optionally wherein the recycled material data associated with the recycled material is accessed by a decentral computing node associated with one or more plant(s) and/or one or more recycling system(s),
- determining at least one plant identifier associated with a plant for processing the recycled material as provided by recycled material data;
- providing plant assignment data comprising the at least one plant identifier and related recycled material identifier(s),
- operating the recycling process by providing plant assignment data for controlling and/or monitoring one or more plant(s).

Disclosed is a computer-implemented method for operating a recycling process, preferably for processing recycled material, the method comprising the steps of:

- providing one or more recycled material identifier(s) and corresponding recycled material data associated with the recycled material;
- determining at least one plant identifier associated with a plant for processing the recycled material as provided by recycled material data;
- providing plant assignment data comprising the at least one plant identifier and related recycled material identifier(s),
- operating the recycling process by providing plant assignment data for controlling and/or monitoring one or more plant(s).

Disclosed is a computer-implemented method for operating a recycling process, preferably for processing recycled material, the method comprising the steps of:

- providing one or more recycled material identifier(s) and corresponding recycled material data associated with the recycled material;
- determining plant assignment data by relating at least one plant identifier associated with a plant for processing the recycled material via the provided recycled material data to one or more recycled material identifier(s);
- operating the recycling process by providing plant assignment data for controlling and/or monitoring one or more plant(s).

Disclosed is an apparatus for providing plant assignment data usable for processing recycled material, preferably for processing recycled material, the apparatus comprising: one or more computing nodes; and one or more computer-readable media having thereon computer-executable instructions that are structured such that, when executed by the one or more computing nodes, cause the apparatus to perform the following steps:

providing one or more recycled material identifier(s) and corresponding recycled material data associated with the recycled material;

determining at least one plant identifier associated with a plant for processing the recycled material as provided by recycled material data;

providing plant assignment data comprising the at least one plant identifier and related recycled material identifier(s).

Disclosed is an apparatus for operating a recycling process, preferably for processing recycled material, the apparatus comprising: one or more computing nodes; and one or more computer-readable media having thereon computer-executable instructions that are structured such that, when executed by the one or more computing nodes, cause the apparatus to perform the following steps:

providing one or more recycled material identifier(s) and corresponding recycled material data associated with the recycled material;

determining at least one plant identifier associated with a plant for processing the recycled material as provided by recycled material data;

providing plant assignment data comprising the at least one plant identifier and related recycled material identifier(s).

Disclosed is an apparatus for operating a recycling process, preferably for processing recycled material, the apparatus comprising: one or more computing nodes; and one or more computer-readable media having thereon computer-executable instructions that are structured such that, when executed by the one or more computing nodes, cause the apparatus to perform the following steps:

providing one or more recycled material identifier(s) and corresponding recycled material data associated with the recycled material, wherein the recycled material data associated with the recycled material is provided by a decentral computing node associated with one or more recycling system(s), optionally wherein the recycled material data associated with the recycled material is accessed by a decentral computing node associated with one or more plant(s) and/or one or more recycling system(s), determining at least one plant identifier associated with a plant for processing the recycled material as provided by recycled material data;

providing plant assignment data comprising the at least one plant identifier and related recycled material identifier(s), operating the recycling process by providing plant assignment data for controlling and/or monitoring one or more plant(s).

Disclosed is an apparatus for operating a recycling process, preferably for processing recycled material, preferably for processing recycled material, the apparatus comprising: one or more computing nodes; and one or more computer-readable media having thereon computer-executable instructions that are structured such that, when executed by the one or more computing nodes, cause the apparatus to perform the following steps:

providing one or more recycled material identifier(s) and corresponding recycled material data associated with the recycled material;

determining at least one plant identifier associated with a plant for processing the recycled material as provided by recycled material data;

providing plant assignment data comprising the at least one plant identifier and related recycled material identifier(s), operating the recycling process by providing plant assignment data for controlling and/or monitoring one or more plant(s).

Disclosed is an apparatus for operating a recycling process, preferably for processing recycled material, preferably for processing recycled material, the apparatus comprising: one or more computing nodes; and one or more computer-readable media having thereon computer-executable instructions that are structured such that, when executed by the one or more computing nodes, cause the apparatus to perform the following steps:

providing one or more recycled material identifier(s) and corresponding recycled material data associated with the recycled material;

determining plant assignment data by relating at least one plant identifier associated with a plant for processing the recycled material via the provided recycled material data to one or more recycled material identifier(s);

operating the recycling process by providing plant assignment data for controlling and/or monitoring one or more plant(s).

Further disclosed is the use of recycled material associated with a recycled material identifier in any of the methods disclosed herein or with any of the apparatuses disclosed herein. Further disclosed is a method for using recycled material associated with a recycled material identifier, the method comprising the steps of: providing the recycled material identifier associated with recycled material and providing plant assignment data as provided according to any of the methods disclosed herein or by any of the apparatuses disclosed herein.

Further disclosed is the use of the plant assignment data as provided according to any of the methods disclosed herein or by any of the apparatuses disclosed herein to transport, store and/or recycle recycled material provided by recycling at least one component of a product. Further disclosed is a method for transporting, storing and/or recycling recycled material provided by recycling at least one component of a product, the method comprising the steps of: providing plant assignment data as provided according to any of the methods disclosed herein or by any of the apparatuses disclosed herein, generating transport, storing and/or recycling instructions based on the plant assignment data and providing the transport, storing and/or recycling instructions.

Further disclosed is a method for transporting, storing and/or recycling material provided by recycling at least one component of a product, the method comprising the steps: providing plant assignment data generated according to any of the methods or by any of the apparatuses disclosed herein; generating transport, storing and/or recycling instructions based on the provided plant assignment data and providing transport, storing and/or recycling instructions.

Further disclosed is an apparatus for transporting, storing and/or recycling product material provided by recycling at least one component of a product, the apparatus comprising: one or more computing nodes; and one or more computer-readable media having thereon computer-executable instructions that are structured such that, when executed by the one or more computing nodes, cause the apparatus to perform the following steps: providing plant assignment data generated according to any of the methods or by any of the apparatuses disclosed herein; generating transport, storing and/or recycling instructions based on the provided plant assignment data and providing transport, storing and/or recycling instructions.

Further disclosed is a computer element, such as a computer program or a computer readable storage medium, with instructions, which, when executed by one or more computing node(s) of a computing environment, are configured to carry out steps of any of the methods disclosed herein and/or as provided by any of the apparatuses disclosed herein.

Any disclosure and embodiments described herein relate to methods, systems, uses, apparatuses and computer elements disclosed herein and vice versa. Benefits provided by any of the embodiments and examples provided herein equally apply to all other embodiments and examples and vice versa.

Advantageously the disclosure referred to herein provides an efficient, sustainable and robust way for operating recycling processes. By virtually sorting and/or gathering the recycled material and by virtually assigning the recycled material to specific plants, the operation of the recycling process can be simplified. Allocating recycled material based on the material data to specific plants specialized or able to process the recycled material reduces the operation burden of the plants, since the recycled material may be assigned to the plant capable of processing the material composition of the recycled material. By merging provided recycled material identifier data and plant identifier data, plant assignment data can be provided for indicating where or at which specific plant or plurality of plants an effective processing of the recycled material can be ensured. Therefore, it is possible to efficiently allocate recycled material to plants in order to produce recycled material or recyclate and manufacture new products from such recycled material or recyclate. Through tracking the material packets via the identity-based data footprint in a decentralized platform assigning certain recycled material or recyclate stream tailored to certain plants is simpler and leads to more control over output products produced based on the recyclate. Furthermore, the recycling or production processes can be tailored to certain compositions depending on purity or quality. By tracking and assigning the recycled material the quality of output product based on recycled material can be increased.

It is an object of the present invention to provide an efficient, sustainable and robust way for allocating recycled material based on the material data to plants specialized or suitable to process the recycled material. These and other objects, which become apparent upon the following description, are solved by the subject matters of the independent claims. The dependent claims refer to preferred embodiments of the invention.

Product may denote any end product that contains materials to be recycled. A least one component of the product to be recycled may include a single component or multiple components of a single product type or multiple product types. A least one product or component of the product to be recycled may include multiple products or components of products. The at least one component of the product may include any component, any combination of components or one or more product(s) with one, more or all components.

Recycling of materials contained in products may include materials from any recycling step from end of life of the product to any recyclate usable to produce new products. The new product produced from recyclate may be different product type than the end product to be recycled. In other words, the new product produced from the recycled material may be a different product than the product to be recycled from which the recycling material or recyclate is produced. Recycling steps may include collecting, dismantling, sorting, mechanical treatment, chemical treatment, thermal treatment or any other steps for transforming used material into recycled raw materials. Recycling of materials contained in products may include the recycling of one or more component(s) of the product. Recycling of materials contained in products may include one or more recycling process(es) for transforming used material into recycled raw materials. The recycled raw materials may be used for producing new materials. The new materials may be used for producing end products.

Recycled material may refer to any material output at any process stage in the recycling of products. The recycled material may comprise any component of the product to be recycled in any form. For instance, the recycled material may include a collection of components to be further processed in the recycling process. The recycled material may be derived from any component of the product to be recycled.

The plant may include any plant processing products, product components or product materials. Such processing may include recycling or production. The plant may perform one or more process steps, such as collecting, dismantling, sorting, mechanical treatment, chemical treatment, thermal treatment, production of products, production of product components, production of materials or any other steps for transforming used material of used products into recycled raw materials or new products. Recycling instructions may include collecting, sorting, transport, storing or other process instructions or any combinations thereof that related to recycling processes. Such recycling instructions may be provided to one or more system(s) configured to monitor and/or control process steps such as collecting, sorting, transport, storing or other process instructions or any combinations thereof.

Material identifier package may include any data structure that relates product identifiers according to at least one material configuration that is processable or to be processed by at least one plant or recycling plant. Material identifier package may include one or more product identifier(s) associated with the at least one material configuration processable or to be processed by at least one recycling plant. Material identifier package may include a gathering of product identifiers associated with at least one or one or more product(s) or at least one or one or more component(s) of the product(s) to be recycled and with the at least one material configuration processable or to be processed by at least one recycling plant. Material identifier package may include any data for collecting, sorting, transporting, storing, processing or providing products or components for subsequent recycling step(s). Material identifier package may comprise product or component identifiers and corresponding material configuration data associated with the material configuration that is processable or to be processed by at least one recycling plant. Material identifier package may comprise product or component recycling classification data or instructions. Material identifier package may further include operation data indicating process requirements for the material configuration and/or product or component location data. In other words, material identifier package may include data because of which a choice or allocation of products or components to be recycled to at least one respective recycling plant may be made.

Product identifier may include any identifier uniquely associated with the product to be recycled or at least one component of the product to be recycled. The product identifier may include an identifier associated with the product and/or at least one component of the product. The product identifier may include more than one identifier associated with the product and/or at least one component of the product. The product identifier may include or relate to any unique identifier uniquely associated with a data owner and material configuration data associated with the product or at least one component of the product to be recycled. The product identifier may include or relate to one or more decentral identifier(s). The decentral identifier may include one or more Universally Unique Identifier(s) (UUID) or Digital Identifier(s) (DID). The decentral identifier may be issued by a central or decentral identity issuer. Via the decentral identifier and its unique association with the data owner and material configuration data access to the material configuration data may be controlled by the data owner. The data owner of material configuration data may be the material producer, a component producer using the material produced by the material producer for producing one or more component(s) and/or a product producer using the material produced by the material producer for producing one or more product(s). The data owner for material identifier packages and/or recycled material data may be one or more recycling system(s) and/or one or more plant(s), such as a recycler using end-of-life batteries to produce recycled material, a recycler using black mass to produce recyclate, a material producer, a component producer using the material produced by the material producer for producing one or more component(s) and/or a product producer using the material produced by the material producer for producing one or more product(s). The data owner for plant data, plant assignment data and/or operation data may be one or more recycling system(s) and/or one or more plant(s), such as a recycler using end-of-life batteries to produce recycled material, a recycler using black mass to produce recyclate, a material producer, a component producer using the material produced by the material producer for producing one or more component(s) and/or a product producer using the material produced by the material producer for producing one or more product(s). This contrasts with central authority schemes, where identifiers are provided by the central authority and access to the data is controlled by such central authority. Decentral in this context refers to the usage of the identifier as controlled by the data owner. The decentral identifier may be connected to a digital representation of material configuration data plant data, material data, recycling material data, operation data, plant assignment data or combinations thereof or parts thereof or any other data package disclosed herein. The digital representation may include a representation for accessing the material configuration data, plant data, material data, recycling material data, operation data, plant assignment data or combinations thereof or parts thereof or any other data package disclosed herein. The decentral identifier may be connected to authentication information and/or authorization information. The decentral identifier may be connected to further product or component data.

Product identifier element may include any physical arrangement that associates the product identifier with the product or at least one component of the product. The product identifier element may comprise a passive or active element, e.g. QR-code, RFID-tag, but is not limited thereto. The product identifier element may be a physical identifier physically connected to the product or at least one component of the product. The identifier element may include markers embedded in materials, a bar code, a QR-Code, a tag like a RFID tag or similar physical arrangement that allows to digitally identify the product or at least one component of the product.

Material configuration data may include the material configuration of the product or the product component. The material configuration data may be associated with at least one material type, at least one material property and/or at least one chemical composition associated with at least one component of the battery to be recycled. Material configuration data may include material type, material property and/or chemical composition of the material used to produce the product or component of the product. Material type, material property and/or chemical composition may specify the material configuration at least in part. Material type may include material specifications like plastics, composite material, metal containing material or the like as present in end-products, intermediate products, by-products, or raw material but is not limited thereto. Material properties may include physical material properties, e.g. thermodynamic, mechanic, electrodynamic, optic and acoustic material properties, and chemical material properties, e.g. Standard electrode potential and electronegativity, but are not limited thereto. The chemical composition may correspond to at least one constituent included in the composition. For instance, the chemical composition may be specified by absolute or relative amount of one or more element(s), chemical compound(s) or constituent(s) that are contained in the material.

Material configuration data may include the material configuration of the product or the product component. The material configuration data may be associated with at least one material type, at least one material property and/or at least one chemical composition associated with at least one component of the product to be recycled. Material configuration data may include material type, material property and/or chemical composition of the material used to produce the product or component of the product. Material type, material property and/or chemical composition may specify the material configuration at least in part. Material type may include material specifications like plastics, composite material, metal containing material or the like as present in end-products, intermediate products, by-products, or raw material but is not limited thereto. Material properties may include physical material properties, e.g. thermodynamic, mechanic, electrodynamic, optic and acoustic material properties, and chemical material properties, e.g. Standard electrode potential and electronegativity, but are not limited thereto. The chemical composition may correspond to at least one constituent included in the composition. For instance, the chemical composition may be specified by absolute or relative amount of one or more element(s), chemical compound(s) or constituent(s) that are contained in the material.

Material configuration data may be associated with the material configuration of one or more component(s) of the product. Material configuration data may specify the material configuration on component basis. For instance, material configuration data may specify at least partially the chemical composition of one or more component(s) of the product. The product identifier may be associated with any component of the product. The product identifier may be connected or related to one or more identifier(s) related to the material used to produce the product or at least one component of the product.

Plant assignment data may include any data structure that relates the at least one recycled material identifier to the at least one plant identifier. Plant assignment data may include one or more recycled material identifier(s) associated with the at least one material composition processable or to be processed by the at least one plant. Plant assignment data may further include recycled material data, operation data and/or location data. In other words, plant assignment data may include data because of which a choice or allocation of recycled battery material to at least one respective recycling plant may be made.

Recycled material identifier may include any identifier uniquely associated with the recycled material. The recycled material identifier may include any unique identifier uniquely associated with a data owner and recycled material data associated with the recycled material. Recycled material data may include product or component identifiers associated with the at least one material configuration that is processable or to be processed by at least one recycling plant. Such identifiers may be associated with a package gathering product or component identifiers or associated with a package identifier. Recycled material data may include the recycled material composition as may be determined from the material configuration associated with product or component identifiers. The recycled material identifier may include or relate to one or more decentral identifier(s). The decentral identifier may include one or more Universally Unique Identifier(s) (UUID) or Digital Identifier(s) (DID). The decentral identifier may be issued by a central or decentral identity issuer. Via the decentral identifier and its unique association with the data owner and the recycled material data access to the recycled material data may be controlled by the data owner. The data owner for recycled material data may be one or more recycling system(s) or one or more plant(s), such as a recycler using end-of-life batteries to produce recycled material, a recycler using black mass to produce recyclate, a material producer, a component producer using the material produced by the material producer for producing one or more component(s) and/or a product producer using the material produced by the material producer for producing one or more product(s). This contrasts with central authority schemes, where identifiers are provided by the central authority and access to the data is controlled by such central authority. Decentral in this context refers to the usage of the identifier as controlled by the data owner. The decentral identifier may be connected to a digital representation of recycled material data. The digital representation may include a representation for accessing the recycled material data or parts thereof. The decentral identifier may be connected to authentication information and/or authorization information. The decentral identifier may be connected to further product data.

Recycled material data may relate to at least one product type, at least one material type, at least one material configuration, at least one material property and/or at least one chemical composition associated with at least one or more component(s) of the products recycled to provide the recycled material. Thereby, the allocation of recycled material can be tailored to specific material configurations, product types, material types, material properties and/or chemical compositions in order to provide a most effective processing of the recycled materials by the at least one plant. Product type may relate to product configuration, product manufacturer, product application or the like. Material type may include material specifications like plastics, composite material, metal containing material or the like as present in end-products, intermediate products, by-products, and raw material but are not limited thereto. Material properties may include physical material properties, e.g. thermodynamic, mechanic, electrodynamic, optic and acoustic material properties, and chemical material properties, e.g. Standard electrode potential and electronegativity, but are not limited thereto. The chemical composition may correspond to at least one constituent included in the composition. For instance, the chemical composition may be specified by absolute or relative amount of one or more element(s) or chemical compound(s) that are contained in the material.

In one embodiment the recycled material comprises material provided by recycling products or components of products. In the recycling process the products or components may be packaged by providing material identifier package according to the material configuration of the products or components. The recycled material may be provided by mechanical, thermal and/or chemical recycling plants.

In another embodiment the recycled material identifier relates to one or more material identifier package(s) relating product identifiers according to at least one material configuration that is processable or to be processed by at least one recycling plant. In another embodiment the recycled material identifier relates to one or more product identifier(s) and corresponding material configuration data of the products recycled to provide the recycled material. In another embodiment the recycled material identifier relates to a material identifier package and corresponding material composition data associated with the recycled material. The at least one material identifier package may include one or more product identifier(s) and corresponding material configuration data associated with at least one component of the product to be recycled. The at least one material identifier package may include material composition data associated with the recycled material as produced from at least one recycled component of the product, wherein the material composition data may be determined from the product identifiers and their corresponding material configuration data. For instance, the material identifier package may include at least one package identifier and corresponding material composition data associated with the recycled material as produced from at least one recycled component of the product. The material composition data may be determined from the product identifiers packaged and their corresponding material configuration data. Further for instance, the material identifier package may include one or more product identifier(s) and material composition data as determined from their corresponding material configuration data. By incorporating the product identifier(s) and corresponding material configuration data of the at least one component of the product recycled in order to provide the data specifying the recycled material, the recycled material can be tracked through the recycling process. Moreover, the composition of recycled material can be more reliably controlled through the recycling process.

Material configuration data may be associated with the material configuration of one or more component(s) of the product. Material configuration data may specify the material configuration on component basis. For instance, material configuration data may specify at least partially the chemical composition of one or more component(s) of the product. The product identifier may be associated with any component of the product. The product identifier may be connected or related to one or more identifier(s) related to the material used to produce the product or at least one component of the product.

In one embodiment the material configuration data is provided for access on providing the material for production of the product, on providing the material for at least one component of the product and/or on production of the material used to produce the product or the at least one component of the product. The material configuration data may be accessed on recycling of the product or component containing the material. The product identifier may be associated with the product to be recycled or at least one component of the product to be recycled. The relation of the product identifier and the product, component or material may be provided prior or on production of the product. The product identifier may relate to one or more decentral identifiers, wherein at least one decentral identifier is associated with the material used to produce the product or at least one component of the product. The product identifier may relate to a relationship representation. The relationship representation may relate the product identifier to the identifier of the material used to produce the product or at least one component of the product. The relationship representation may reflect the physical connection of the material and the product or in other words the use of the material to produce the product. This way the product identifier and the identifier associated with the material used to produce the product or at least one component of the product may be connected or related. On receipt of the product identifier, the identifier associated with the material used to produce the product or at least one component of the product may be determined. Material configuration data may be retrieved based on the identifier associated with the material used to produce the product or at least one component of the product, in particular from the material producer.

The product identifier may be uniquely associated with a data owner and/or material configuration data associated with the material used to produce the product or component, the product or at least one component of the product e.g. as provided prior or on production of the material, the product or at least one component of the product. The material configuration data may specify the material configuration of the material used to produce the product or at least one component of the product. Prior or on production of the material, the product or at least one component of the product may include any point leading to production of the material, the product or the at least one component of the product. Prior or on production of the material, the product or at least one component of the product may include on production of the material, on providing the material to produce the product or the at least one component of the product or on production of the product or the at least one component of the product.

The material configuration data may be provided for access on providing the material for production of the product. The material configuration data may be accessed on recycling of the product or at least one component of the product containing the material. The material configuration data may be accessed via a digital representation, such as a pointer, a link or a link pointing, to material configuration data. The material configuration data may be accessed on recycling, for example by reading the product identifier, by determining the identifier associated with the material via the product identifier e.g. through the relationship representation and by gathering at least the digital representation associated with the identifier associated with the material. Via the digital representation linked to the identifier associated with the material used to produce the product or the component of the product, material configuration data may be accessed. The material configuration data associated with the material used to produce the product or the component of the product may be accessed or requested from a decentral computing node associated with the recycling system(s). The material configuration data associated with the material used to produce the product or the component of the product may be provided or obtained from the decentral computing node associated with the producer producing or using the material, such as the material producer, the product producer and/or the component producer. The access to the material configuration data may be based on the decentral identifier(s) of the material used to produce the product or the component of the product. The material configuration data may be provided or transferred by at least one decentral computing node associated with a producer producing or using the material, such as the material producer, the product producer and/or the component producer. The material configuration data may be provided to or received by the decentral computing node associated with the recycling system(s).

In one embodiment the material configuration data relates to the chemical composition of the product or the at least one component of the product. The material configuration data may specify at least one constituent of the chemical composition of the product or component, such as transition-metal containing constituents, precious-metal containing constituents or plastics. The at least one product identifier may relate to the component of the product, for which the material configuration data specifies the material configuration. The at least one product identifier may relate to a first component of the product including a second component, for which the material configuration data specifies the material configuration. The at least one product identifier may relate to the product or at least one component of the product and an identifier associated with the material used to produce the product or the at least one component of the product may be related to the at least one product identifier.

In one embodiment the material configuration data or recycled material data is provided by computer-executable instructions running in an at least partially decentral or decentral computing environment, wherein the computer-executable instructions access the material configuration data based on the product identifier or the recycled material data based on the packaged product identifiers or the package identifier. The material configuration data may be provided on end-of-life of the product or the at least one component of the product. The recycled material data may be provided at any stage of the recycling process of the product or the at least one component of the product. By way of identity-based access, a decentral data service may be used for flexible and secure access to material data, such as the recycled material data or material configuration data, controlled by the data owner. In such embodiment the material configuration data or recycled material data may be provided by a storage environment under control of the material data provider, such as the material producer or recycling system(s). Such storage environment may by accessible by computer-executable instructions based on an authentication and/or authorization process or protocol. The computer-executable instructions accessing the material configuration data based on the product identifier may initiate data transfer or may initiate data processing followed by transfer of the processing result. Processing may for instance include determining material identifier package. The computer-executable instructions accessing the recycled material data based on the packaged product identifiers or the package identifier may initiate data transfer. The material data provider may be the provider of the physical material or owner of the material data. For access to material configuration data, the material data provider may be the material producer. The material configuration data may be provided by a computing node of a decentral computing environment, wherein the computing node may be associated with the material producer. For access to recycled material data, the material data provider may be one or more recycling system(s). The recycled material data may be provided by a computing node of a decentral computing environment, wherein the computing node may be associated with one or more recycling system(s). The material data provider may be a third party controlling the material data on behalf of the provider of the physical material provider or material data owner. This enables the owner of material data to control usage of material configuration data. In addition, secure data sharing or exchanging across participants of the recycling or production chain can be enabled.

In one embodiment the at least one material identifier package includes one or more product identifier(s) and corresponding material configuration data associated with the product or the at least one component of the product to be recycled. In one embodiment the at least one material identifier package includes material composition data associated with the recycled material as produced from the product or the at least one recycled component of the product, wherein the material composition data is determined from the product identifiers and their corresponding material configuration data. For instance, the material identifier package may include at least one package identifier and corresponding material composition data associated with the recycled material as produced from the product or the at least one recycled component of the product. The material composition data may be determined from the product identifiers package and their corresponding material configuration data. Further for instance, the material identifier package may include one or more product or component identifier(s) and material composition data as determined from their corresponding material configuration data. Recycled material data may include at least one package identifier and corresponding material composition data associated with the recycled material as produced from the product or at least one recycled component of the product. In one embodiment the at least one material identifier package includes material quantity data associated with the recycled material as produced from the product or the at least one recycled component of the product, wherein the material quantity data is determined from the product identifiers and their corresponding material configuration data. Material quantity data may include number, mass, weight or volume of products, components or material to be recycled.

The at least one material identifier package may be associated with at least one material configuration processable or to be processed by at least one plant, such as a recycling or production plant. In the context of the at least one material configuration processable or to be processed by at least one plant, the plant may perform at least one process, such as recycling or production process, for one or more material configuration(s). The at least one process may be predefined, such as a pre-defined recycling or production process. The at least one material configuration processable or to be processed by at least one plant may include material configuration(s) processable or to be processed by at least one plant in one or the same process run. The at least one material configuration processable or to be processed by at least one plant may include material configuration(s) processable or to be processed by the same plant or the same plant type. The at least one material configuration processable or to be processed by at least one plant may include material configuration(s) processable or to be processed together. The at least one material configuration processable or to be processed by at least one plant may include material configuration(s) processable or to be processed together in one plant. The at least one material configuration processable or to be processed by at least one plant may include material configuration(s) processable or to be processed together in one or the same process run. The at least one material configuration processable or to be processed by at least one plant may include material configuration(s) assignable to one plant or process.

In one embodiment determining the at least one material identifier package includes providing classification instructions running in an at least partially decentral computing environment, wherein the classification instructions gather product identifiers according to material configuration(s) processable or to be processed by at least one plant.

In one embodiment determining the at least one material identifier package includes classification according to classification instructions providing the material configuration(s) processable or to be processed by at least one plant. The classification may be performed according to classification instructions relating the material configuration(s) processable or to be processed by at least one plant to at least one product identifier.

In one embodiment determining the at least one material identifier package includes providing classification instructions running in an at least partially decentral or decentral computing environment, wherein the classification instructions gather product identifiers according to material configuration(s) processable or to be processed by at least one plant, such as one recycling plant. Classification instructions may include gathering of product identifiers based on the material configuration data and the material configuration(s) processable or to be processed by at least one plant. Classification instructions may include classes of material configuration(s) processable or to be processed by at least one plant and gathering product identifiers according to the classes of material configuration(s). Classification instructions may initiate matching of the material configuration provided by the material configuration data with material configuration(s) processable or to be processed by at least one plant. Classification instructions may relate material configuration data to plant identifier(s) and corresponding material configuration(s) processable or to be processed by the plant. The classification instructions may be dynamically adjustable based on operation data, in particular process data indicative of current operations of the at least one plant.

By way of identity-based classification, a classification service may be used for flexible and secure classification. In such embodiment the material configuration data may be provided by a storage environment under control of the material data provider. Such storage environment may by accessible by classification instructions based on an authentication and/or authorization process or protocol. The classification instructions accessing the material configuration data based on the product identifier may initiate classification followed by transfer of the classified result. The classification instructions may be triggered by one or more recycling system(s) on recycling of the product or at the end-of-life stage of the product. The classification instructions may access the material configuration data via the product identifier as provided by a material producer. The classification instructions may transfer the classification result to one or more recycling system(s). The material configuration data provider may be the provider of the physical material or owner of the material configuration data. The material configuration data provider may be a third party controlling the material configuration data on behalf of the provider or producer of the physical material or the material configuration data owner. This enables the owner of material configuration data to control usage of material configuration data while not sharing such data with recycling system(s). In addition, secure data sharing or exchanging across participants of the recycling or production chain can be enabled.

In one embodiment the at least one product identifier is provided from a sensor reading a product or component identifier element, wherein the product or component identifier element is physically connected to the product or at least one component of the product to be recycled. The identification element may be physically connected to the product, e.g. the product housing, uniquely identifying the product. The identification element may be physically connected to any component of the product, e.g. a product module, uniquely identifying the component of the product.

Further comprised may be the step of operating the recycling process by providing the material identifier package for controlling and/or monitoring recycling system(s). The identifier package may include a package identifier, such as a decentral identifier. The identifier package may be provided to the decentral computing node associated with one or more recycling system(s). The identifier package may be generated by the decentral computing node associated with one or more recycling system(s). The decentral computing node associated with one or more recycling system(s) may control and/or monitor the one or more recycling system(s). Operating based on the at least one material identifier package may include operating the product recycling process for recycling of materials contained in products associated with the at least one product identifier. Operating based on the at least one material identifier package may include operating the recycling process by providing collecting, sorting, transporting, storing and/or recycling instructions configured to monitor and/or control recycling systems. Operating based on the at least one material identifier package may include operating the recycling process by providing collecting, sorting, transporting, storing and/or recycling instructions configured to monitor and/or control collecting, sorting, transport, storing and/or recycling or the respective systems. Operating based on the at least one material identifier package may include operating the recycling process by collecting, sorting, transporting, storing and/or recycling materials contained in products associated with at least one product identifier. Further comprised may be the step of operating the recycling process preferably by gathering product identifiers to provide the material identifier package to recycling system(s) to control and/or monitor such system(s). The product recycling process for recycling of materials contained in products associated with the at least one product identifier may be operated based on the at least one material identifier package. The product recycling process may be operated by providing the material identifier package for controlling and/or monitoring recycling system(s). The product recycling process may be operated by providing collecting, sorting, transporting, storing and/or recycling instructions configured to monitor and/or control collecting, sorting, transport, storing and/or recycling. The product recycling process may be operated by collecting, sorting, transporting, storing and/or recycling materials contained in products associated with at least one product identifier. Recycling system(s) may include sorting, collector, transport and/or storing system. The system(s) may be controlled and/or monitored based on the material identifier package. Further comprised may be the step of sorting, collecting, transporting and/or storing recycled material based on the material identifier package, preferably based on sorting, collecting, transporting and/or storing instructions based on material identifier package(s). The sorting, collector, transport and/or storing system may be monitored and/or controlled and/or operated based on the material identifier package(s), preferably based on respective instructions generated from material identifier package(s). In the recycling process the products or components may be packaged by providing material identifier package according to the material configuration of the products or components. The recycled material may be provided by mechanical, thermal and/or chemical recycling plants.

In one embodiment determining at least one plant identifier associated with a plant for processing the recycled material as provided by recycled material data and providing plant assignment data comprising the at least one plant identifier and related recycled material identifier(s) may include determining plant assignment data by relating at least one plant identifier associated with a plant for processing the recycled material via the provided recycled material data to one or more recycled material identifier(s).

In another embodiment further comprising the step of providing operation data associated with at least one operation property of one or more plant(s). The operation data may relate to at least one plant identifier. The operation data may include plant location data associated with a plant location of the plant, capacity data associated with a capacity of the plant, process data associated with one or more process(es) of the plant and/or material processing data associated with at least one material configuration processable or to be processed by the at least one plant, such as by the same plant or the same plant type. The operation data may relate to at least one static operation property of the plant and/or at least one dynamic operation property of the same plant or plant type. The latter allows for real time perspective on capacities, process data and/or material data. Plants can be matched based on real-time information allowing for more efficient and targeted use of plant resources in the recycling process.

In one embodiment the operation data may be provided by a decentral computing node associated with one or more plant(s). The operation data may be provided for access or be accessed by a decentral computing node associated with one or more recycling system(s) or classification instructions relating the one or more plant(s) to recycled material data and/or recycled material identifier(s). The operation data may be accessed on request by a decentral computing node associated with one or more recycling system(s) or classification instructions relating the one or more plant(s) to recycled material data and/or recycled material identifier(s). The operation data may include classification instructions relating the one or more plant(s) to recycled material data and/or recycled material identifier(s). The operation data may be associated with one or more plant identifier(s). The plant identifier(s) may relate to one or more decentral identifier(s). The plant identifier(s) may relate to a digital representation, such as pointers, links or links pointing, to operation data. Via the digital representation linked to the identifier associated with the plant, operation data of the plant may be accessed. The access may include an authentication and/or authorization protocol as provided by the decentral computing environment.

In another embodiment the at least one plant identifier is determined by selecting based on the operation data the plant identifier associated with the plant suitable for processing the recycled material corresponding to the recycled material identifier data or material identifier package relating to product identifiers and corresponding material composition data associated with the material recycled from products. The determining of the at least one plant identifier may include providing material processing data associated with one or more material configuration(s) processable or to be processed by the at least one plant. Additionally or alternatively, the determining of the at least one plant identifier may include providing process data associated with one or more process(es) of the at least one plant. The at least one plat identifier may be determined based on the material processing data and/or the process data. This way the material and/or the process of the plant may be taken into account. Material processing data and/or process data may be provided by a decentral computing node associated with one or more plant(s) separately or as part of the operation data.

In another embodiment determining the at least one plant identifier includes classification according to classification instructions providing material processing data associated with one or more material configuration(s) processable or to be processed by at least one plant. In one embodiment determining the at least one plant identifier includes providing classification instructions running in an at least partially decentral computing environment, wherein the classification instructions gather recycled material identifiers relating the one or more plant(s) to recycled material data, such as the recycled material composition, and respective plant identifier(s). In one embodiment determining the at least one plant identifier includes providing classification instructions running in an at least partially decentral or decentral computing environment, wherein the classification instructions gather recycled material identifiers according to material configuration(s) processable or to be processed by at least one plant, such as at least one recycling and/or production plant. Classification instructions may include gathering of recycled material identifiers based on the recycled material data and the operation data. Classification instructions may include classes of material configuration(s) processable or to be processed by at least one plant and gathering recycled material identifiers according to the classes of material configuration(s). Classification instructions may initiate matching of the material configuration provided by the recycled material data with material configuration(s) processable or to be processed by at least one plant. Classification instructions may relate recycled material data to plant identifier(s) and corresponding material configuration(s) processable or to be processed by the at least one plant. The classification instructions may be dynamically adjustable based on operation data, in particular process data indicative of current operations of the at least one plant.

By way of identity-based classification, a classification service may be used for flexible and secure classification. In such embodiment the recycled material data may be provided by a storage environment under control of at least one recycled material data provider. Such storage environment may by accessible by classification instructions based on an authentication and/or authorization process or protocol. The classification instructions accessing the recycled material data based on the recycled material or product identifier may initiate classification followed by transfer of the classified result. The classification instructions may be triggered by one or more recycling system(s) at any stage of the recycling process following generation of material identifier package. The classification instructions may access the recycled material data via the recycled material identifier as provided by one or more recycling system(s) and/or product identifier as provided by a material producer. The classification instructions may transfer the classification result to one or more recycling system(s), such as sorting, collecting, transporting or storing systems, and/or one or more plant(s), such as recycling and/or production plant(s).

Determining the at least one plant identifier and/or plant assignment data includes classification according to classification instructions providing the recycled material composition(s). The classification may be performed according to classification instructions relating the recycled material composition(s) processable or to be processed by at least one plant to at least one plant identifier. The classification instructions may provide material processing data associated with one or more material composition(s) processable or to be processed by at least one plant. Determining the at least one plant identifier may include classification by relating recycled material associated with the recycled material identifier or material identifier package to material processing data associated with one or more material configuration(s) processable or to be processed by at least one plant. The classification instructions may assign the at least one plant identifier according to the material processing data. By classifying different kinds of recycled materials can be assigned and processed by suitable plants or processes. Since some material compositions of recycled material may be processable or to be processed within same processes, a classification based on classification methods may provide a tailored and easy way for allocating recycled material to plants. Therefore, different kinds of recycled materials which are processable or to be processed by the same process can be classified in the same class such that the variety of recycled material kinds can be reduced. Thereby, the effective use of the plants can be improved.

In another embodiment determining the at least one plant identifier may include matching the at least one recycled material identifier and the at least one plant identifier based on a quantity related to the amount of recycled material and plant capacity data related to the capacity of the at least one plant. The plant capacity may be static or dynamic. Thereby, the load of plants may be managed based on their plant capacity. In another embodiment determining the at least one plant identifier may include matching of the at least one recycled material identifier and the at least one plant identifier based on process data associated with one or more recycling process(es) and/or material processing data associated with at least one material configuration processable or to be processed by the at least one plant. Thereby, the recycled material may be assigned to the plants with plant process specifics that fit to e.g. the composition of the recycled material.

In another embodiment the recycled material data is provided by computer-executable instructions running in an at least partially decentral or decentral computing environment, wherein the computer-executable instructions access the recycled material data of the recycled material based on the material identifier. The recycled material data may be provided at any stage of the recycling process of the product or the at least one component of the product, preferably after generation of the material identifier package. By way of identity-based access, a decentral data service may be used for flexible and secure access to the recycled material data controlled by the data owner. In such embodiment the recycled material data may be provided by a storage environment under control of the material data provider, such as recycling system(s) and/or plants. Such storage environment may by accessible by computer-executable instructions based on an authentication and/or authorization process or protocol. The computer-executable instructions accessing the recycled material data based on the packaged product identifiers or the package identifier or product identifier may initiate data transfer and/or may initiate data processing followed by transfer of the processing result. Processing may for instance include determining plant identifier. The material data provider may be the provider of the recycled material or owner of the recycled material data. For recycled material data, the material data provider may be one or more recycling system(s). The recycled material data may be provided by a computing node of a decentral computing environment, wherein the computing node may be associated with one or more recycling system(s). The material data provider may be a third party controlling the recycled material data on behalf of the provider of the physical material provider or material data owner. This enables the owner of recycled material data to control usage of recycled material data. In addition, secure data sharing or exchanging across participants of the recycling or production chain can be enabled.

Further comprised may be the step of operating the recycling process preferably by assigning plant identifiers to the recycled material identifiers and providing respective recycled material identifiers to a plant operation system to control and/or monitor plant operations. The plant may be controlled and/or monitored based on plant assignment data. Operating the recycling process may include operating the recycling process by providing the assignment data for controlling and/or monitoring plant(s), such as production and/or recycling plant(s). The assignment data may include plant identifier(s), such as decentral identifier(s) associated with one or more plant(s). The plant assignment data may be provided to the decentral computing node associated with one or more plant(s). The assignment data may be generated by the decentral computing node associated with one or more plant(s), such as production and/or recycling plant(s), and/or recycling system(s), such as sorting, collecting, transporting and/or storing system. The recycled material identifiers and/or corresponding recycled material data may be provided by the decentral computing node associated with one or more one or more recycling system(s) and/or one or more plant(s), such as production and/or recycling plant(s). The decentral computing node associated with one or more plants(s), such as production and/or recycling plant(s), may control and/or monitor the one or more plants(s), such as production and/or recycling plant(s). In particular the feed of the plant(s) may be monitored and/or controlled with respect to the recycled material fed to the plant(s). In particular the feed of recycled material may be monitored and/or controlled. Via the plant assignment data and the associated recycled material data the composition of the feed may be provided. This way the plant operation can be monitored and/or controlled based on the plant assignment data.

Further comprised may be the step of transporting and/or storing recycled material based on the plant assignment data, preferably based on transporting and/or storing instructions generated from plant assignment data. The transport and/or storing system may be operated based on the plant assignment data, preferably based on transporting and/or storing instructions generated from plant assignment data.

In another embodiment further comprising the step of providing transport and/or storing instructions based on the plant assignment data. Disclosed is also a method and corresponding apparatus for providing transport and/or storing instructions based on plant assignment data. Any method steps disclosed in conjunction with such method may be performed by the corresponding apparatus comprising one or more computing nodes; and one or more computer-readable media having thereon computer-executable instructions that are structured such that, when executed by the one or more computing nodes. For generating and/or providing such instructions individual steps may be performed in combination with the methods, systems, apparatuses or computer elements for providing material identifier package or for operating the recycling process.

Further comprised may be the step of providing material location data associated with recycled material based on the recycled material identifier and plant location data based on the plant identifier. Further comprised may be the step of determining transport instructions based on the collection point data and the plant location data. One or more transport route(s) may be determined from such data. The material location data may signify the starting point for transport and the plant location data may signify the destination point of the transport route. The plant location data may be included in the plant assignment data. Further comprised may be the step of determining storing instruction based on operation data, in particular capacity data and a quantity relating to the amount of recycled material from products or components with material configuration processable or to be processed together, such as by the same plant, the same plant type or the same process.

BRIEF DESCRIPTION OF THE DRAWINGS

In the following, the present disclosure is further described with reference to the enclosed figures.

DETAILED DESCRIPTION OF EMBODIMENT

The following embodiments are mere examples for implementing the methods, the systems or the computer elements disclosed herein and shall not be considered limiting.

Figure 1:
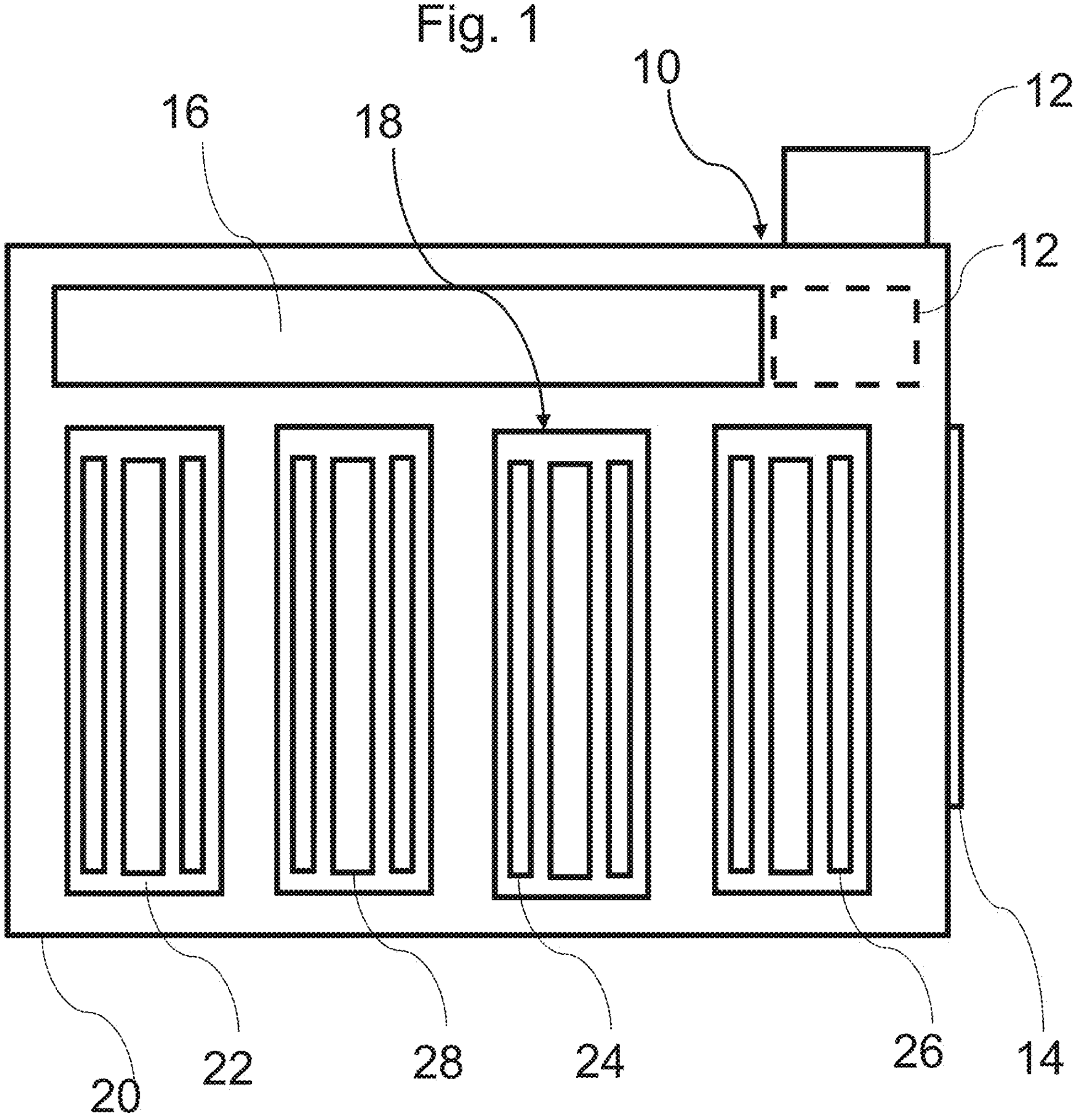
FIG. 1 illustrates schematically a battery with a battery identification element as end-of-life product.

FIG. 1 illustrates schematically a battery 10 with a battery identification element 12, 14. This is an arbitrary example of an end-of-life product. Any plastics packaging, electronic device or other end-of-life product is equivalently usable and the mere explanation by the battery example shall not limit the scope of the underlying concepts lined out herein.

The battery 10 may comprise a battery management system 16 and a plurality of battery cells 18 arranged inside a battery housing 20. The battery cells 18 may be arranged in battery packs or modules comprising multiple battery cells 18. The battery cell 10 may comprise an electrolyte 22, an anode element 24, a cathode element 26, and/or a separator 28.

Depending on application, batteries comprise different material compositions for the different components. For instance, the battery may be a lithium-ion battery. The cathode elements 26 may include active material coated on a collector foil such as aluminum or copper foil. Further binders, polyvinylidene fluoride (PVDF) and/or carbon as conducting agents may be contained. Cathode active materials may contain layered oxides (LiMO2 with M=Co, Ni, Mn, Al such as LCO (LiCoO2), NCM (LiNixMnyCozO2), NCA (LiNixCoyAlzO2)), spinels (LiM204 with M=Mn, Ni such as LMO (LiMnO4)) or phosphates (LIMPO4 with M=Fe, Mn, Co, Ni such as LiFePO4).

The anode element 24 may include anode active material coated on collector foil such as aluminum or copper foil. The active material may contain artificial graphite, natural graphite or compositions thereof. The active material may include silicon, SiO2, lithium titanate (LTO) or combinations thereof. The active material may contain binders such as styrene-butadiene rubber (SBR), polymeric thickener like carboxylmethyl cellulose (CMC) and carbonates as conducting agent.

The electrolytes may comprise salts, solvents and additives such as carbonates, esters or ethers to provide conductivity. Mixtures of cyclic carbonates such as ethylene carbonate (EC) or propylene carbonate (PC) with open chained carbonates such as dimethyl carbonate (DMC) may be included. As conducting salt lithium hexafluorophosphate (LiPF6), lithium bis (trifluormethyl) sulfonylimid (LiTFSI) and its derivates (e.g., lithium bis (fluorosulfonyl) imide (LiFSI)) or lithium [tris (pentafluorethyl)-trifluorphosphate] (LiFAP), lithium 4,5-dicyano-2-trifluoromethyl-imidazolide (LiTDI), lithium bis (oxalate) borate (LiBOB)), ethyl methyl carbonate (EMC), and/or diethyl carbonate (DEC) may be used.

Separators may divide the space between the electrodes and are permeable for ions. Separator types include: microporous membranes, ceramic-coated separators, nonwoven mats, solid inorganic or polymeric electrolytes. Polyolefin-based membranes coated e.g., with PVDF or ceramics may be used.

The battery identification element 12, 14 may be physically associated with the battery 10. The identification element 12, 14 may be physically attached to the battery housing or be part of the battery management system 16. The identification element 12, 14 may be arranged inside or outside the battery housing 20. The identification element 12, 14 may be a passive identification element 14. The passive element 14 may be arranged on the outer surface of the battery housing 20. The passive element 14 may be based on markers embedded into the material. The passive element 14 may include a printed code such as a bar code or a QR code. The identification element 12, 14 may be an active identification element 14. The active element 14 may be a transmitter or transceiver tag, such as an RFID tag enabling communication through e.g. NFC, Bluethoth, Zigbee or other suitable near-to mid-range communication protocols. The identification element 14 may be part of the battery management system 16 e.g. the digital product identifier may be stored in the battery management system 16 and may be retrieved from the battery management system through communication protocols such as NFC, Bluethoth, Zigbee or other suitable near-to mid-range communication protocols.

The battery identification element 12, 14 may be associated with a digital battery identifier or digital product identifier. The digital product identifier may be unique for the battery. The digital product identifier may be further associated with data relating to the battery identified. Such data may include any data collected during the production or lifetime of the battery 10. For instance, such data may include material data such as material configuration data collected during production of the battery or monitoring data collected during use of the battery may be by associated with the digital battery identifier. Data relating to the battery identified or part(s) thereof may relate to or include the material configuration data. The material configuration data may be controlled by one or more material producer(s) e.g. via authentication and/or authorization mechanisms. The material configuration data may be controlled by the one or more material producer(s). The one or more material producer(s) may provide respective material configuration data for access by participant nodes of the decentral computing environment. Data relating to the battery or part(s) thereof may be stored in data bases associated with participant nodes of the decentral computing environment, in particular associated with producers of the battery, the components or the material or users of the battery. The participant node(s) storing the data relating to the battery identified or part(s) thereof may provide access to other participant node(s) e.g. via peer-to-peer communication including authentication and/or authorization mechanisms. The data relating to the battery identified or parts thereof may relate to or include the material configuration data associated with the cathode element, such as the cathode active material, the anode element, the separator and/or the electrolyte. For example, the material configuration data may be associated with the electrode active material. Such data may be provided by the material producer for access by participant node(s) of the decentral computing environment, e.g. via peer-to-peer communication including authentication and/or authorization mechanisms.

The digital product identifier may include or be associated with at least one decentral identifier. The decentral identifier may comprise any unique identifier uniquely associated with the data owner and the identified battery 10. Including a data point may relate to a data package including such data point and/or data digitally linked to or in any way associated with the data point to virtually or digitally form a data package. The decentral identifier may comprise any unique identifier uniquely associated with the data relating to the battery identified, such as material configuration data, and the identified battery 10. The decentral identifier may include or associated with one or more Universally Unique Identifier(s) (UUID) or one or more Digital Identifier(s) (DID). The decentral identifier may be issued by a central or decentral identity issuer. The decentral identifier may include authentication information for authentication of the data relating to the identified battery. Via the decentral identifier and its unique association with the battery 10 identified access to the data relating to the identified battery may be controlled by at least one data owner. This contrasts with central authority schemes, where identifiers are provided by central authority and access to data is controlled by such central authority. Decentral in this context refers to the usage of the identifier as controlled by any data owner.

The data may be hosted in a database associated or under control of the data owner. The identification element 12, 14 may be configured to provide the digital product identifier for accessing data relating to the identified battery.

The decentral identifier may include one or more identifier(s) used in the decentral computing environment and allowing for data exchange via the decentral computing environment, such as the peer-to-peer communication channel. Data exchange may include discovery of the decentral identifier for participant nodes of the decentral computing environment, authentication of participant nodes of the decentral computing environment and/or authorization of data transfers via a peer-to-peer communication between participant nodes of the decentral computing environment.

The data owner may comprise any entity generating data, particularly data relating to the battery identified. The generating node may be coupled to the entity owning physical products from or for which data, particularly, the data relating to the battery identified, is generated. The data, particularly the data relating to the battery identified, may be generated by a third-party entity on behalf of the entity owning physical products from or for which data is generated. The data owner may be the producer of the material, component contained in the battery or the battery, such as the material producer, the component producer or product producer. Via the decentral identifier and its unique association with the data owner and data relating to the battery identified access to the respective data may be controlled by the data owner. The data relating to the battery identified may be accessible for the data owner. The data owner may hence directly or indirectly own or control the data relating to the battery identified. The data relating to the battery identified may be stored in a data base of or associated with the data owner. The data relating to the battery identified may be stored in a data base accessible by the data owner. The data owner may control access to the data relating to the battery identified via the data providing service of the data owner. The data owner may control access to the data relating to the battery identified. The data relating to the battery identified may be associated with the data owner. The data owner may be the owner or controller of the data relating to the battery identified or the data relating to the battery identified owner. The data relating to the battery identified may be stored in a data base of or under control by the data owner. In this sense, the data owner may relate to the entity having access to the data relating to the battery identified or parts thereof and controlling access by data consuming services of the decentral computing environment to the data relating to the battery identified or parts thereof.

In particular, the digital product identifier may relate to the material configuration data specifying the material configuration of one or more component(s) of the battery. The digital product identifier may be associated with the battery 10 and the material configuration data may specify the material configuration of one or more component(s) of the battery 10.

Figure 2:
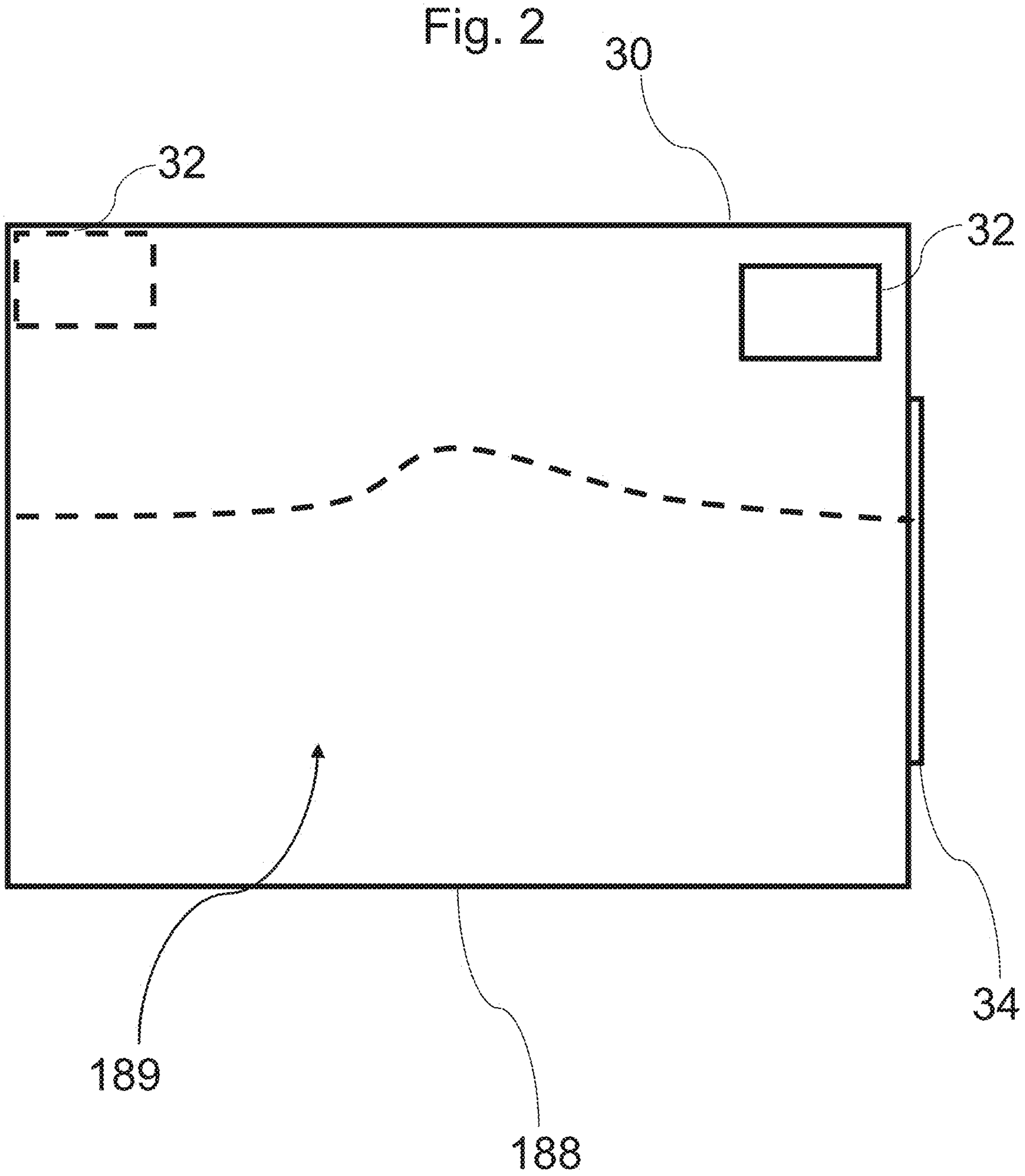
FIG. 2 illustrates schematically a battery component with an identification element as end-of-life product.

FIG. 2 illustrates schematically a battery component 30 with an identification element 32, 34. As mentioned in the context of FIG. 1 the choice of battery as an example of an end-of-life product is arbitrary and shall not be construed limiting.

The battery component 30 may include one or more sub-components of the battery 10. The sub-component may include the battery management system 16, the battery housing 20, the battery module or pack with a plurality of battery cells 22, the battery cell 22 or combinations of such sub-components. The battery component identification element 32, 34 may be associated with the battery component 30. The identification element 32, 34 may be physically attached to the battery component 30. The identification element 32, 34 may be arranged inside or outside the battery component 30. The identification element 32, 34 may be a passive or an active identification element 32, 34 as described in the context of FIG. 1. The battery identification element 32, 34 may be associated with a digital battery component identifier. The digital product identifier may include at least one decentral identifier associated with the identified battery component 30 as described in the context of FIG. 1. In particular, the identification element 32, 34 may be configured to provide the digital battery component identifier for accessing data relating to the identified battery component, such as material configuration data as e.g. described in the context of FIG. 1. The product identifier may relate to the component 30, for which the material configuration data specifies the material configuration.

Figure 3A:
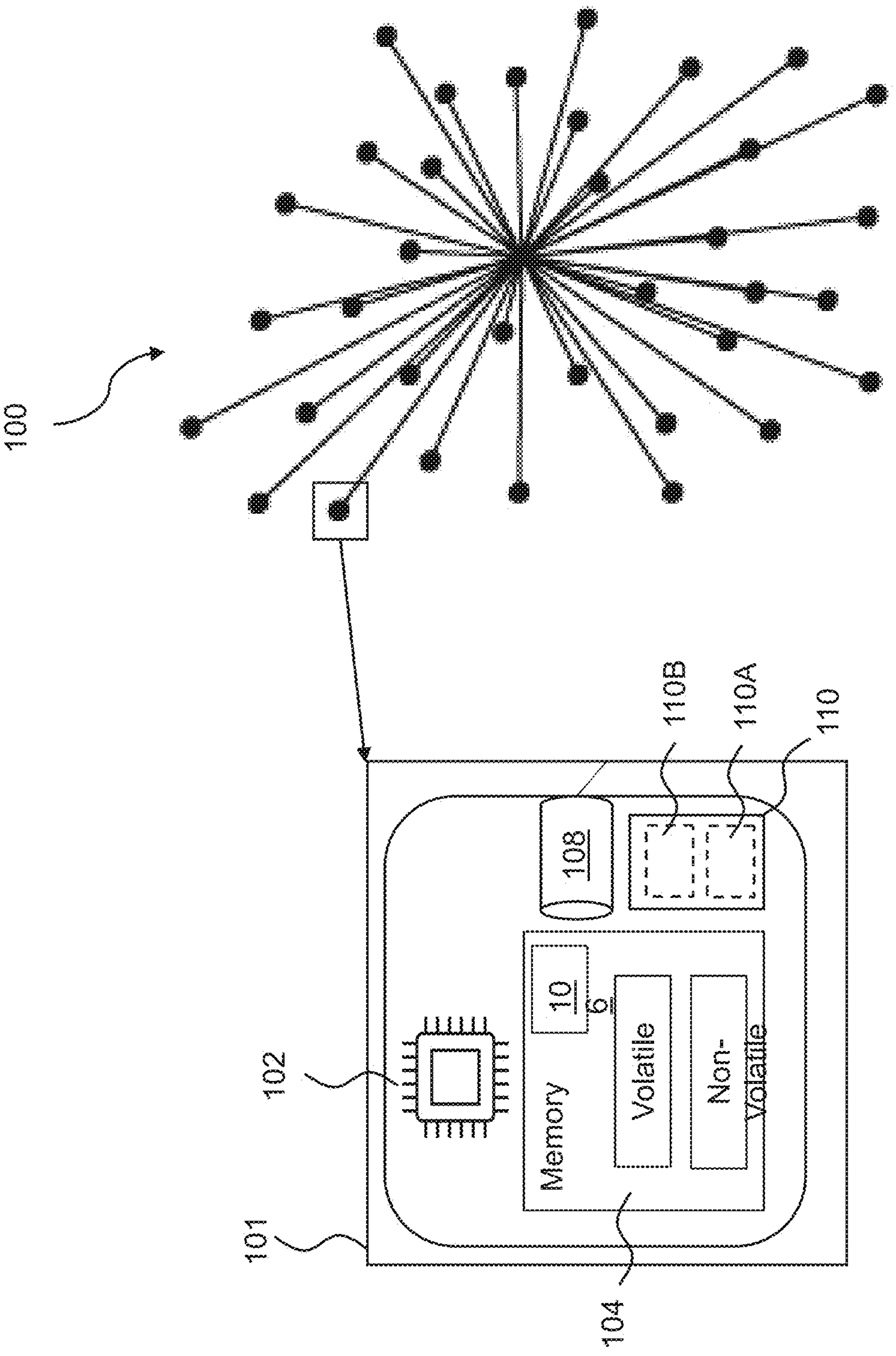
FIGS. 3*a,b* illustrate example embodiments of a central and a decentral computing environment with computing nodes.
Figure 3B:
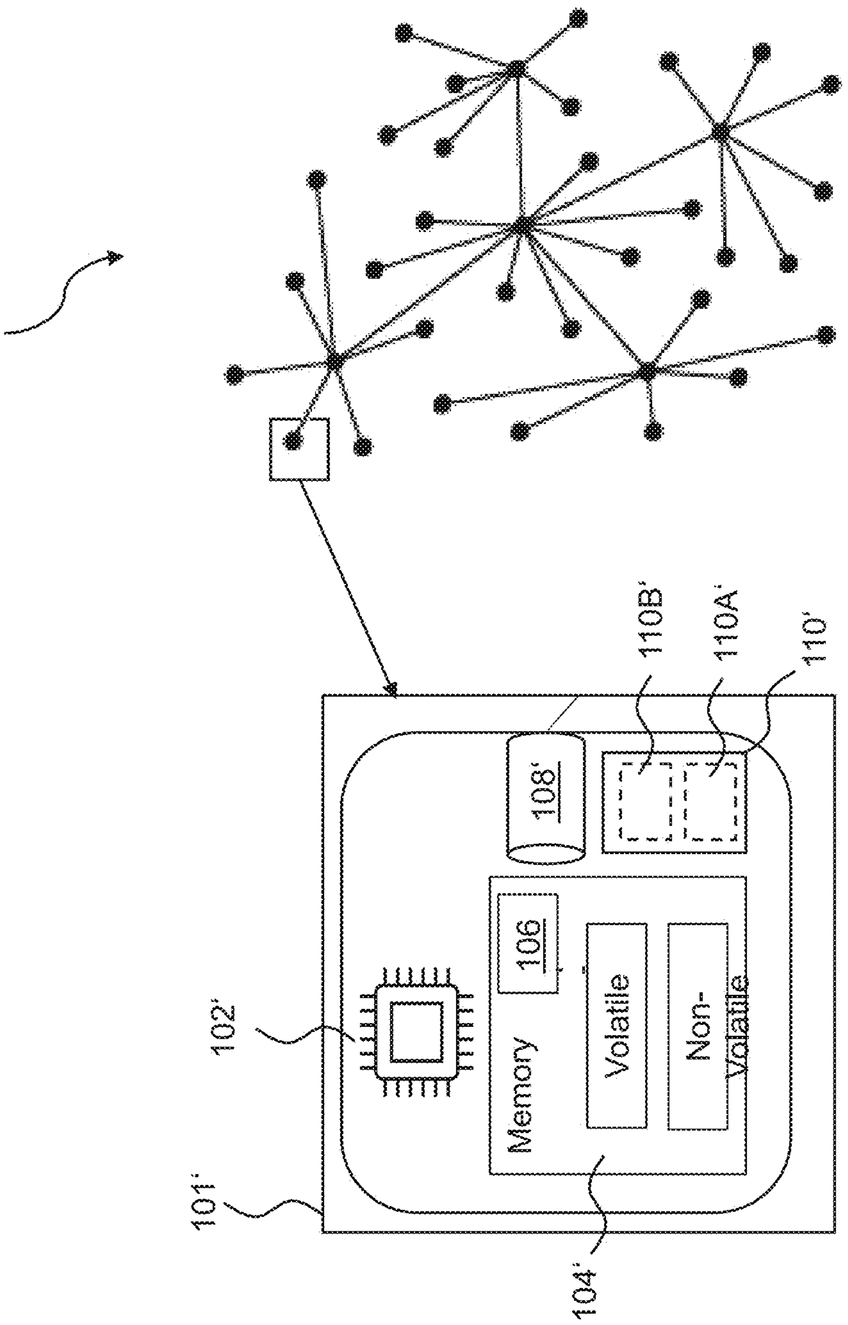
FIG. 3*c* illustrates an example embodiment of a distributed computing environment.
FIG. 3*d* illustrates an example environment for making data accessible for processing.
Figure 3C:
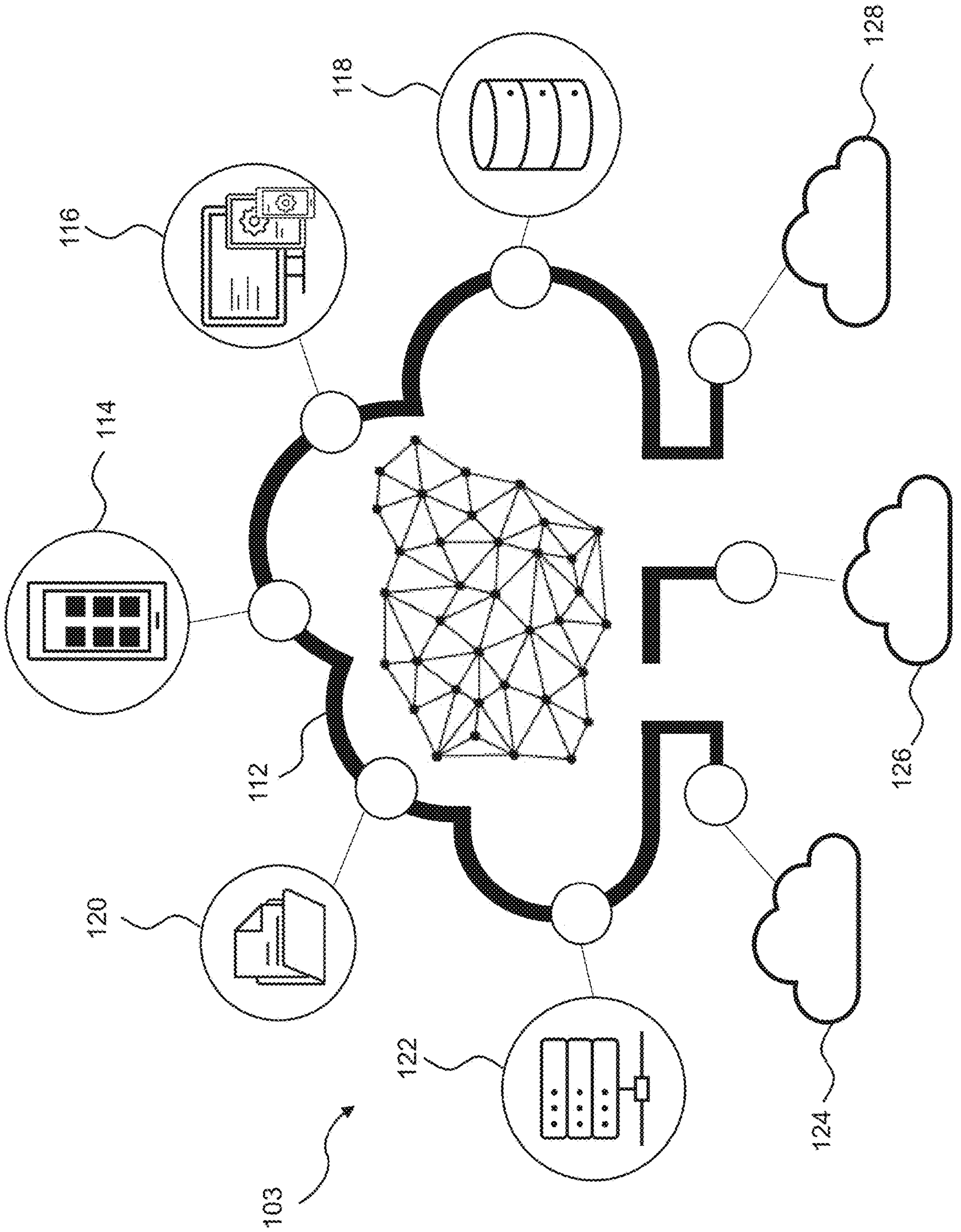

FIGS. 3*a* to 3*c* illustrate different computing environments, central, decentral and distributed. The methods, apparatuses, systems, uses, computer elements of this disclosure may be implemented in decentral or at least partially decentral computing environments. Providing, determining or processing of data may be realized by different computing nodes, which may be implemented in a central, a decentral or a distributed computing environment.

Figure 3D:
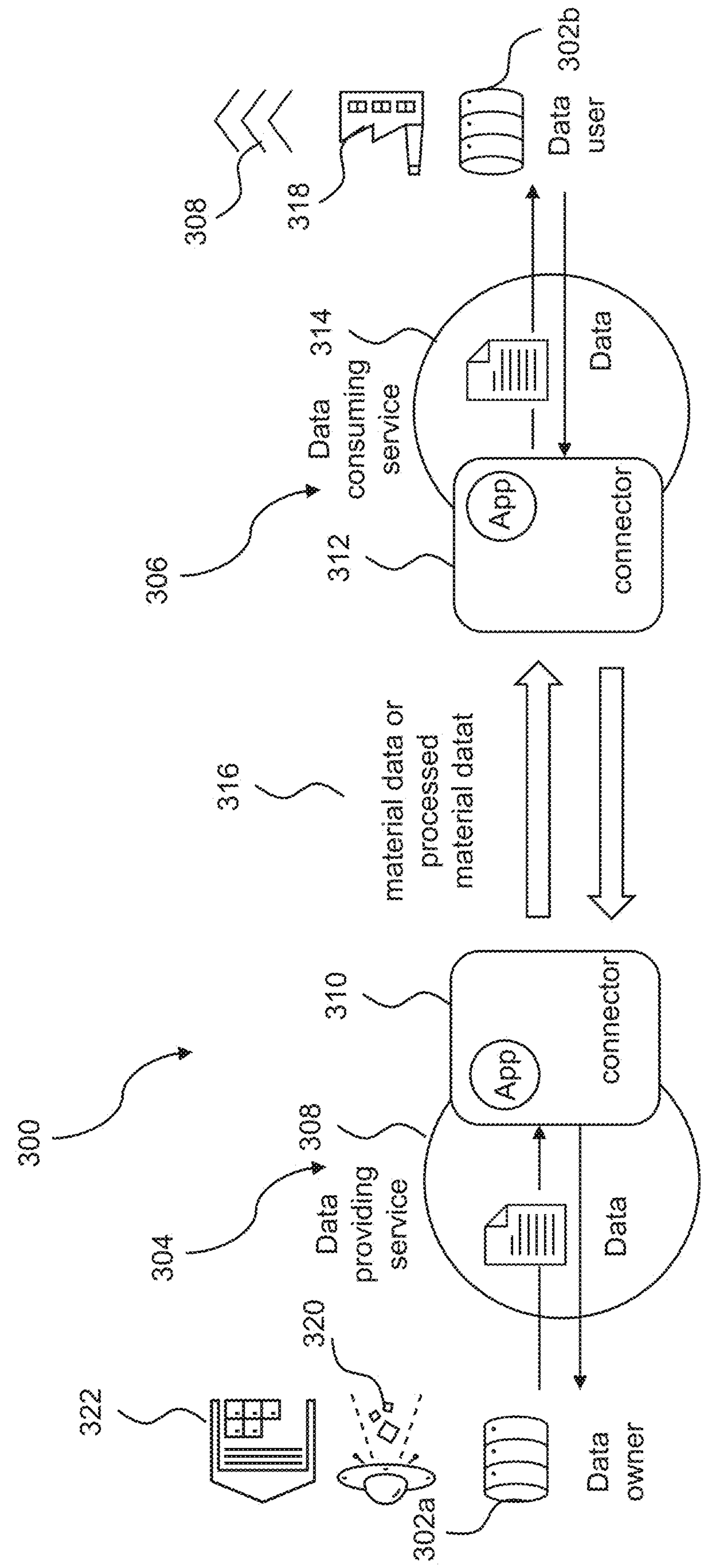

FIGS. 3*a*,b illustrate example embodiments of a central and a decentral computing environment with computing nodes. FIG. 3*c* illustrates an example embodiment of a distributed computing environment. FIG. 3*d* illustrates an example environment for making data accessible. Such environment may be implemented according to standard based on International Data Space (IDS) or Digital Identifiers from W3C. Such implementations aid to make data associated with decentral identifiers from material providers accessible to data consumers.

FIG. 3*a* illustrates an example embodiment of a central computing system 100 comprising a central computing node 101 (filled circle in the middle) and several peripheral computing nodes 101.1 to 101.*n* (denoted as filled circles in the periphery). The term "computing system" is defined herein broadly as including one or more computing nodes, system of nodes, network nodes or combinations thereof. The term "computing node" is defined herein broadly and may include any device or system that includes at least one physical and tangible processor, and/or a physical and tangible memory capable of having thereon computer-executable instructions that are executed by a processor. Computing nodes are now increasingly taking a wide variety of forms. Computing nodes may, for example, be handheld devices, production facilities, sensors, monitoring systems, control systems, appliances, laptop computers, desktop computers, mainframes, data centers, or even devices that have not conventionally been considered a computing node, such as wearables (e.g., glasses, watches or the like). The memory may take any form and depends on the nature and form of the computing node.

In this example, the peripheral computing nodes 101.1 to 101.*n* may be connected to one central computing system (or server). In another example, the peripheral computing nodes 101.1 to 101.*n* may be attached to the central computing node via e.g. a terminal server (not shown). The majority of functions may be carried out by, or obtained from the central computing node (also called remote central location). One peripheral computing node 101.*n* has been expanded to provide an overview of the components present in the peripheral computing node. The central computing node 101 may comprise the same components as described in relation to the peripheral computing node 101.*n*.

Each computing node 101, 101.1 to 101.*n* may include at least one hardware processor 102 and memory 104. The term "processor" may include an arbitrary logic circuitry configured to perform basic operations of a computer or system, and/or, generally, to a device which is configured for performing calculations or logic operations. In particular, the processor, or computer processor may be configured for processing basic instructions that drive the computer or system. It may be a semi-conductor based processor, a quantum processor, or any other type of processor configures for processing instructions. As an example, the processor may be or may comprise a Central Processing Unit ("CPU"). The processor may be a ("GPU") graphics processing unit, ("TPU") tensor processing unit, ("CISC") Complex Instruction Set Computing microprocessor, Reduced Instruction Set Computing ("RISC") microprocessor, Very Long Instruction Word ("VLIW") microprocessor, or a processor implementing other instruction sets or processors implementing a combination of instruction sets. The processing means may also be one or more special-purpose processing devices such as an Application-Specific Integrated Circuit ("ASIC"), a Field Programmable Gate Array ("FPGA"), a Complex Programmable Logic Device ("CPLD"), a Digital Signal Processor ("DSP"), a network processor, or the like. The methods, systems and devices described herein may be implemented as software in a DSP, in a micro-controller, or in any other side-processor or as hardware circuit within an ASIC, CPLD, or FPGA. It is to be understood that the term processor may also include one or more processing devices, such as a distributed system of processing devices located across multiple computer systems (e.g., cloud computing), and is not limited to a single device unless otherwise specified.

The memory 104 may include a physical system memory, which may be volatile, non-volatile, or a combination thereof. The memory may include non-volatile mass storage such as physical storage media. The memory may be a computer-readable storage media such as RAM, ROM, EEPROM, CD-ROM, or other optical disk storage, magnetic disk storage, or other magnetic storage devices, non-magnetic disk storage such as solid-state disk or any other physical and tangible storage medium which can be used to store desired program code means in the form of computer-executable instructions or data structures and which can be accessed by the computing system. Moreover, the memory may be a computer-readable media that carries computer-executable instructions (also called transmission media). Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing components that also (or even primarily) utilize transmission media.

The computing nodes 101, 101.1 . . . 101.*n* may include multiple structures 106 often referred to as an "executable component, executable instructions, computer-executable instructions or instructions". For instance, memory 104 of the computing nodes 101, 101.1 . . . 101.*n* may be illustrated as including executable component 106. The term "executable component" or any equivalent thereof may be the name for a structure that is well understood to one of ordinary skill in the art in the field of computing as being a structure that can be software, hardware, or a combination thereof or which can be implemented in software, hardware, or a combination. For instance, when implemented in software, one of ordinary skill in the art would understand that the structure of an executable component includes software objects, routines, methods, and so forth, that is executed on the computing nodes 101, 101.1 . . . 101.*n*, whether such an executable component exists in the heap of a computing node 101, 101.1 . . . 101.*n*, or whether the executable component exists on computer-readable storage media. In such a case, one of ordinary skill in the art will recognize that the structure of the executable component exists on a computer-readable medium such that, when interpreted by one or more processors of a computing node 101, 101.1 . . . 101.*n* (e.g., by a processor thread), the computing node 101, 101.1 . . . 101*n* is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component". Examples of executable components implemented in hardware include hardcoded or hard-wired logic gates, that are implemented exclusively or near-exclusively in hardware, such as within a field-programmable gate array (FPGA), an application-specific integrated circuit (ASIC), or any other specialized circuit. In this description, the terms "component", "agent", "manager", "service", "engine", "module", "virtual machine" or the like are used synonymous with the term "executable component.

The processor 102 of each computing node 101, 101.1 . . . 101.*n* may direct the operation of each computing node 101, 101.1 . . . 101.*n* in response to having executed computer-executable instructions that constitute an executable component. For example, such computer-executable instructions may be embodied on one or more computer-readable media that form a computer program product. The computer-executable instructions may be stored in the memory 104 of each computing node 101, 101.1 . . . 101.*n*. Computer-executable instructions comprise, for example, instructions and data which, when executed at a processor 101, cause a general purpose computing node 101, 101.1 . . . 101.*n*, special purpose computing node 101, 101.1 . . . 101.*n*, or special purpose processing device to perform a certain function or group of functions. Alternatively or in addition, the computer-executable instructions may configure the computing node 101, 101.1 . . . 101.*n* to perform a certain function or group of functions. The computer executable instructions may be, for example, binaries or even instructions that undergo some translation (such as compilation) before direct execution by the processors, such as intermediate format instructions such as assembly language, or even source code.

Each computing node 101, 101.1 . . . 101.*n* may contain communication channels 108 that allow each computing node 101.1 . . . 101.*n* to communicate with the central computing node 101, for example, a network (depicted as solid line between peripheral computing nodes and the central computing node). A "network" may be defined as one or more data links that enable the transport of electronic data between computing nodes 101, 101.1 . . . 101.*n* and/or modules and/or other electronic devices. When information is transferred or provided over a network or another communications connection (either hardwired, wireless, or a combination of hardwired or wireless) to a computing node 101, 101.1 . . . 101.*n*, the computing node 101, 101.1 . . . 101.*n* properly views the connection as a transmission medium. Transmission media can include a network and/or data links which can be used to carry desired program code means in the form of computer-executable instructions or data structures and which can be accessed by a general-purpose or special-purpose computing nodes 101, 101.1 . . . 101.*n*. Combinations of the above may also be included within the scope of computer-readable media.

The computing node(s) 101, 101.1 to 101.*n* may further comprise a user interface system 110 for use in interfacing with a user. The user interface system 110 may include output mechanisms 110A as well as input mechanisms 110B. The principles described herein are not limited to the precise output mechanisms 110A or input mechanisms 110B as such will depend on the nature of the device. However, output mechanisms 110A might include, for instance, displays, speakers, displays, tactile output, holograms and so forth. Examples of input mechanisms 110B might include, for instance, microphones, touchscreens, holograms, cameras, keyboards, mouse or other pointer input, sensors of any type, and so forth.

FIG. 3*b* illustrates an example embodiment of a decentral computing environment 100' or a decentral network with several computing nodes 101.1' to 101.*n*' denoted as filled circles. The decentral network may include set protocols for authentication and/or authorization. In contrast to the centralized computing environment 100 illustrated in FIG. 3*a*, the computing nodes 101.1' to 101.*n*' of the decentral computing environment are not connected to a central computing node 101 and are thus not under control of a central computing node. Instead, resources, both hardware and software, may be allocated to each individual computing node 101.1' . . . 101.*n*' (local or remote computing system) and data may be distributed among various computing nodes 101.1' . . . 101.*n*' to perform the tasks. Thus, in a decentral system environment or decentral network, program modules may be located in both local and remote memory storage devices. One computing node 101' has been expanded to provide an overview of the components present in the computing node 101'. In this example, the computing node 101' comprises the same components as described in relation to FIG. 3*a*.

FIG. 3*c* illustrates an example embodiment of a distributed computing environment 103. In this description, "distributed computing" may include any computing that utilizes multiple computing resources. Such use may be realized through virtualization of physical computing resources. One example of distributed computing is cloud computing. "Cloud computing" may refer a model for enabling on-demand network access to a shared pool of configurable computing resources (e.g., networks, servers, storage, applications, and services). When distributed, cloud computing environments may be distributed internationally within an organization and/or across multiple organizations. In this example, the distributed cloud computing environment 103 may contain the following computing resources: mobile device(s) 114, applications 116, databases 118, data storage 120 and server(s) 122. The cloud computing environment 103 may be deployed as public cloud 124, private cloud 126 or hybrid cloud 128. A private cloud 124 may be owned by an organization and only the members of the organization with proper access can use the private cloud 126, rendering the data in the private cloud at least confidential. In contrast, data stored in a public cloud 126 may be open to anyone over the internet. The hybrid cloud 128 may be a combination of both private and public clouds 124, 126 and may allow to keep some of the data confidential while other data may be publicly available.

Referring back to FIGS. 1 and 2, the examples of battery or battery component identifiers provided by the identification element 12, 14, 32, 34 of a battery as product to be recycled may be processed in an at least partially decentral computing environment or decentral network. For example, battery or battery component identifiers may be configured to access battery or battery component data, such as material data or material configuration data. Product or product component identifiers may be configured to access product or product component data, such as material data or material configuration data. Further decentral identifiers may be associated with recycling or production plants participating in the recycling or production of batteries. Recycling or production plant identifiers may be configured to access operation data, such as recycling or production plant data. Examples of operation data may be capacity data, process specific data or location data. By associating such decentral identifiers to authentication information and optionally authorization rules, data can be shared securely and reliably across players or systems of the production and/or recycling chain via the decentral network node(s) associated with such players, such as peer-to-peer communication.

FIG. 3*d* illustrates an example environment or decentral network 300 for making data accessible according to standards set by the International Data Spaces Association (IDSA; e.g. IDS Reference Architecture Version 3.0 April 2019) or W3C (Decentral Identifiers (DIDs) v1.0, Core architecture, data model, and representations according to W3C Proposed Recommendation 3 Aug. 2021). Such implementations aid to make data associated with decentral identifiers from material providers accessible to data consumers.

In the example, a data providing service 304 including a data retrieval system 308 and a connector 310 is sharing material data 316 with a data consuming service 306 including a data retrieval system 312 and a connector 314 via a decentral network protocol. The data providing service 304 and the data consuming service 306 are associated with network nodes or computing nodes of the network. The data providing service 304 and the data consuming service 306 are associated with local data bases 320*a*, 320*b*, which are controlled by the respective participant nodes.

Data relating to the battery identified or part(s) thereof may be provided or made accessible in association with material, component and/or battery 302 depending on the identifier for such data. The material, component and/or battery 302 may be related to the digital identifier. The digital identifier may include one or more decentral identifier(s) such as described e.g. in the context of FIGS. 1-3. The decentral identifier may be an identifier in the decentral network 300 allowing for data exchange via the decentral network 300 between participant node(s) via data providing/consuming services 304, 306. One participant node of FIG. 3*d* may be associated with the data providing service 304. Another participant node of FIG. 3*d* may be associated with the data consuming service 306. Data exchange may include discovery of the decentral identifier for participant node(s) of the decentral network 300, authentication of participant node(s) of the decentral network 300 and/or authorization of data transfer via a peer-to-peer communication between participant node(s) of the decentral network 300.

Upon reading the identifier element via reader element 308 as e.g. described in FIG. 1 or 2, the digital identifier(s) of the respective battery, component or material may be provided e.g. via a decentral network data base (not shown). A digital relation between the identifiers may be provided, wherein the digital relation may reflect the physical relation of the battery, its components and its materials. The identifier(s) may be related to digital representation(s) of the battery data or part(s) thereof relating to the battery, components or materials thereof.

The battery identifier may include or relate to a decentral identifier(s), that is uniquely associated with the battery identified. Similarly, the identifier(s) may relate to components or materials of the battery. The decentral identifier may include one or more Universally Unique Identifier(s) (UUID) or a Digital Identifier(s) (DID). The decentral identifier may include any unique identifier(s) uniquely associated with a data owner, battery, component and/or material. The data owner may be the producer of the battery, component or material. Via the decentral identifier and its unique association with the data owner battery, component and/or material access to the battery data may or part(s) thereof may be controlled by the data owner.

The decentral identifier(s) may be connected to the digital representation of the battery data associated with the battery, component(s) contained in the battery or material(s) contained in the battery. The digital representation may include a representation for accessing the battery data or part(s) thereof, such as material data or material configuration data as may be provided by the material producer. The digital representation(s) of battery data or part(s) thereof may be stored in a decentral data base (not shown). The battery data or part(s) thereof, such as material data or material configuration data, may be stored in a local data base associated with the data owner, such as the producer of the material, component or battery.

The battery 10 may be associated with or be related to a digital representation(s) of the battery data or part(s) thereof associated with the battery, component(s) of the battery and/or material(s) contained in the battery or its components. The digital representation(s) may relate to the respective digital identifier of the battery 10, the component and/or material contained in the battery 10 or its component(s). The digital representation(s) may point or be linked or provide a link to battery data or part(s) thereof, such as component(s) of the battery and/or material(s) contained in the battery or its components. The digital representation(s) may comprise at least one interface to the data providing service 304 configured to make the respective battery data or part(s) thereof accessible or to transfer the respective battery data or part(s) thereof. The digital representation(s) may include at least one interface to the data consuming service configured to access the respective battery data or part(s) thereof or to receive the respective battery data or part(s) thereof. The digital representation may include an endpoint for data exchange or sharing (resource endpoint) or an endpoint for service interaction (service eEndpoint), that is uniquely identified via a communication protocol. The digital representation(s) pointing to data related to the battery or parts thereof may hence be uniquely associated with the decentral identifier(s).

Upon providing the identifier(s), the representation pointing to the respective data, e.g. material data or material configuration data, may be provided to the data consuming service 306 e.g. via a decentral registry. In the example of material configuration data, which shall not be considered limiting, the material configuration data may be stored in a data base 310 associated with the material producer or provider. The data consuming service 306 associated with the reader 308 may request access to such data from the data providing service 304 of the material producer or provider. Authentication and/or authorization information linked to the identifier(s) may be shared to authenticate and/or authorize access from the data consuming service 306 to the data provided by the data providing service 304. The authentication and/or authorization information may be provided for authentication and/or authorization of the data providing service 304 and/or data consuming service 306.

In one embodiment the data related to the battery of part(s) thereof points or is linked or includes a link to material configuration data or parts thereof. In one embodiment the data related to the battery of part(s) thereof includes one or more digital representation(s) pointing, linking or providing the link to battery data or material data or part(s) thereof stored in a local data base e.g. of the material provider. In this context pointing, linking or link means any network representation or address that is suitable for accessing the data related to the battery of part(s) thereof that is stored in a local data base. The data related to the battery of part(s) thereof may include multiple digital representations pointing, linking or providing the links to distinct parts of the battery data. The data related to battery may include multiple digital representations pointing, linking or providing the links to different parts of the battery data. Such different parts may overlap in some data points. The representation may include an access point to the battery data, a link to access battery data, an endpoint to access battery data and/or a service endpoint to access battery data. This way the battery data can be maintained and controlled by a data owner. Access can be provided via the representation of an access point simplifying data verification, integrity checks or quality checks and access control, since not multiple distributed data points need to be checked and access controlled. The battery data may be stored in the data base 320 of or associated with the data owner. The battery data may be stored in a data base 320 accessible by the data owner. The digital representation pointing, linking or providing the link to battery data or part(s) thereof may be associated with or relate to any such data base associated with or accessible by the data owner. For enhanced security the digital representation pointing to battery data or part(s) thereof may indirectly relate to any such data base associated with or accessible by the data owner.

Similar to the access and transfer of data as described above for the example of material configuration data, other data may be shared securely in decentral networks between different nodes associated with different players in the network. Any data provided in the different methods, embodiments, systems described may be provided by nodes of the decentral network.

An at least partially decentral structure based on decentral identifiers allows for novel methods, apparatuses, systems, computer elements, computer executable instructions and their uses in the product recycling process, which will be described in the following.

Figure 4:
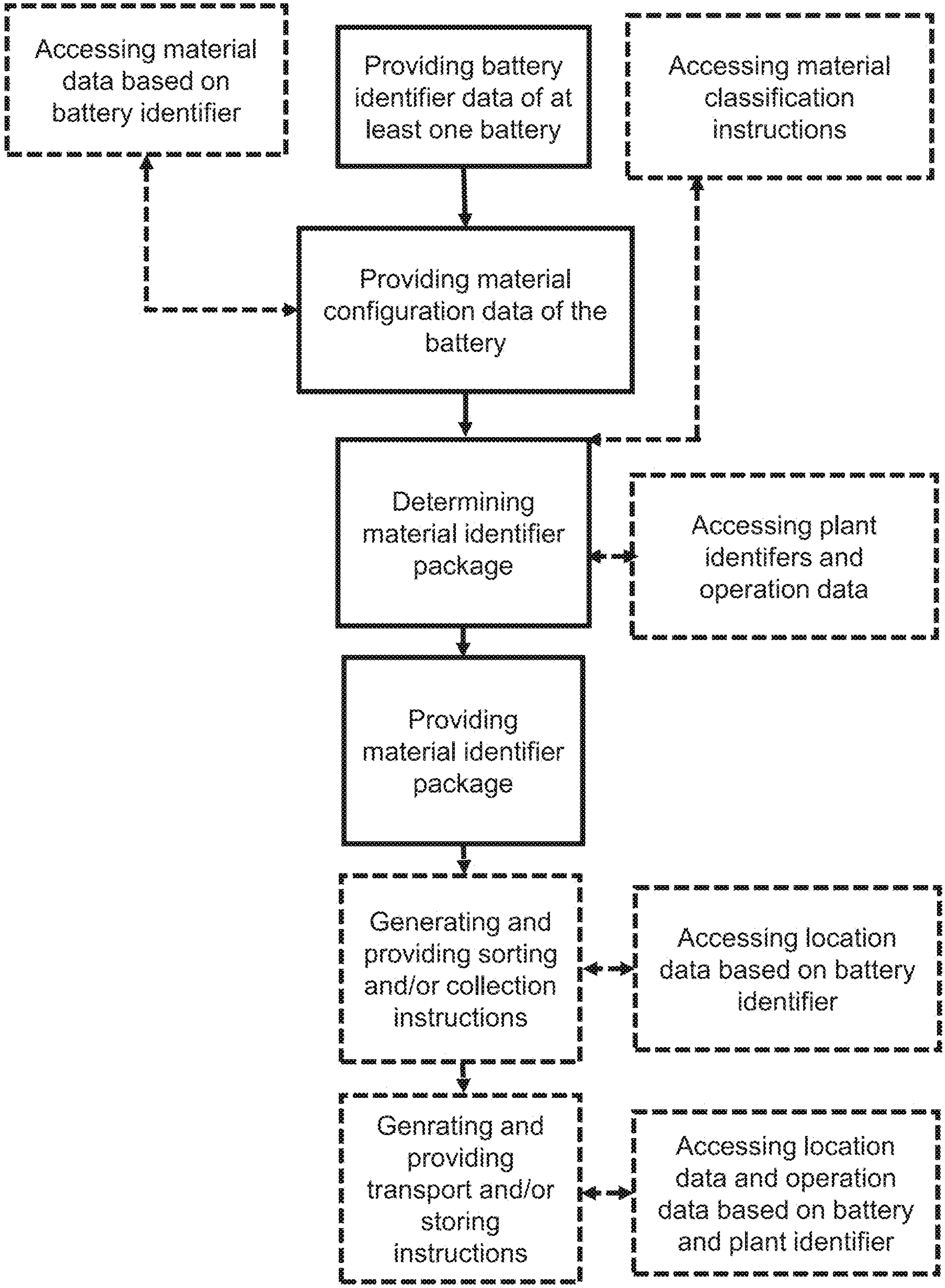
FIG. 4 illustrates a flow diagram of an example method for providing material identifier package usable for the recycling of materials contained in products, in particular for operating a recycling process.

FIG. 4 illustrates a flow diagram of an example method for providing material identifier package usable for the recycling of materials contained in products, in particular a method for operating the recycling process based on material identifier package(s) or a method for sorting products to be recycled, such as batteries, based on material configuration data associated with product identifier(s). The method may be implemented in a network as described in FIG. 3*d*.

Material identifier package(s) may include digital identifiers associated with products to be recycled such as batteries. By bundling digital identifiers according to associated material configuration, the products to be recycled, in particular the batteries, may be bundled physically by material configuration, which is otherwise not easily accessible from the physical product, in particular the battery. This way physical products such as batteries can be virtually or digitally bundled such that the recycling process can be executed more efficiently. To do so collecting, sorting and/or transporting instructions may be derived based on the material identifier package(s) to also physically bundle the respective products, in particular batteries, according to their material configuration and simplify recycling processes.

Product identifiers associated with products to be recycled may be provided. Such data may be provided e.g. as described in the context of FIGS. 1-3 via the identifier elements physically connected to the product or the component of the product to be recycled. The product identifiers may hence by associated with the product and/or product component(s) to be recycled. The identifier element of the product may be read as described in the context of FIGS. 1 and 2. The material data may be retrieved by the node of the decentral network associated with the reading of the identifier element. The decentral identifier(s) may be retrieved. Based on the decentral identifier(s) the digital representation(s) of battery data or part(s) thereof may be retrieved. The representation(s) may include links or pointers to the data. The battery data may include material configuration data. The material configuration data may be provided by the node of the decentral network associated with the producer of the product, components of the product or the material used to produce the product, such as cathode active material used to produce the cathode element of the battery 10. The node of the decentral network associated with the reading of the identifier element may request access to the material configuration data as e.g. described in the context of FIGS. 1-3.

Based on the product identifiers material data such as material configuration data may be accessed as e.g. described in the context of FIGS. 1-3. For example, the cathode active material is valuable for the recycling processes due to the precious metals contained in the cathode active material. To recover and recycle such material for the production of new batteries, the material configuration data of the battery relating to the material configuration of the cathode active material may be accessed. For instance, the material data may be accessed through a data service requesting access to the material data associated with each product identifier and controlled by a material data owner. The data service may include computer executable instructions operating in an at least partially decentral computing environment. Such computer executable instructions may be based on a Json Web Token (JWT) including authentication information, authorization information and/or a digital representation pointing to material configuration data or parts thereof. The digital representation may include an endpoint for data exchange or sharing (resource endpoint) or an endpoint for service interaction (service endpoint), that may be uniquely identified via a communication protocol. The digital representation(s) pointing to material configuration data or parts thereof may be uniquely associated with the product identifier.

The material data may include material configuration data associated with at least one component of the product 10. The material configuration data may signify the material configuration of one or more component(s) of the product 10. The material configuration may include the material type, the material properties, and/or the chemical composition of at least one component of the product 10. Material type may include plastic, metal containing materials, polymer containing materials, composite materials as e.g. used in products 10 or in intermediate products, raw materials or by-products when producing products 10, but are not limited thereto. Material properties may include physical material properties, e.g. thermodynamic, mechanic, electrodynamic, optic and acoustic material properties, and/or chemical material properties, e.g. standard electrode potential and electronegativity, but are not limited thereto. The chemical composition may relate to one or more constituents and their amounts. The term component of a product 10 may include all components included in a product 10, e.g. cathode element 26 or anode element 24. For example, material configuration data may provide the cell chemistry such as cathode active material Al, Li, Co, Ni in percentage, anode active material such as graphite, composition electrolyte such as conducting salts or solvent, separators or other materials contained in the battery cells.

The material configuration data may be associated with one component, such as the electrode element 26 or the cathode active material for the example of a battery. In such an example the material configuration may specify the chemical composition of the cathode active material. Examples are material configurations based on Lithium Nickel Manganese (NCM-type) such as Lithium Nickel Cobalt Manganese Oxide ($LiNiCoMnO_2$), Lithium Iron Phosphate (LPF-type) such as Lithium Iron Phosphate ($LiFePO_4$/C), Lithium Nickel Manganese (LMNO-type) such as Lithium Nickel Manganese Spinel ($LiNi_{0.5}Mn_{1.5}O_4$), Lithium Nickel Cobalt Aluminium (NCA-type) such as Lithium Nickel Cobalt Aluminium Oxide ($LiNiCoAlO_2$), Lithium Manganese (LMO-type) such as Lithium Manganese Oxide ($LiMn_2O_4$), Lithium Cobalt (LCO-type) such as Lithium Cobalt Oxide ($LiCoO_2$) or combinations thereof. The material configuration data may be associated with the anode element 24 or the anode active material. In such an embodiment the material configuration may signify the chemical composition of the anode active material. Examples are natural graphite, artificial graphite, other graphite types or combinations thereof. The material configuration data may be associated with the electrolyte 22, the separator 28, the cell 18 or module packaging, the housing 20, or the like. For example, material configuration data may provide the cell chemistry such as cathode active material Al, Li, Co, Ni in percentage, anode active material such as graphite, composition electrolyte such as conducting salts or solvent, separators or other materials contained in the battery cells.

Figure 6:
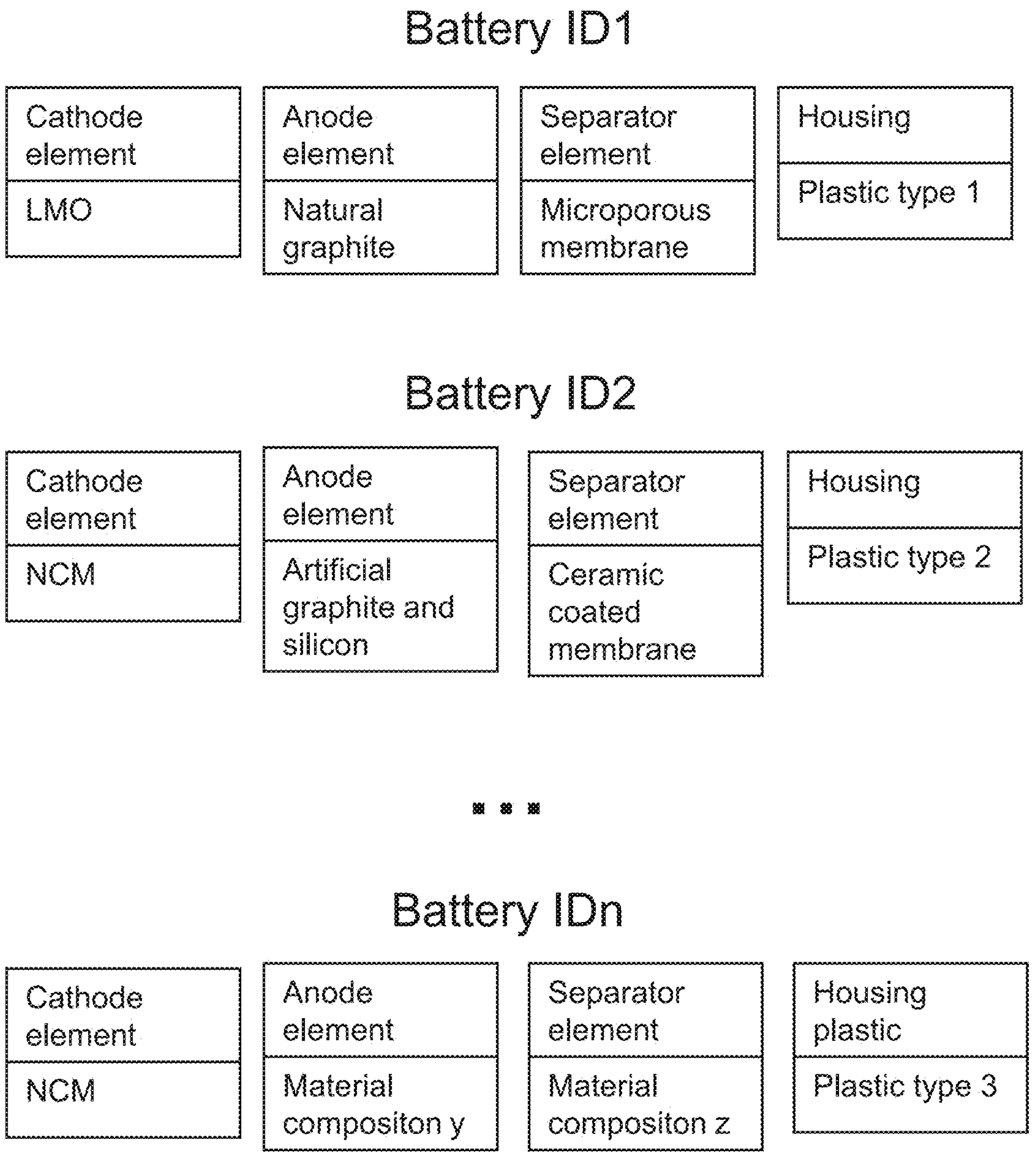
FIG. 6 illustrates an example data structure based on decentral identifiers for products.

As illustrated in FIG. 6 the product identifiers may be associated with different product components and corresponding material configuration. In the example of FIG. 6 cathode element, anode element, separator element and housing are illustrative components. The cathode element may relate to the material configuration of the electrode active material, in the case of ID1 LMO and in the case of ID2 NCM. The anode element may relate to the material configuration of the anode active material, in the case of ID1 natural graphite and in the case of ID2 artificial graphite and silicon. Similarly, the material configuration for the separator may be specified by membrane type and the material configuration for the housing is specified by plastics type. In other embodiments the components, such as cathode element, anode element, separator element and/or housing may be associated with component identifiers respectively. Through the product identifier(s) and/or the component identifier(s) the respective material configuration data may be retrieved. The identifiers may include decentral identifiers.

Based on the material configuration data associated with the product identifiers, at least one material configuration that is processable or to be processed by at least one recycling plant may be determined to provide material identifier package. As for example illustrated in FIG. 7 for the battery IDs of FIG. 6, two packages may be gathered: Package ID1 for the cathode element of the battery with ID1 having LCO as cathode active material and Package ID2 for the cathode elements of the battery with ID2 and IDn having NCM as cathode active material. Based on the material configuration data, products 10 or product components 30 may be identified with material configuration that may be recycled by the same recycling plant or together. This way products or product components to be recycled may be virtually gathered or sorted by way of the product identifiers associated with such material configuration. For such determination different embodiments are possible. Here only a few examples are described as illustrative embodiments, which are not considered limiting.

In one example a matching logic may be used to determine material identifier packages related to material configurations processable or to be processed by at least one recycling plant. Such matching may be based on the material configuration of one or more component(s). For matching multiple algorithms reaching from search algorithms to data driven classification models may be employed.

For instance, the matching may be conducted by chemical composition of components. For matching classification instructions may be provided. Such classification instructions may be pre-defined or dynamically adjustable. E.g. material configurations A, B, C may be pre-defined by at least parts of the chemical composition of one component such as specifying electrolyte composition, anode active material composition, cathode active material composition. A matching scheme may in principle look as follows.

Matching Based on One Component for the Example of a Battery

Classification by Component Composition

A: Cathode active material x, y, z;

B: Cathode active material a, b, c;

C: Cathode active material d, e, f;

Material Configuration of Component

Battery ID 1, Cathode active material x

Battery ID 2, Cathode active material y

Battery Component Material Configuration Matching

Battery ID 1, Cathode active material x→class A

Battery ID 2, Cathode active material y→class A

For multiple components the material configurations A, B, C may be pre-defined by specifying at least in part the composition of multiple components. E.g. for the example of a battery the composition such as housing composition, electrolyte composition, anode composition and cathode composition or the composition of any other component may be pre-defined. A matching scheme may in principle look as follows.

Matching Based on More Components for The Example of a Battery

Classification by Component Composition

A: Electrolyte x, y, z; anode I, m, k; cathode e,d,f

B: Electrolyte g, h, i; anode j, n, o; cathode p, q, r

Material Configuration of Components

Battery ID 1, Electrolyte x, anode I, cathode f

Battery ID 2, Electrolyte y, anode I, cathode e

Battery Material Configuration Matching

Battery ID 1, Electrolyte x, anode I, cathode f→class A

Battery ID 2, Electrolyte y, anode I, cathode e→class A

In another example matching may be conducted by chemical composition of classes. Such matching may be based on the material configuration of one or more component(s). For instance, a search may be conducted by chemical composition. For searching classification instructions may be provided. Such classification instructions may be pre-defined or dynamically adjustable. E.g. material configurations A, B, C may be pre-defined by at least in part the chemical composition of one component such as for the example of a battery specifying electrolyte composition, anode composition, cathode composition. E.g. material configurations A, B, C may be pre-defined by at least partial component composition specifying housing composition, electrolyte composition, anode composition and cathode composition and the composition of any other component. A searching scheme may in principle look as follows.

Classification by component composition for the example of a battery

A: Electrolyte x, y, z; anode l, m, k; cathode e,d,f

B: . . .

C. . . .

Material Configuration of Components

Battery ID 1, Electrolyte x, anode l, cathode f

Battery ID 2, Electrolyte y, anode l, cathode e

Search Battery Material Configuration by Class

Class A: Battery ID 1, Electrolyte x, anaode l, cathode f;

Class B: Battery ID 2, Electrolyte y, anaode l, cathode e.

Once the matching or searching is done, products or components that are processable or to be processed by the recycling plant may be identified through their identifier associated with the respective material configuration. Such packages of product or component identifiers may be assigned to the recycling plant by providing recycling plant data associated with recycling plants capable of processing such material packages.

In another example an advanced logic may be used. Such advanced logic may be based on the material configuration data of one or more component(s) and recycling plant data. For instance, recycling plant data may include a recycling plant identifier and a specification of one or more material configuration(s) processable or to be processed by the recycling plant performing at least one recycling process for one or more material configuration(s). This way the classification based on material configuration data may be directly related to a specific recycling plant. Respective, classification instructions may be provided that include the material configuration data of one or more component(s) and recycling plant data.

Based on the determination of the material identifier package the material identifier package and associated product identifiers may be provided. Material identifier package may hence include a collection of product identifiers that are associated with one or more material configuration(s) processable or to be processed together in the recycling plant. A package identifier may be generated to by uniquely associated with such package. The product identifiers associated with at least one material configuration processable or to be processed together may be linked to the package identifier. The package identifier may hence be associated with the products or product components that are processable or to be processed together by at least one recycling plant or process. Material identifier package including the package identifier and/or the package of product identifiers may be provided. In addition, material identifier package may include the material configuration(s) related to the package identifier or the package of battery identifiers. Material identifier package may include plant identifier(s) per package identifier or package of battery identifiers signifying the recycling plant the products or product components are to be processed.

Figure 5:
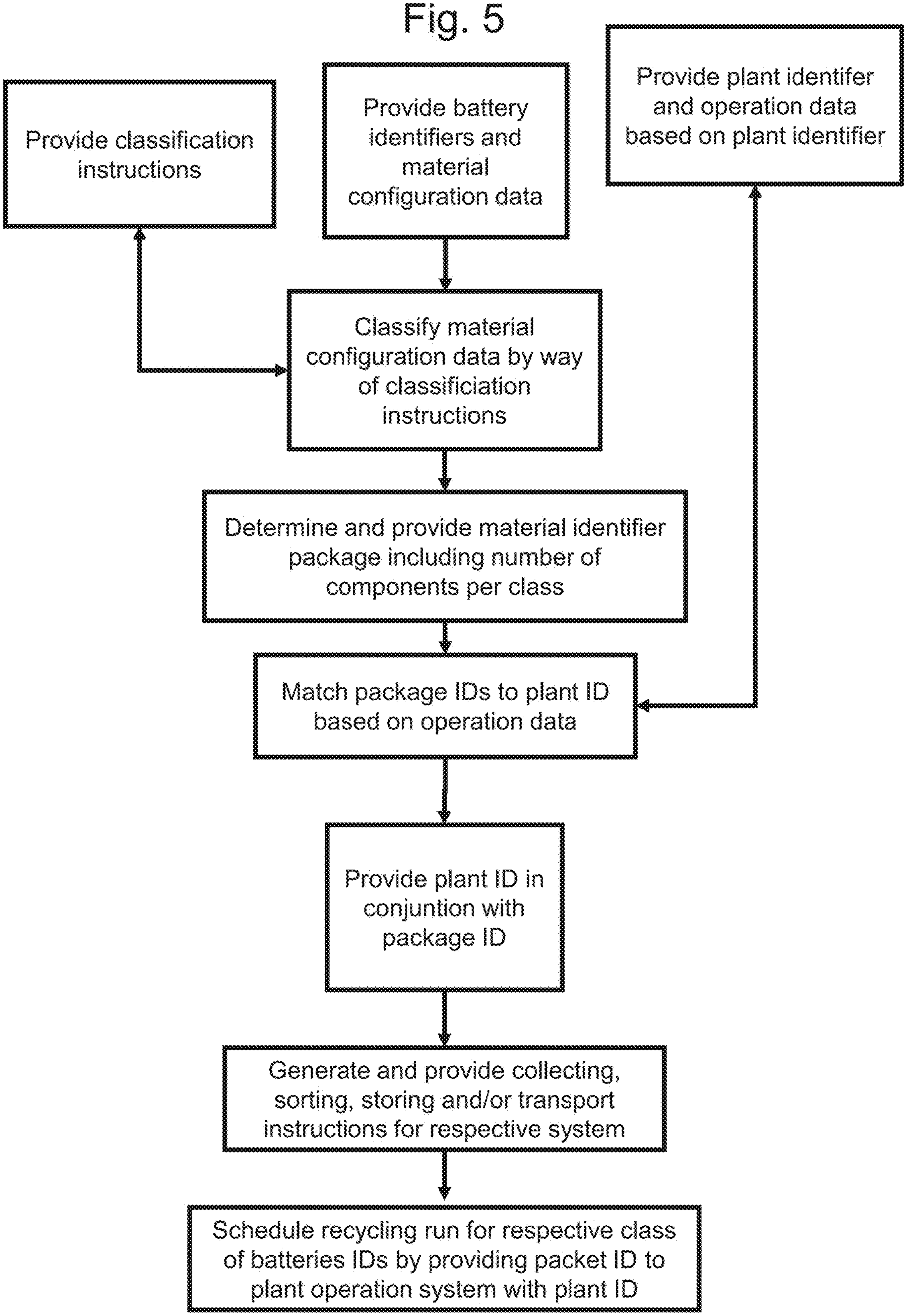
FIG. 5 illustrates an example embodiment of a flowchart for providing material identifier package usable for recycling of materials contained in products, in particular for operating the recycling process.
Figure 14:
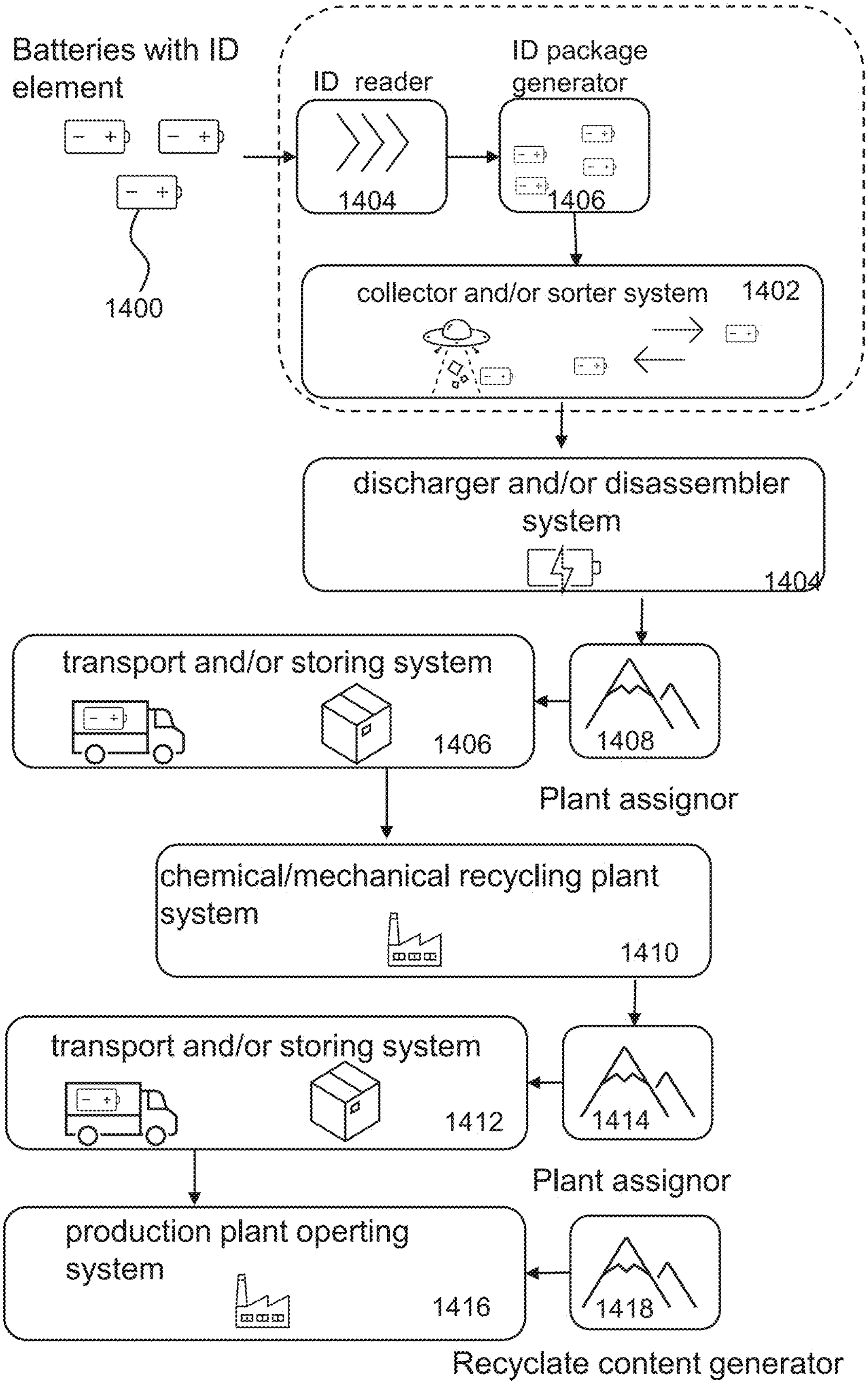
FIG. 14 illustrates an example system for operating the recycling process in the recycling chain of a end-of-life product.

Optionally the material identifier package may be used to generate and provide sorting and/or collection instructions as described in more detail in the context of FIGS. 5 and 14. Such instructions may be generated based on the package of product identifiers or the package identifier and/or product or component location data associated with the product or component identifiers. In one example collection instructions may be shown on user interface where the pick-up is scheduled. Sorting instructions may include machine-readable instructions which may be provided to sorting machine(s). Sorting machine(s) may read the product identifier(s) and sort the products or components in accordance with the material identifier packages. Sorting machine(s) may in other embodiments be provided with classification instructions as described above. The sorting machine may read the product identifier(s), sort the products or components based on classification instructions and generate virtual material identifier packages.

Further optionally the material identifier package may be used to generate and provide transport and/or storing instructions as described in more detail in the context of FIGS. 5 and 14. Such instructions may be generated based on the package of product or component identifiers or the package identifier, the location data related to the product or component identifiers and/or operation data related to the plant identifiers. Location data may be associated with the physical location of the product or product component to be recycled. Operation data may include data indicative of the location of the plant, the capacity of the plant and/or process specifics of the plant.

FIG. 5 illustrates another example embodiment of a flowchart for providing material identifier package usable for recycling of materials contained in products, in particular for operating a recycling process based on material identifier package(s) or a method for sorting products to be recycled, such as batteries, based on material configuration data associated with product identifier(s). The method may be implemented in a network as described in FIG. 3*d*.

One or more product identifiers, such as battery identifiers, and associated material configuration data may be provided e.g. as described in the context of FIGS. 1, 2, 3*d* and 4. Material configuration data may be associated with material configuration such as material type, material characteristics or chemical composition associated with one or more product component(s) the product is made of, such as the battery. A passive or active product identification element 12, 14, 32, 34 may be associated with the physical product, such as the battery. The identification element may be configured to provide product identifier, in particular the battery identifier, and associated material data for the physical product, in particular the battery, it is associated with or associated to as described in the context of FIGS. 1 to 4. Additionally or alternatively, the product identifier, in particular battery identifier, may be provided via a product element and the material configuration data may be provided through measurement.

Material classification instructions may be provided that classify the identifiers of one or more component(s) of the product, in particular battery, with respect to material type/characteristic or chemical composition. For the battery for instance, this may include classification by material configuration for one or more component(s) of the battery to be recycled. In one option the classification of material configuration classes A, B, C may be related to multiple components such as:

A: electrolyte x, y, z; anode (passive and active material) l, m, k; cathode (passive and active material) e,d,f; housing g, h, l; battery management system m, n, o; separator p, q, r;

B: electrolyte x2, y2, z2; anode (passive and active material) l2, m2, k2; cathode (passive and active material) e2,d2,f2; casing g2, h2, 12; battery management system m2, n2, o2; separator p2, q2, r2;

C electrolyte x3, y3, z3; anode (passive and active material) l3, m3, k3; cathode (passive and active material) e3,d3,f3; casing g3, h3, l3; battery management system m3, n3, o3; separator p3, q3, r3;

In another option the classification of material configuration classes A, B, C may be related to selected component (s) subject to recycling:

A: cathode (passive and active material) abc
B: cathode (passive and active material) def
C: cathode (passive and active material) ghj Products or components may be classified by material configuration data by way of classification instructions. Material identifier package including number of products or components per class may be determined and provided. Products or components may be classified based on their identifier, associated material configuration data and the provided material classification instructions. Based on the classified product identifiers the amount of material may be determined e.g. by number of products or components and/or by the amount of material to be recycled e.g. by component.

Plant identifiers may be provided in conjunction with operation data such as capacity data, process data and/or location data. Operation data may be associated with the plant identifiers and include capacity data, process data and/or material data or material classification instructions. The classified amount, number and/or composition of products or components based on classified component or product identifier(s) may be matched to plant identifiers based on capacity, process specifics and/or location of the recycling plant. One plant identifier may be selected and provided based on the classified number, amount and/or composition of the package with respective product identifiers or component identifiers or package identifier. Product or component identifiers of one or more material classification(s) may be assigned to the recycling plant. Assignment may be based on pant capacity, process specifics, material configuration and/or material classification. Operation data may be static data relating to general specifications of a plant or it may be dynamic relating to current specifications of the plant. The latter allows for real time perspective on capacities, process data and/or material data. Plants can be matched based on real-time information allowing for more efficient and targeted use of plant resources in the recycling process. The material packages may be physically gathered by sorting, collecting, storing and/or transporting instructions based on packages of product identifiers or component identifiers or the package identifier and potentially the plant identifier as e.g. described in the context of FIGS. 4, 5.

Collecting, sorting, storing and/or transport instructions for collector system, sorting system, storing system and/or transporting system may be generated and provided. Sorting instructions may be determined based on the material identifier package with the package of product identifiers or component identifiers or the package identifier. The sorting instructions may relate product identifiers or component identifiers provided by a sensor reading the product or component identifier element to material configuration(s) processable or to be processed together, such as processable or to be processed by at least one recycling plant. Such relation may include using classification instructions providing material configuration(s) processable or to be processed together, such as processable or to be processed by at least one plant. Such relation may include using classification instructions relating the material configuration(s) processable or to be processed together to at least one plant identifier. The sorting instructions may relate product identifiers or component identifiers provided by a sensor reading the product or component identifier element to product identifiers or component identifiers comprised in the material identifier package. The sorting instructions may be provided to a sorting system for sorting products or components to be recycled. The sorting system may be controlled and/or monitored based on such instructions. In some embodiments classification instructions may be provided to the sorting system configured to read product or component identifiers from products or components and to classify such identifiers for sorting the products or components. Such sorting allows for a simple and efficient sorting, since the logic for sorting may be implemented in the at least partially decentral computing environment and the sorting system may be based on a reading element combined with sorting hardware, such as a robot.

As illustrated in FIG. 14, the product identifiers or component identifiers may be provided to the sorting system. The sorting system may be configured to monitor and/or control sorting of products or components associated with one or more class(es) based on sorting and/or classification instructions. The sorting system may be configured to monitor and/or control sorting of products or components by material configuration based on sorting and/or classification instructions. This way the sorting of products or components may be done via reading of identifiers associated with products or components simplifying the sorting of such products or components by material configuration.

Alternatively or additionally, collecting instructions based on the material identifier package may be determined. The collecting instructions may relate product identifiers or component identifiers provided by a sensor reading a product or component identifier element to material configuration(s) processable or to be processed together, such as processable or to be processed by at least one recycling plant. Such relation may include using classification instructions providing material configuration(s) processable or to be processed together, such as processable or to be processed by at least one plant. Such relation may include using classification instructions relating the material configuration(s) processable or to be processed together to at least one plant identifier. Further collection point data signifying the collection point of the at least on component of the product may be provided. The collection point data may be included in the material identifier package. This way products or components may be sorted by targeted collection and simultaneously sorting may be realized on collection simplifying the recycling process.

As illustrated in FIG. 14, the product identifiers or component identifiers associated with one classification may be provided to a collector system. The collector system may be configured to monitor and/or control collection of products or components associated with one or more class(es) based on collection and/or classification instructions. The collector system may be configured to monitor and/or control collection products or components by material configuration based on collection and/or classification instructions. This way the sorting of products or components may be done directly on collection making a further sorting process redundant.

The collector system may be configured to collect products or components and provide product or component identifiers for classification by material class. The classified product or component identifiers may be provided to a sorting system. Such providing may be directly from the collector system to the sorting system or indirectly via computing environment to the sorting system. The collector system may be configured to collect products or components and configured to classify product or component identifiers by material configuration, to store associated identifiers and to provide product or component identifiers per material class e.g. to the sorting system. The product or component identifiers associated with one classification may be provided to the sorting system. The sorting system may be configured to sort collected products or components associated with one or more class(es). The sorting system may be configured to provide identifiers for classification by material configuration and to sort products or components based on the material configuration. The product or component IDs associated with one material classification may be provided by a collector system or computing environment.

Additionally or alternatively, transport instructions may be generated. Collection point data signifying the collection point of the product or the at least on component of the product may be provided. The collection point data may be included in the material identifier package. Transport instructions based on the collection point data and plant location data or storage location data may be determined. Based on such data one or more transport route(s) may be determined. The collection point data may signify the starting point for transport and the plant location data may signify the destination point of the transport route. Such transport route may be provided to a transport system such as an autonomous vehicle or a user interface like a display.

Additionally or alternatively, storing instructions based on capacity data and the number of products or components with material configuration processable or to be processed together may be determined. The amount of material or number of products or components per class or sub class may be determined based on the material classification. The amount of material may be provided to a storage system for managing the storage of products or components and/or to a transport system for transporting the products or components or to computing environment. The storage instructions may be provided to a storage management system or as transport instructions to the transport system.

A recycling run for recycled material may be scheduled by providing package identifier(s) to the plant operation system with plant identifier. The sorting, collection, storing and/or transporting instructions may be provided to the recycling plant operation system. A recycling run may be scheduled for the respective package or class of products or components by providing the package of product or component identifiers or the package identifiers to the recycling plant operation system. The assigned identifiers may be provided to the recycling plant operation system indicated by the recycling plant identifier in conjunction with material identifier package for scheduling recycling run.

Figure 8:
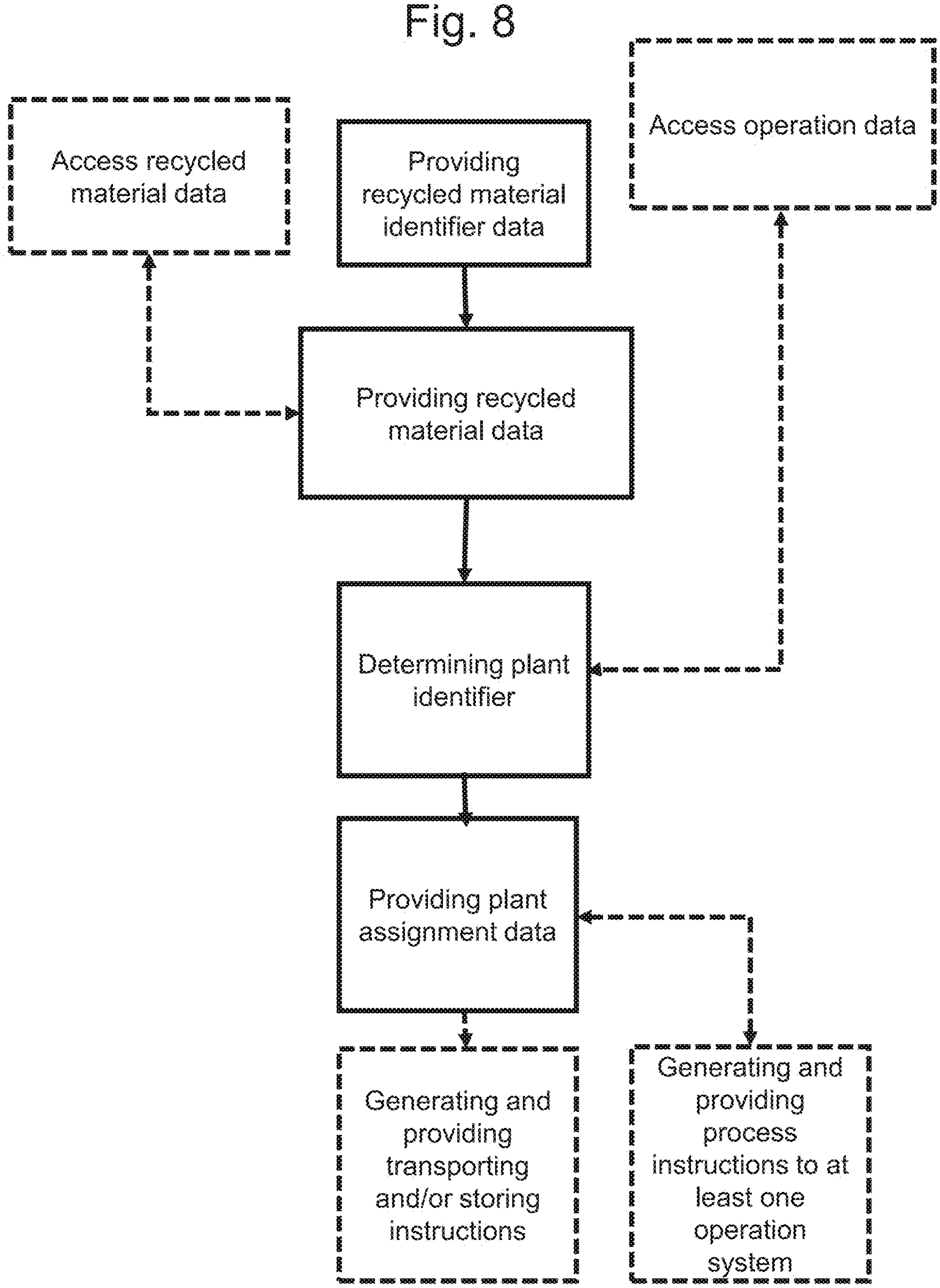
FIG. 8 illustrates an example embodiment of a flowchart for providing plant assignment data usable for processing recycled material, in particular for operating a recycling process.

FIG. 8 illustrates an example embodiment of a flowchart for providing plant assignment data usable for processing recycled material, in particular for operating a recycling process. The method may be implemented in a network as described in FIG. 3*d*.

Recycled material data as illustrated in the examples of FIGS. 4 and 5 for material identifier package usable for recycling of materials contained in products, in particular for operating a recycling process may be generated and provided. Such identifier data may be used to operate the recycling process of mechanically and/or chemically recycling of the product or the at least one component of the product. Recycled material data may include product or component identifiers associated with the at least one material configuration that is processable or to be processed by at least one recycling plant. Such identifiers may be associated with a package gathering product or component identifiers or a package identifier. For the battery example, the electrode element may be separated from the battery by way of dismantling and disassembling and further processed according to the package gathering battery or electrode element identifiers. This way recycled material like black mass may be virtually tracked during the recycling process and such tracking may be used to operate the plant processing respective material.

Recycled material identifier and corresponding recycled material data associated with the recycled material may be provided. The recycled material identifier may relate to one or more product or component identifier(s) and corresponding material configuration data of the products recycled to provide the recycled material. The recycled material data may be provided by computer-executable instructions running in an at least partially decentral or decentral computing environment, wherein the computer-executable instructions access the recycled material data of the recycled material based on the recycled material identifier. The material configuration data may be provided by the computing node of the decentral computing environment associated with the producer producing or using the material, such as the material producer. The material configuration data may be provided as part of the recycling material data. The material configuration data may be provided by product identifiers included in the recycling material data and by accessing material configuration data via the product identifiers. The recycling material data may include the material composition of the recycled material as determined based on or on generation of the material identifier package. For access to recycled material data, the recycled material data provider may include one or more recycling system(s) generating the material identifier packages. The recycled material data may be provided by a computing node of a decentral computing environment associated with one or more recycling system(s), preferably configured to generate the material identifier package and/or determine the material composition of the recycled material based on the material identifier package. The recycled material identifier may relate to the material package identifier and corresponding material composition data associated with the recycled material. The recycled material may comprise e.g. battery cell(s) or black mass material provided by recycling electrode elements of the batteries.

Operation data associated with at least one operation property of the plant may be provided. Operation data may be provided by computer-executable instructions running in an at least partially decentral computing environment, wherein the computer-executable instructions access the operation data of the plant based on the plant identifier. The operation data may be provided by a decentral computing node associated with one or more plant(s), such as the recycling plant(s), and/or one or more recycling system(s), such as the collector, sorter, transport, storing system. The operation data may be provided for access or be accessed by a decentral computing node associated with one or more recycling system(s) and/or classification instructions relating the one or more plant(s) to recycled material data and/or recycled material identifier(s). The operation data may be accessed on request by a decentral computing node associated with one or more recycling system(s) and/or classification instructions relating the one or more plant(s) to recycled material data and/or recycled material identifier(s). The operation data may include classification instructions relating the one or more plant(s) to recycled material data and/or recycled material identifier(s). Operation data may be provided to determine plant identifiers identifying a plant suitable to process the recycled material associated with the recycled product identifier data, such as recycled material data and/or the recycled material identifier. Operation data may include the plant identifier, the plant capacity related to a capacity of the plant, process data relating to process properties of the plant and/or material classification data related to material processable or to be processed by the plant. Operation data may be provided or accessed in the decentral computing environment. The operation data may relate to static production properties of the plant and/or dynamic production propertied of the plant. Operation plant data may be static data relating to general specifications of a plant or it may be dynamic relating to current specifications of the plant. The latter allows for real time perspective on capacities, process data and/or material data. Plants can be matched based on real-time information allowing for more efficient and targeted use of plant resources in the recycling or production process.

Assignment of the plant identifier data, such as plant identifier(s), to the recycled product or component identifier data, such as recycled material data and/or the recycled material identifier, may be based on plant capacity data, process data and/or material data. The plant may be any recycling plant e.g. including mechanical, thermal, chemical or combination thereof. For the example of the battery, the plant may be a metallurgical plant for recovery of transition metals from battery materials. The metallurgical plant may be a hydrometallurgical plant and/or a pyrometallurgical plant. The recycled material may be assigned to a one-stage, two-stage or multi-stage process comprising at least one hydrometallurgical plant and/or a pyrometallurgical plant. The recycled material may contain electrode active material. The recycled material may be black mass.

Plant identifier data, such as plant identifier(s), may be determined by classifying according to classification instructions providing material data processable or to be processed by the plant. The classification instructions may be provided or executed by at least one node of the decentral computing system. Classification instructions may run in an at least partially decentral computing environment, wherein the classification instructions gather recycled material identifiers relating the one or more plant(s) to recycled material data, such as the recycled material composition, and respective plant identifier(s). The classification instructions accessing the recycled material data based on the recycled material or product identifier may initiate classification followed by transfer of the classified result. The classification instructions may be triggered by one or more recycling system(s) at any stage of the recycling process following generation of material identifier package. The classification instructions may access the recycled material data via the recycled material identifier as provided by one or more recycling system(s) and/or product identifier as provided by a material producer. The classification instructions may transfer the classification result to one or more recycling system(s), such as sorting, collecting, transporting or storing systems, and/or one or more plant(s), such as recycling and/or production plant(s).

Such classification instructions may include material compositions processable or to be processed by the plant. For the example of the battery, if the battery material composition signifies Li as a constituent, the plant assigned may be a hydrometallurgical plant. Further for instance, if Li is not contained as a constituent pyrometallurgical or hydrometallurgical plant may be assigned. In addition or alternatively, the determination of plant identifier data may include capacity or process specifics. For the example of the battery, if electrolyte fluid is part of recycled material the operations specifics of the plant, such as separation of electrolyte, may need to be adapted or a plant with appropriate process specifics may need to be assigned. Further for instance, if a plant capacity is already filled another plant may be assigned. For instance, the quantity or amount of recycled material may be determined via the recycled material identifiers and the material composition data. The material composition may include a relative quantity or amount of the constituents and/or an absolute quantity amount of material. Determining the plant identifier data production data may relate to production processes of the plant. Plant identifiers may be determined based on operation in connection with material classification. Plant identifiers may be provided. Plant assignment data comprising plant identifiers and related recycled material identifier(s) may be provided. This way the incoming recycled material can be identified and processed by the plant.

At least one plant identifier associated with a plant for processing the recycled material associated with the at least one recycled product identifier may be determined. Determining the at least one plant identifier may include selecting the plant identifier associated with the plant for processing the recycled material associated with the recycled product or component identifier data based on the operation data. Determining the at least one plant identifier may include classification by classification instructions providing material data associated with one or more material configuration(s) processable or to be processed by at least one plant. Determining the at least one plant identifier may include matching the at least one recycled material identifier and the at least one plant identifier based on an amount of recycled material and a capacity of the plant. Determining the at least one plant identifier may include matching of the at least one recycled material identifier and the at least one plant identifier based on process data associated with one or more recycling process(es) and/or material data associated with at least one material configuration processable or to be processed by the at least one plant.

Plant assignment data comprising the at least one recycled material identifier related to the at least one plant identifier may be provided. From the plant assignment data transport and/or storing instructions may be determined and provided. Operation instructions to at least one manufacturing execution system of a plant may be provided and transmitted.

Transport and/or storing instructions based on location data associated with recycled material associated with the recycled material identifier and with the plant identifier may be generated and provided e.g. as disclosed in the context of FIGS. 5 and 14. Operation instructions to at least one manufacturing execution system of a plant may be provided. The plant may be controlled and/or monitored according to the operation instructions, which may include one or more execution task(s).

Figure 9:
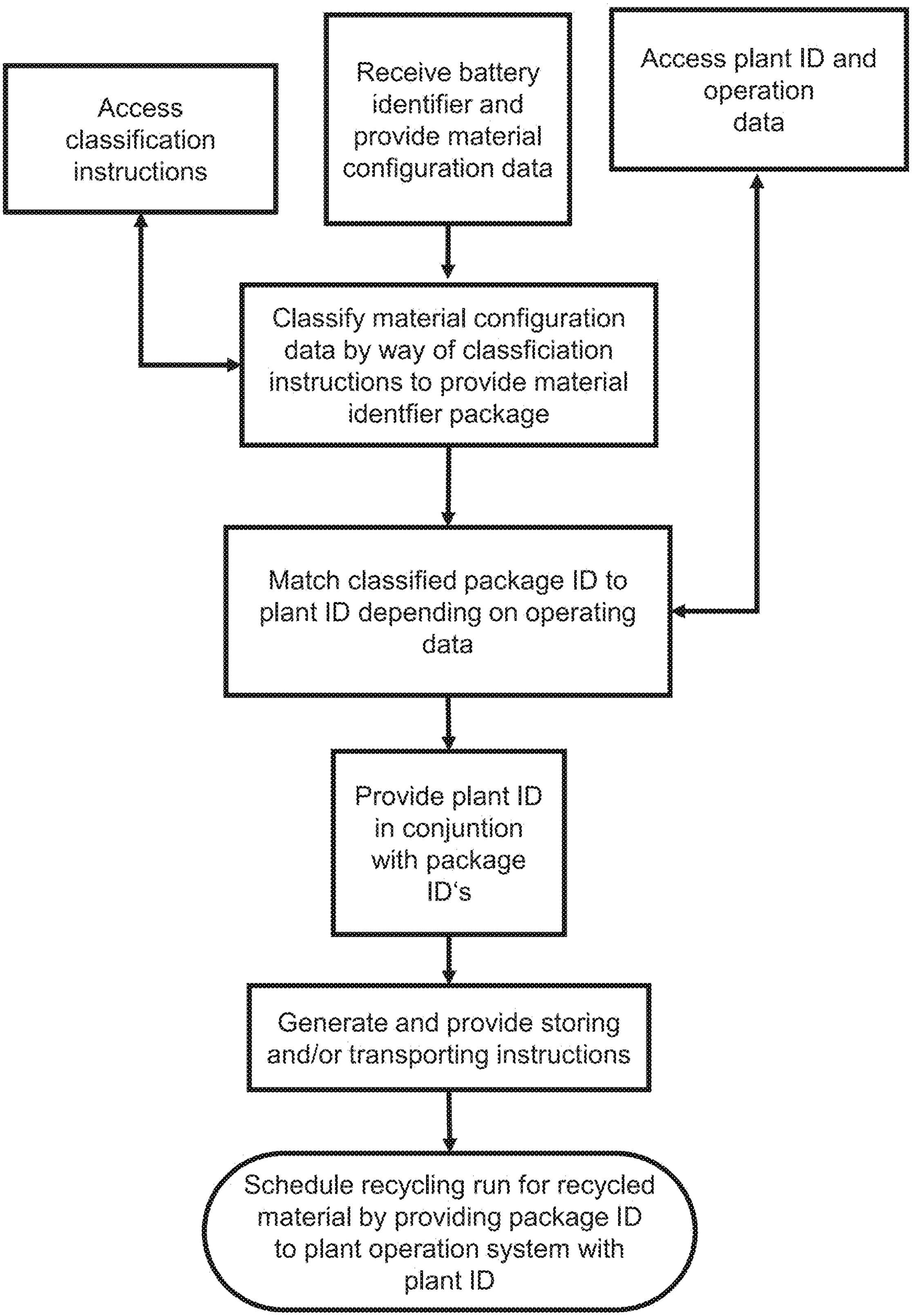
FIG. 9 illustrates an example embodiment of a flowchart for providing plant assignment data usable for processing recycled material, in particular for operating a recycling process.

FIG. 9 illustrates an example embodiment of a flowchart for assigning plants to operate the recycling process. The method may be implemented in a network as described in FIG. 3*d*.

Product or component identifiers and corresponding material configuration may be provided. Classification instructions for classifying the products or components by chemical composition may be provided. E.g. for the battery, the cathode active material may be accessed or provided. The product or component identifiers may be match according to the chemical composition from one or more products e.g. for the battery example the cathode active material of the batteries. A package identifier associated with the chemical composition of the package, such as in the battery example the black mass package, may be generated e.g. as disclosed in the context of FIGS. 1-7 and 14, 15.

To match appropriate recycling plants for operating the recycling process, operation data and plant identifiers may be accessed or provided. The operation data may include plant identifiers associated with process and capacity data. Based on the operation data, package identifiers may be matched to the plant identifier. For instance, from the package identifiers the number of products or components or a quantity or an amount of material to be recycled may be determined. Based on the quantity or amount or the number and the plant capacity, the material package may be assigned to a plant. The respective plant identifier may be provided in conjunction with the package identifiers associated with the package of products or components or materials.

The packages may be gathered by storing or transport instructions based on package identifier and the plant identifier. Additionally or alternatively, the recycling run of the plant for the respective package of products or components or material may be scheduled by providing the package identifier to the recycling plant operation system.

Figure 10:
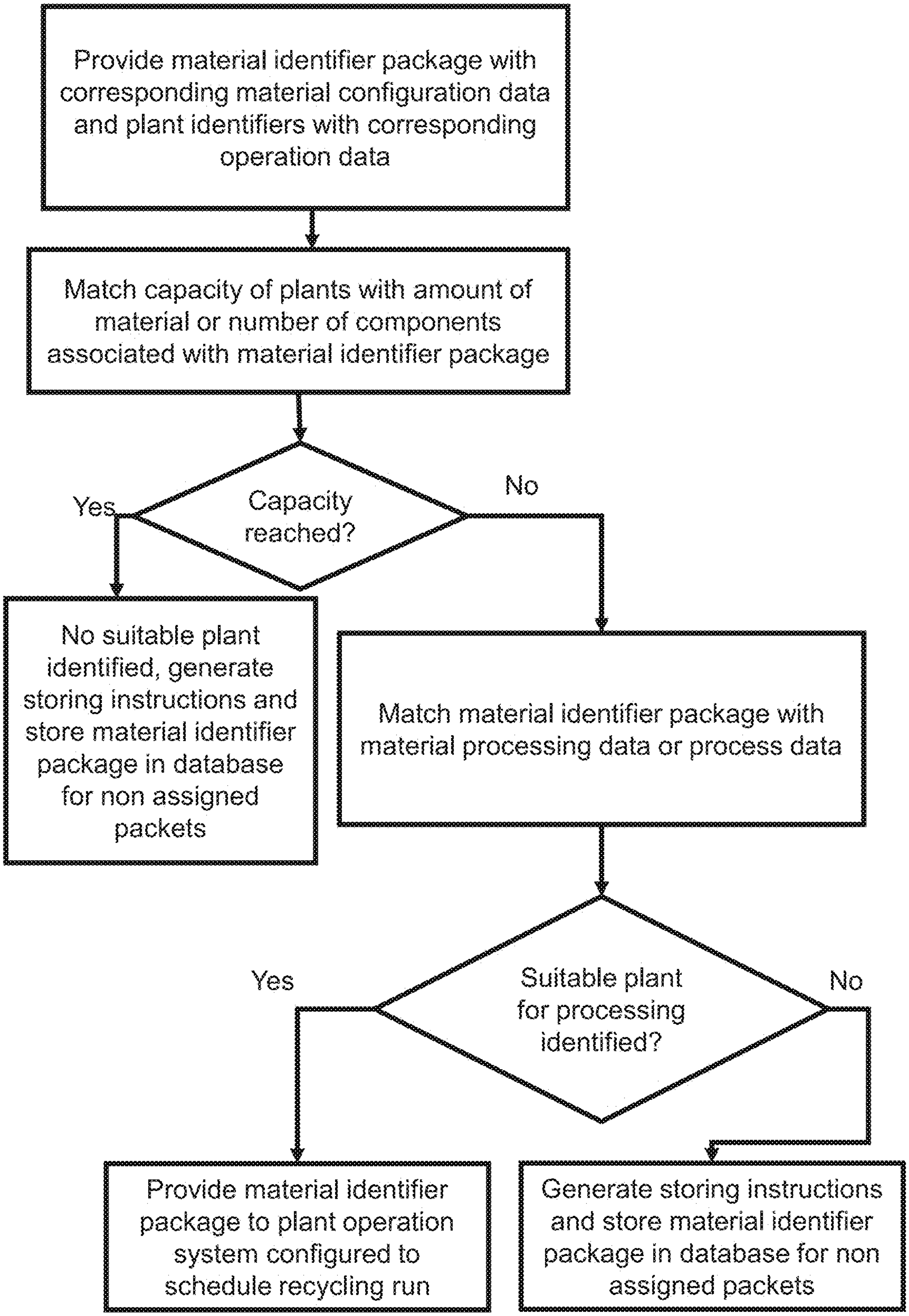
FIG. 10 illustrates an example embodiment of a flowchart for assigning plants to operate a recycling process.

FIG. 10 illustrates an example embodiment of a flowchart for assigning plants to operate a recycling process. The method may be implemented in a network as described in FIG. 3*d*.

The product or component identifiers and associated material configuration data as well as plant identifiers and associated operation data may be provided. The operation data may include capacity, material processing and process data related to the plant indicated by the plant identifier.

The capacity data may be matched with the quantity or amount of recycled material or the number of products or components associated with the product or component identifiers. Additional matching criteria may be the process data and/or material processing data of the plant in connection with the material configuration data associated with the product or component identifiers or recycled material data associated with the recycled material identifiers.

If no suitable plant is identified, storing instructions may be generated and the associated product or component identifiers or recycled material identifiers may be stored in a database for non-assigned recycled material packages.

If a plant with capacity to recycle is identified, product or component identifiers or recycled material identifiers may be matched with material processing data or process data.

If a suitable plant is identified, the product or component identifiers or recycled material identifiers may be assigned to the plant identifier. The assigned plant may then receive the identifiers to schedule the recycling process.

If no suitable plant is identified, storing instructions may be generated and respective identifiers may be stored in a database for non-assigned packages.

Figure 11:
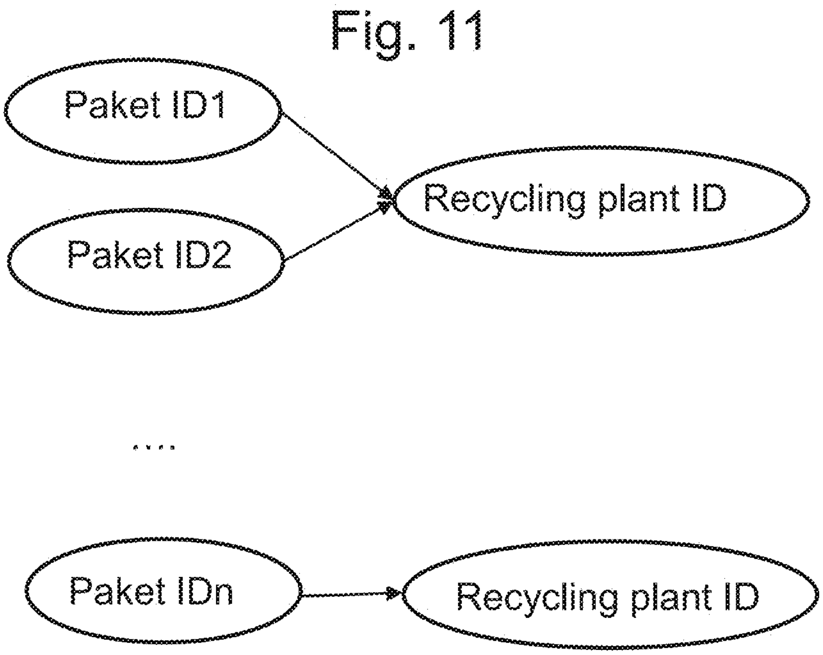
FIGS. 11-13 illustrates an example data structures based on decentral identifiers for material packages or recycled material packages in connection with plant identifiers.
Figure 12:
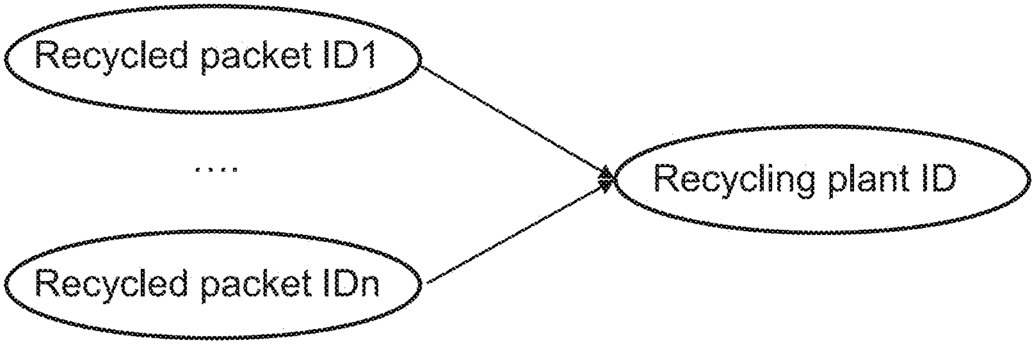
Figure 13:
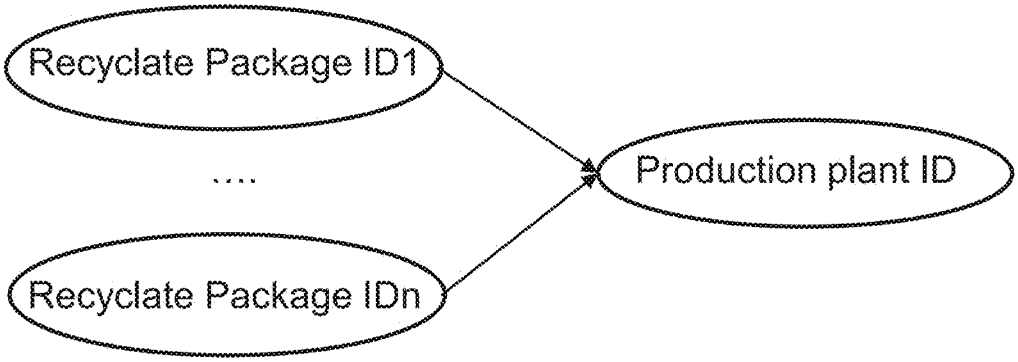

FIGS. 11 to 13 visualize example data structures that may be implemented in an at least partially decentral or decentral environment based on decentral identifiers. Such data structure may be implemented in a decentral or central storage environment e.g. based on relational databases, graph databases or the like. The example shows a battery as an end product to be recycled. This is an arbitrary choice and shall not be considered limiting.

Battery identifiers may be associated with different components of the battery. Such battery identifiers may be matched and assigned to a package identifier as described in the context of FIG. 7. Via such virtual classification based on the associated material composition the packages may be collected and/or sorted to match the respective recycling process. The method may be implemented in a network as described in FIG. 3*d*.

The packages may be assigned to the recycling plant for recycling the packaged material composition of battery materials. The package identifiers may be virtually assigned to the recycling plant identifier in the first and/or second stage of the recycling process as e.g. described in the context of FIGS. 15 and 16.

The produced recycled material package may be assigned via associated package identifiers to a further recycling plant producing the recyclate. The recyclate may be assigned via associated package identifiers to a plant identifier associated with a plant using the recyclate to produce a new battery.

FIG. 14 illustrates an example system for operating the recycling process in the recycling chain. The example shows a battery as an end product to be recycled. This is an arbitrary choice and shall not be considered limiting. The systems may include methods which may be implemented in or the systems may be part of a network as described in FIG. 3*d*.

At the start of the recycling chain stands the end-of-life product 1400. In this case the end-of-life product 1400 is a lithium-ion battery. The lithium-ion battery may include an identifier element as described in the context of FIGS. 1, 2. Such battery or component identifiers may be used in a decentral computing environment or network e.g. as lined out in the context of FIGS. 3*a* to 3*d*.

The identifier(s) of end-of-life batteries 1400 may be provided by reading the identifier element with a reader 1404 e.g. as described in the context of FIG. 1, 2, 4, 5. On reading the identifier of end-of-life batteries material configuration data and other data such as condition data collected during the lifetime of the battery may be accessed via the identifier. The material configuration data may be accessed via a decentral computing network. For example, the material configuration data may be provided by the decentral computing node associated with the producer or user of the material.

Based on the material configuration data associated with the end-of-life battery 1400, the battery identifiers may be classified into packages of identifiers that may be processed together in the recycling chain that follows. For instance, the ID package generator 1406 may be configured to perform the methods described in the context of FIGS. 4,5 for providing battery recycling data. Such data may be used for providing sorting and/or collecting the batteries by way of sorting and/or collecting instructions e.g. as described in the context of FIGS. 4, 5. For instance, the collector and/or sorter system 1402 may be configured to receive such instructions and to sort and/or collect batteries based on such instructions. In other embodiments, the reader 14040 and the ID package generator 1406 may be part of the collector and/or sorter system 1402. The batteries may be sorted directly on reading based on the classification provided by the ID package generator 1406.

Based on condition data associated with the end-of-life battery, the batteries may be discharged and/or disassembled by way of discharge and/or disassemble instructions. Such instructions may include an analysis of condition data collected during the lifetime, an end-of-life measurement protocol for collecting condition data from the end-of-life battery, an analysis of condition data collected by way of the end-of-life measurement protocol or any combination thereof. Analysis of condition data collected during the lifetime may include data related to self-discharge, charge/discharge processes, or state variables (e.g. cell temperature). This way further processing instructions on use of the battery 1400 may be determined without measurement effort. End-of-life measurement protocols may include the measurement of capacity, power, physical or chemical properties or resistance. Analysis of such measurement data may lead to further processing instructions on use of the battery.

Alternatively or additionally, such instructions may include discharge and/or disassembling instructions for robotic systems. For instance, the discharger and/or disassembler system 1404 may be configured to receive such instructions and to disassemble and/or discharge batteries 1400 based on such instructions.

The components of the end-of-life battery such as cell, cathode elements, anode element, electrolyte, separator or housing may be associated with the product identifier and/or separate component identifiers. Based on the identifier packages as provided by the battery recycling data transport and/or storing instructions may be generated for the battery or if disassembled for battery component(s) e.g. as described in the context of FIGS. 4, 5. For instance, the transport and/or storing system 1406 may be configured to receive such instructions and to transport and/or store the batteries or component(s) based on such instructions. The collector and/or sorter system 1402, discharge and/or dissembler system 1404 and the transport and/or storing system 1406 may be recycling systems connected via a decentral computing network. The systems may be associated with computing nodes of the decentral computing system. Each node may be configured to access or provide data in the decentral computing system.

Figure 7:
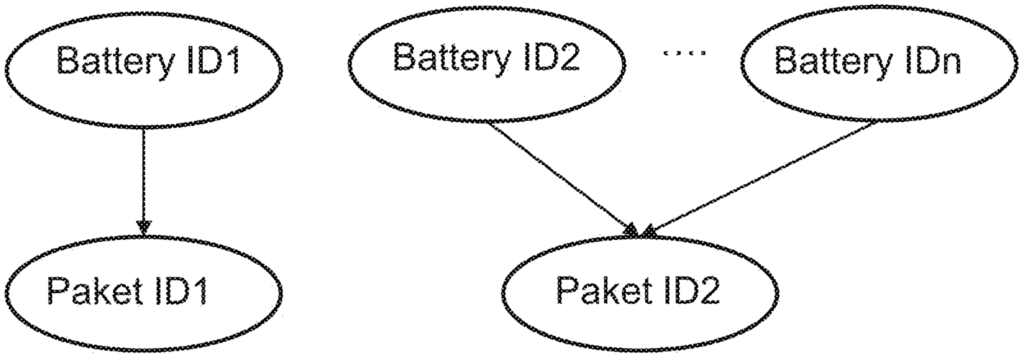
FIG. 7 illustrates another example data structure based on decentral identifiers for product or component packages.
Figure 15:
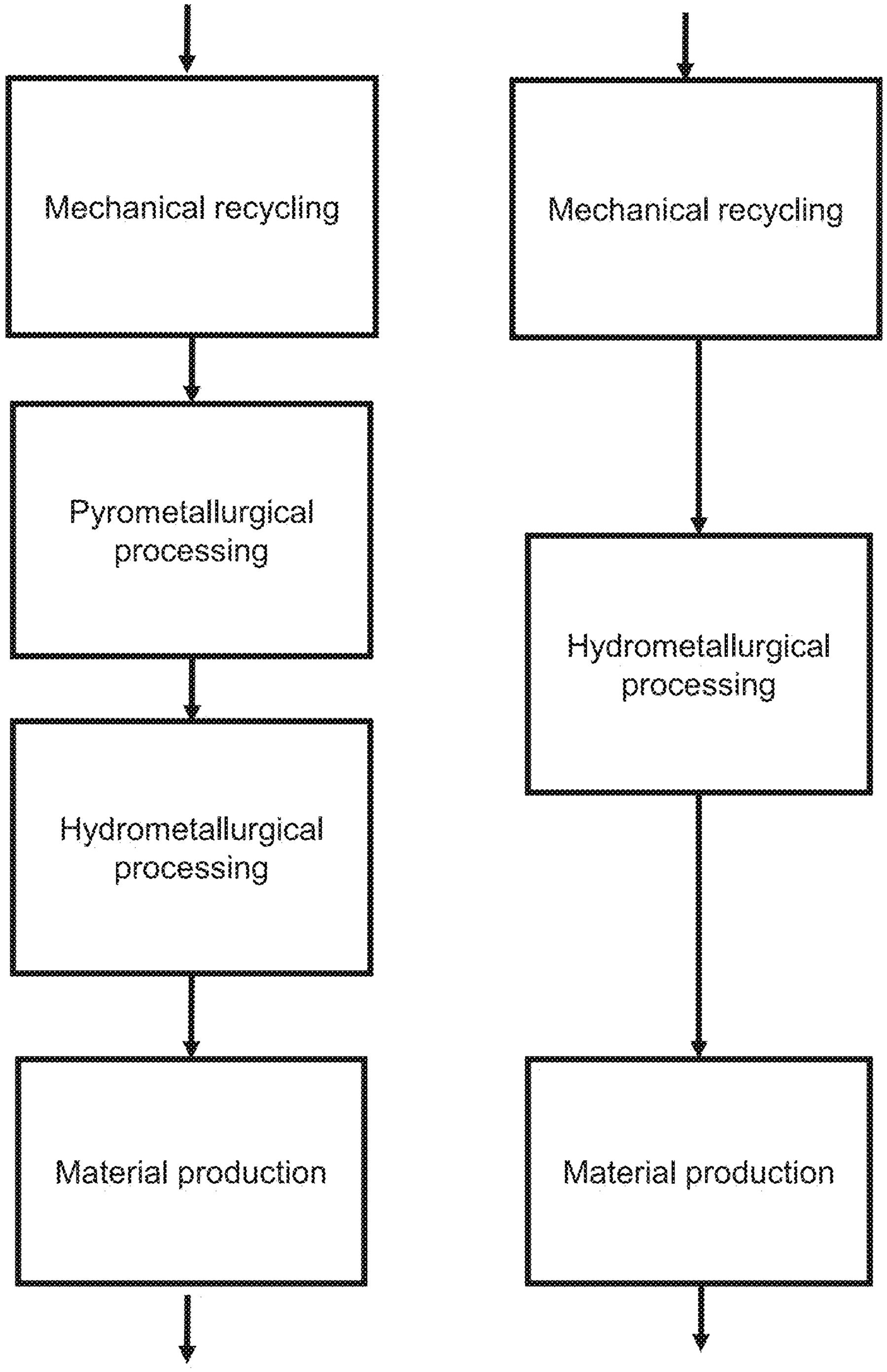
FIG. 15 illustrates an example of the recycling chain for end-of-life products.

Based on battery recycling data associated with battery identifiers and operation data associated with plant identifiers, the batteries or component(s) of the battery may be assigned to a plant identifier by providing plant assignment data as described in the context of FIGS. 6 to 8. The plant associated with the plant identifier may by a mechanical or chemical recycling plant. The plant assignment data may include more than one plant identifier, if the recycling chain includes more than one recycling plant. For instance, as shown in FIG. 15 for cathode elements, the recycling chain may include mechanical followed by pyrometallurgical followed by hydrometallurgical processing of battery materials to be provided as recycled battery martials to a production process. In another option the recycling chain may include mechanical followed by hydrometallurgical processing of battery materials to be provided as recycled battery martials to a production process. Recycling processes provide transition metals separately or already in the desired stoichiometries for making a new material. For instance, the plant assignor 1408 may be configured to provide plant assignment data and to provide such plant assignment data to chemical/mechanical plant recycling system 1410 of respective plants associated with the plant identifier(s). Based on the plant assignment data and location data transport and/or storing instructions may be generated by transport and/or storing system 1406 as described herein e.g. FIGS. 4, 5, 6, 7, 8. For instance, the plant assignor 1406 may be configured to provide plant assignment data and to provide such plant assignment data to production system 1416 of respective production plants associated with the plant identifier(s). The plant assignor, the transport and/or storing system 1406 and the chemical/mechanical plant recycling system may be part of a decentral computing environment. Each system may be associated with a computing node of the decentral computing system to access and/or provide data in the decentral computing network.

Based on the tracked recycling material packages and recyclate data, production data may be provided by recyclate quota generator 1418. Any computation may be executed via a computing environment. The computing environment may be based on a decentral computing architecture as described in the context of FIGS. 3*a* to *d*. The collector system 1402 may include collection mechanisms to collect batteries or components of batteries 1400 to be recycled. The sorting system 1402 may include mechanisms to sort batteries or components of batteries 1400 to be recycled. The plant recycling system 1410 may include a recycling plant for recycling batteries or components of batteries to be recycled. The output of the plant recycling system 1410 may be a recycled material suitable for use in a production plant. Recycling plants may include chemical, mechanical, thermal and/or magnetic recycling plants. The production system 1416 may include a production plant for producing batteries or components of batteries based at least in part on recycled material as provided by the recycling plant. The input material of the production plant may include virgin material and recycled material. The collector system 1404, the discharger system 1404, the transport and/or storing system 1406, the computing environment, the sorting system 1402, the production system 1416 and/or the plant recycling system 1410 may be communicatively coupled to each other. The communication may be a peer-to-peer communication provided by the decentral computing environment as described in the context of FIG. 3*d*. The ID package generator 1406, the plant assignor 1408, the recyclate content generator 1418 may be decentral service application or may be part of one or more computing nodes associated with the recycling systems and/or the plants.

The computing environment, the collector system or the sorting system 1402 may be configured to generate collection and/or sorting instructions based on the material identifier package as e.g. described in the context of FIGS. 4, 5. The computing environment, the collector system, the sorting system 1402, the production plant system 1416 or the recycling plant system may be configured to generate transport and/or storing instructions based on the material identifier package as e.g. described in the context of FIGS. 4, 5.

The collector system and/or the sorting system 1402 may be configured to provide battery identifiers to the computing environment. The battery identifiers may be provided via the identification element as described in FIGS. 1,2. For instance, the collector system and/or the sorting system 1402 may be configured to read the QR code of the battery or the component of the battery. The collector system and/or the sorting system 1402 may be configured to provide location data to the computing environment. Location data may be provided by a user terminal such as a sensor reading the identification element or by an identifier of the system registering with the service. For instance, a user accessing the service may provide the location data.

The computing environment with decentral computing nodes, collector system and/or the sorting system 1402 may be configured to access material data based on the provided battery identifier. The computing environment may include the ID generator configured to determine material identifier package including package of battery identifiers as described in the context of FIGS. 4, 5. The computing environment, collector system and/or the sorting system 1402 may be configured to provide material identifier package for operating the recycling process. The computing environment, collector system and/or the sorting system 1402 may be configured to provide collection instructions and/or sorting instructions.

For instance, the computing environment or a node of the computing environment may be configured to determine, based on the locations of the batteries associated with the material identifier package, collection point data signifying the collection location for the batteries or battery component to be recycled. The collection instructions may include the collection locations. Collection instructions may be provided to the collector system. The collection instructions may include the collection locations for each package identifier or package of battery identifiers included in the material identifier package. This way batteries or components of batteries may be collected in such a way that they are processable or to be processed together and further sorting is not needed. The collector system 1402 may be configured to collect batteries or components of batteries to be recycled, preferably by material configuration. This way the sorting of batteries or components of batteries to be recycled may be done directly on collection making a further sorting process redundant. The collector system 1402 may be configured to collect batteries or components of batteries to be recycled, to provide battery IDs for generating material identifier package according to classification instructions or to provide material identifier package e.g. to a sorting system, to classify battery IDs according to classification instructions, to store associated recycling data or to provide associated recycling data e.g. per material configuration to a sorting system.

Further for instance, the computing environment or nodes of the computing environment may be configured to generate sorting instructions based on the package identifiers or the collections of battery identifiers. The sorting instructions may include the battery identifiers per package. The sorting instructions may be provided to a sorting system 1402. The sorting system may be configured to provide the product identifier per battery or battery component to be recycled and to sort such batteries or battery components based on the provided sorting instructions. This way batteries or components of batteries may be sorted by reading the identification element in such a way that they are processable or to be processed together.

The computing environment, the collector system 1402, the sorting system 1402, the production plant system 1416 or the recycling plant system 1410 may be configured to generate transport and/or storing instructions based on the material identifier package. Based on location data of the batteries or the components to be recycled and based on the target location of the batteries or the components to be recycled transport instructions may be determined. The target location may relate to the recycling plant to process the material configuration. Based on the capacity of the recycling plant and/or based on the number of batteries or components per package identifier or per package of battery identifiers, storing instructions may be determined. If a plant capacity is higher than the number of batteries or components per package collected for the material configuration, storing instructions may be generated. Such storage instructions may include a storage location for storing batteries or their components until the number reaches the capacity of the plant.

As described above different variations exist to implement the methods, apparatus and systems described herein. Different systems may implement different method steps or service component. The described embodiments are only examples and should not be considered limiting.

FIG. 15 illustrates an example recycling chains for cathode active materials. The example shows a battery as an end product to be recycled. This is an arbitrary choice and shall not be considered limiting.

Batteries comprise different parts of material as described in FIG. 1. The recycling chain may comprise different steps and may have different designs. First the end-of-life battery may be discharged followed by dismantling. The batteries may be discharged and disassembled to separate components such as the cells. The components of the battery may be fed into subsequent recycling streams. For instance, mechanical processing may follow. This may include mechanical crushing (shredding) of battery cells and separation of materials. Electrolyte residues may be removed from active materials by drying or pyrolysis before the following process steps. Mechanical separation of “Black Mass” (e.g. Co, Ni, Mn, C), current-conducting foils and separator parts may be implemented by a combination of crushing, drying, sorting, and classification processes. The materials may be sorted by their physical properties such as particle size, form, density, and electric and magnetic properties. For instance, the foil and the active material including transition metals may be separated. Such recycled material may be called black mass.

The separated components may be fed into subsequent recycling streams. For instance, the cells of the battery may be recycled to recover transition metals comprised in the electrode elements. In particular, lithium-ion batteries comprise electrode active material comprising lithium. The recycling process may follow different process layouts depending on the material configuration used in the cells of the lithium-ion battery. The recycled material from mechanical recycling may be further processed by pyrometallurgy and/or hydrometallurgy. For instance depending on the composition of the recycled material pyrometallurgy, hydrometallurgy or a combination of both may be used. One process design may be based upon pyrometallurgical followed by hydrometallurgical processing of battery scrap materials. Another process design may be based on the direct hydrometallurgical processing of battery materials. Such processes will transition metals separately or already in the desired stoichiometries for making a new cathode active material.

Based on the virtual packaging of batteries by the material composition via the batter identifiers the material composition of the recycled material may be tracked. Furthermore, the composition of the recycled material may be determined by classifying the battery identifiers based on the associated material composition. This way the composition of the recycled material may be tailored to subsequent recycling process steps. Furthermore, such tracking of the recycled material may be performed up to the recyclate and the tracking may be used for tracking e.g. the availability of recyclate or recyclate compositions. The decentral computing environment giving access to specific material data via the identifiers allows for reliable and efficient operation across the recycling process from end-of-life product to recyclate that may be re-used in the production of new material.

Figure 16:
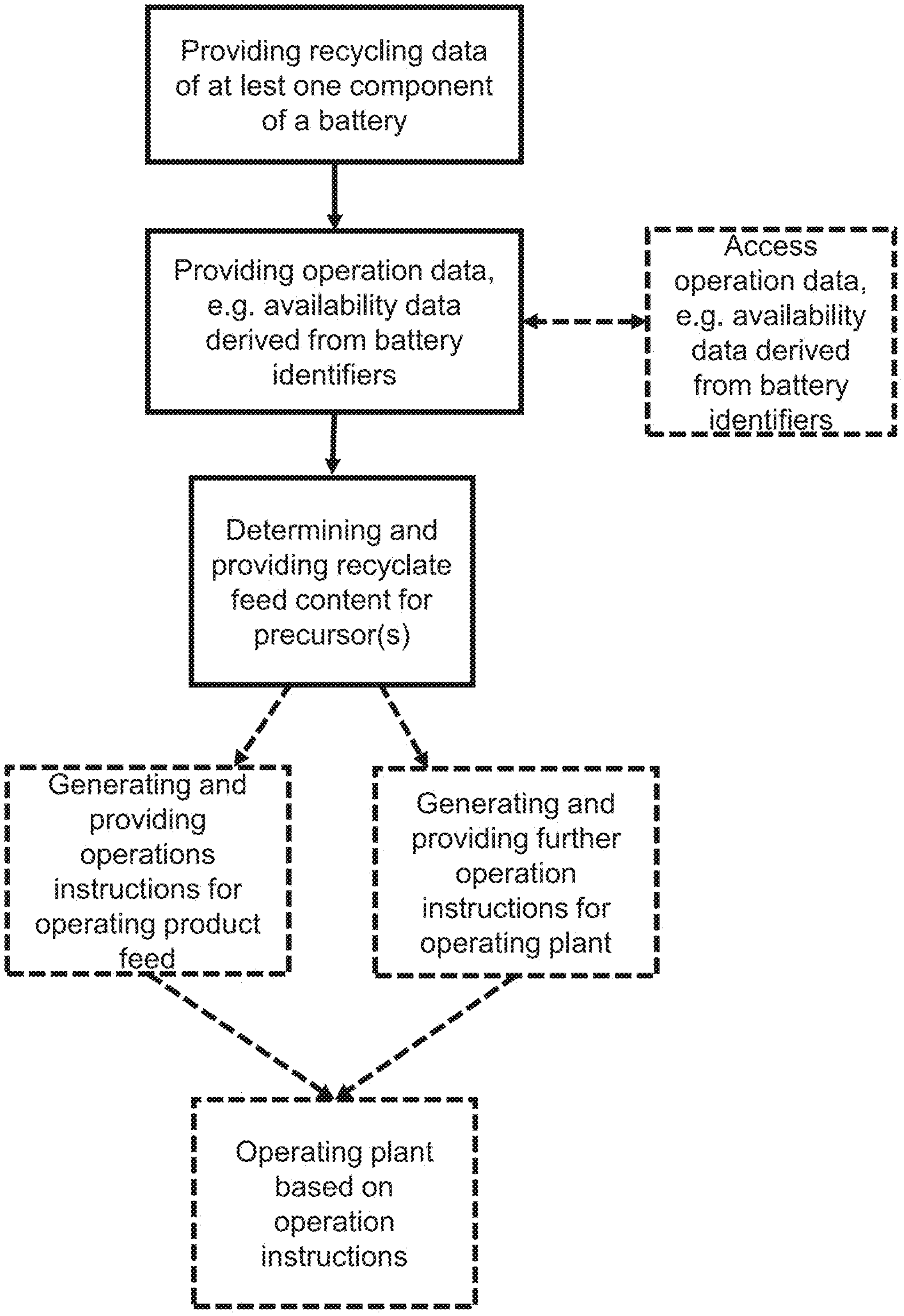
FIG. 16 illustrates an example flowchart of a method for providing a recyclate feed content for producing at least one component of the end-of-life product.

FIG. 16 illustrates an example flowchart of a method for providing a recyclate feed content for producing at least one component of the product.

Recycling data associated with the use of recycled precursor material in the production of the at least one component of the product may be provided. The recycling data may indicate recyclate feed content for the at least one component of the product. The recyclate feed content may specify the total recyclate feed content for the component or the recyclate feed content per precursor. The recycling data may include a recyclate amount or quota for one or more precursor product(s).

Figure 20:
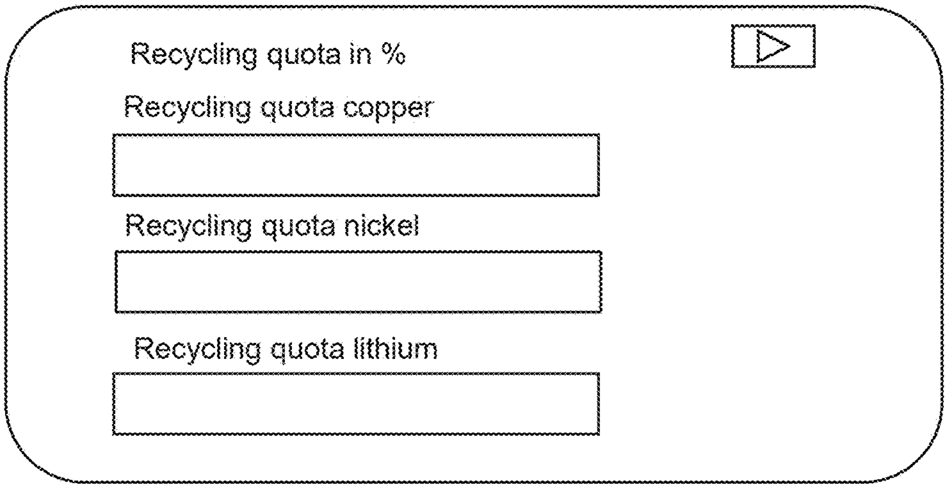
FIGS. 20, 21, 22 depict embodiments of a user interfaces for entering recycling quotas, chemical performance parameters or emission targets.

For the example of the battery, for the electrode active material of lithium-ion batteries certain recycling amount or quota may be provided for certain precursors, such as metals like cobalt, lithium, copper or nickel. Additionally or alternatively, a total recyclate feed content for the at least one component of the product may be provided. For the example of the battery, for lithium-ion batteries a total amount or rate for recyclates independent of the precursor(s) may be provided. Such total amount or rate may relate to individual components, to a combination of components or to all components. For the example of the battery, for lithium-ion batteries the total amount or rate may relate to the electrode element including the electrode active material, to the anode element including the anode active material, to the cell with its components or to the battery with its components. The recycling data may for example specify 20% of copper to be recycled copper, 10% of lithium to be recycled lithium, and 12% of nickel to be recycled nickel. The recycling data may for example specify 15% or 20% of transition metals to be recycled transition metals. The recycling data may for example specify 30% of materials used for producing the component to be recycled material. FIG. 20 depicts one embodiment of a user interface for entering recycling quotas. In other embodiments such data may be provided through an application programming interface or any other service providing such data.

Operation data associated with at least one operation property of at least one production plant may be accessed and provided. Such operation data may relate to the availability of one or more recycled precursor(s) for producing the at least one component of the product. For instance, the availability may be derived from storage levels for different recycled precursors, from recyclate package identifiers associated with amounts of recycled precursors available from recycling processes, or from recycled material identifiers including identifiers associated with amounts to be recycled and available from recycling processes. Such availability data may further be associated with plants. For instance, certain material may be available for production plants in the vicinity of the plant, such as in an area of multiple 100 kilometers or less. Other examples of operation data may include capacity data indicating the current capacity of the production plants, process data indicating process specifics of the production plants, performance data indicating performance specifics of the production plants or emission data associated with the production plants.

Based on the recycling data and the operation data, a recyclate feed content of one or more recycled precursor(s) may be determined. The recyclate feed content for one or more precursor(s) may be determined depending on the recyclate amount of one or more precursor product(s), the recyclate quota for one or more precursor product(s) and/or the total recyclate feed content for the at least one component of the product to be produced. For instance, if recyclate amount or quota are provided, the minimum recyclate feed content may correspond to the recyclate amount or quota.

Further operation data may be considered for determining the recyclate feed content for one or more recycled precursor(s). The operation data may include availability data derived from identifiers. Said availability data may signify the amount of recycled material available from the recycling process. Such amount may be derived from identifiers and the material tracking as disclosed herein such as FIGS. 1 to 15. Advantageously the recyclate package identifiers associated with amounts of recycled precursors available from recycling processes, or the recycled material identifiers including product or component identifiers associated with amounts to be recycled and available from recycling processes can be easily accessed in a decentral computing environment, enabling the connection between recyclate feed content for production and the recycled material from recycling processes. This way a reliable and environmentally friendly management of material resources in combination with physical recycling and production can be achieved, which is particularly advantageous in the distributed system of material flows, recycling plants and production plants.

If for instance the availability data of the precursors is provided, the recyclate feed content for those precursors with high availability may be increased compared to the recyclate amount or quota. This way the recyclate feed content and the production may be tailored to adapt the recyclate feed content. Further for instance, if the total amount or quota is provided, the recyclate feed content may be distributed across different precursors. If the availability data of the precursors is provided, the recyclate feed content for those precursors with high availability may be increased compared to the recyclate feed content for precursors with lower availability. This way the recyclate feed content and the production may be tailored to adapt the recyclate feed content.

As an example in the battery example, determining the recyclate feed content may concern the process for making electrode active materials for lithium-ion batteries. In such process first a precursor may be formed by co-precipitating transition metals as carbonates, oxides or preferably as hydroxides that may or may not be basic. The process for making particulate (oxy) hydroxide of transition metal is for instance described in WO2021244963A1, which is herewith incorporated by reference. Said particulate (oxy) hydroxide may serve as a precursor for electrode active materials, and it may therefore also be referred to as precursor. Formation of transition metal-based precursors may include recycled transition metals as provided according to the determined recyclate feed content for transition metal precursors. The transition metal-based precursor may then be mixed with a precursor source of lithium such as, but not limited to LiOH, Li2O or Li2CO3 and calcined (fired) at high temperatures. The process for making an electrode is for instance described in WO2020/069882A1, which is herewith incorporated by reference Lithium salt(s) can be employed as hydrate(s) or in dehydrated form. The calcination-or firing-generally also referred to as thermal treatment or heat treatment of the precursor-may be carried out at temperatures in the range of from 600 to 1000° C. During the thermal treatment a solid-state reaction takes place, and the electrode active material is formed. Lithium containing precursors may include recycled lithium or precursors formed from recycled lithium. Recycled lithium or precursors formed from recycled lithium may be provided according to the recyclate feed content for such precursors.

The determined recyclate feed content of one or more recycled precursor(s) for production of at least one component of the product may be provided to generate instructions for operating the production plant. For instance, based on the composition of the component and the recyclate feed content per precursor, instructions for monitoring and/or controlling the product feed may be generated and provided to the operation system of the production plant. Apart from the feed further operation instructions for monitoring and/or controlling operation of the production plant may be generated and provided. Such further instructions may include different operation parameters depending on the feed compositions or the recyclate feed content. The operating plant may be operated based on the provided instructions for monitoring and/or controlling operation of the production plant.

Figure 17:
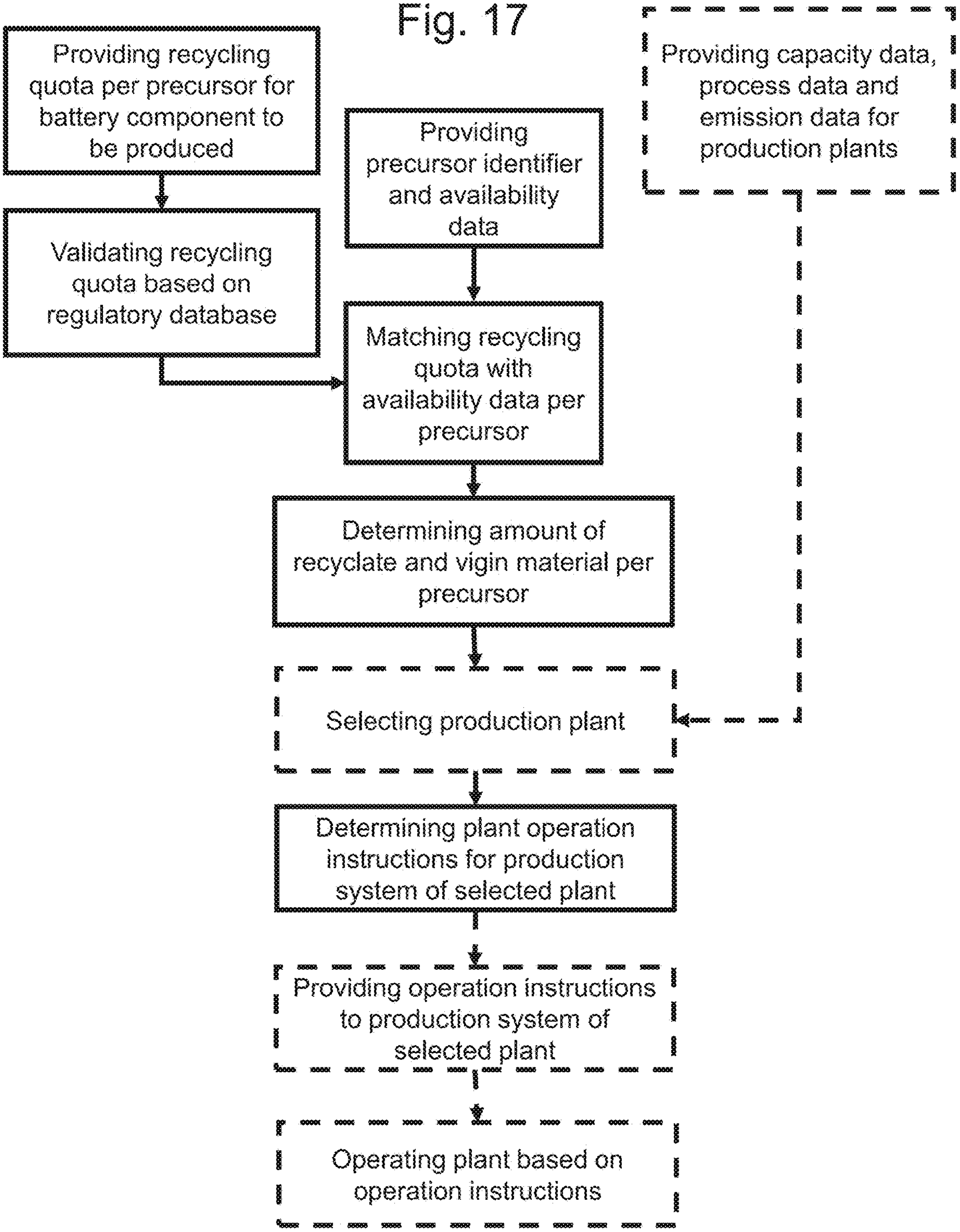
FIG. 17 illustrates another example of the method for providing a recyclate feed content for producing at least one component of the product based on availability data and optionally including the selection of a production plant.

FIG. 17 illustrates another example of the method for providing a recyclate feed content for producing at least one component of the product based on availability data and optionally including the selection of a production plant.

Recyclate feed content may be determined e.g. according to the example embodiment of FIG. 16. Recycling quota per precursor for the product or component to be produced may be provided e.g. via a user interface as depicted in FIG. 20. This may for the example of the battery include recycling quota for metal constituents contained in the electrode active material. Such recycling quota may be validated by accessing a regulatory database. It may be checked if the recycling quota is regulated. If the recycling quota is regulated, it may be checked if the provided recycling quota conforms the regulated recycling quota. If the recycling quota does not conform regulatory requirements, it may be adapted accordingly. For instance, the recycling quota as regulated may be used.

In this example precursor identifier and availability data may be provided to determine the recyclate feed content. The precursor identifier may be associated with at least one precursor and the amount of recycled precursor available. The precursor identifier may be associated with an amount of recycled precursor available. The precursor identifier may relate to recycling material identifier or it may be derived from product or component identifiers and the tracking in the recycling process as described herein e.g. in the context of FIGS. 1 to 15. Determination of the recyclate feed content may be made by matching the provided recycling quota per precursor with availability data per precursor. Such matching may be performed per precursor as described in the context of FIG. 16 and may consider the adapted recycling quota per precursor based on regulatory check as described above.

Figure 22:
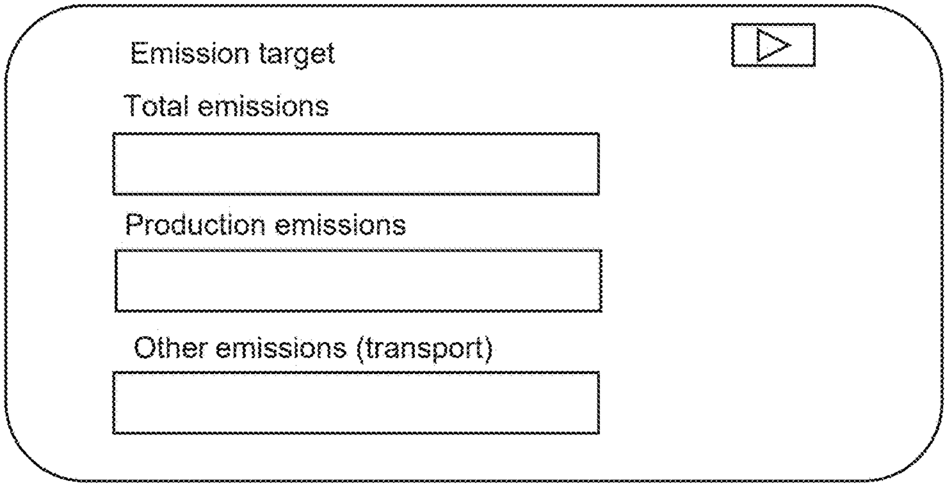

In addition, capacity data related to the production capacity for one or more production plants, process data relating to process specifics of one or more production plants, performance data relating to performance characteristics of one or more production plants and/or emission data relating to emission(s) for producing the at least one component of the product may be provided. Emission data may include emissions from precursor materials and the at least one production plant for producing the component or product. The emission data may include at least one emission target for use of precursor(s) in the production of the at least one component or product. The emission data may include a total emission target for producing the at least one component or product. Emission targets may be provided via a user interface as for instance depicted in FIG. 22. Here total emissions, production emissions and other emissions such as transport emissions may be provided by a user. In other embodiments such data may be provided through an application programming interface or any other service providing such data.

Based on the capacity data and/or the emission data, a plant for processing the recyclate and for producing the at least one component using the recyclate feed content may be selected. Selecting the production plant for producing the component may depend on the determined recyclate feed content in combination with process data and/or capacity data to determine, if the plant is suitable for processing the recyclate. Selecting the production plant for producing the component may also depend on emission data and/or performance data. The production plant meeting at least one emission target for use of precursor(s) and/or the total emission target for producing the at least one component may be selected. The selection of the production plant may be based on a multi-dimensional metric defining a distance and/or a threshold measure. The distance and/or threshold measure may be determined from the determined recyclate feed content in relation to process data and/or capacity data, the recyclate feed content in relation to the at least one emission target for use of precursor(s) and/or the total emission target for producing the at least one component.

Further based on the process data, the composition of the recyclate, e.g. as tracked via the identifiers across the recycling chain, may be used to match the process specifics of the plant with the process specifics required for the recyclate composition. For the example of the battery, in case of electrode active material the recyclate may be available in the desired stoichiometry required for producing the electrode active material or transition metal recyclate may be available separately. In such case the recyclate with the desired stoichiometry may be selected in combination with a suitable plant to produce the electrode active material from such recyclate. For the example of the battery the plant may be an electrode active material production plant or cathode active material (CAM) plant for processing transition metal carbonates, oxides or hydroxides as precursors. If only transition metal recyclate is available, another suitable plant to produce the electrode active material or cathode active material from such recyclate may be selected. For the example of the battery, the plant may be a precursor electrode active material production plant or a precursor cathode active material (PCAM) plant for processing transition metals as precursors.

Operation instructions for controlling and/or monitoring the production system such as a precursor feed of at least one virgin precursor and/or at least one recycled precursor may be generated and provided. Further operation instructions for controlling and/or monitoring the operation of the selected plant may be determined e.g. based on the determined recyclate feed content, emission target(s), performance data and the selected production plant. The operation instructions for controlling and/or monitoring the operation of the selected plant may be provided to a production system. The production plant may be operated based on such operation instructions.

Figure 18:
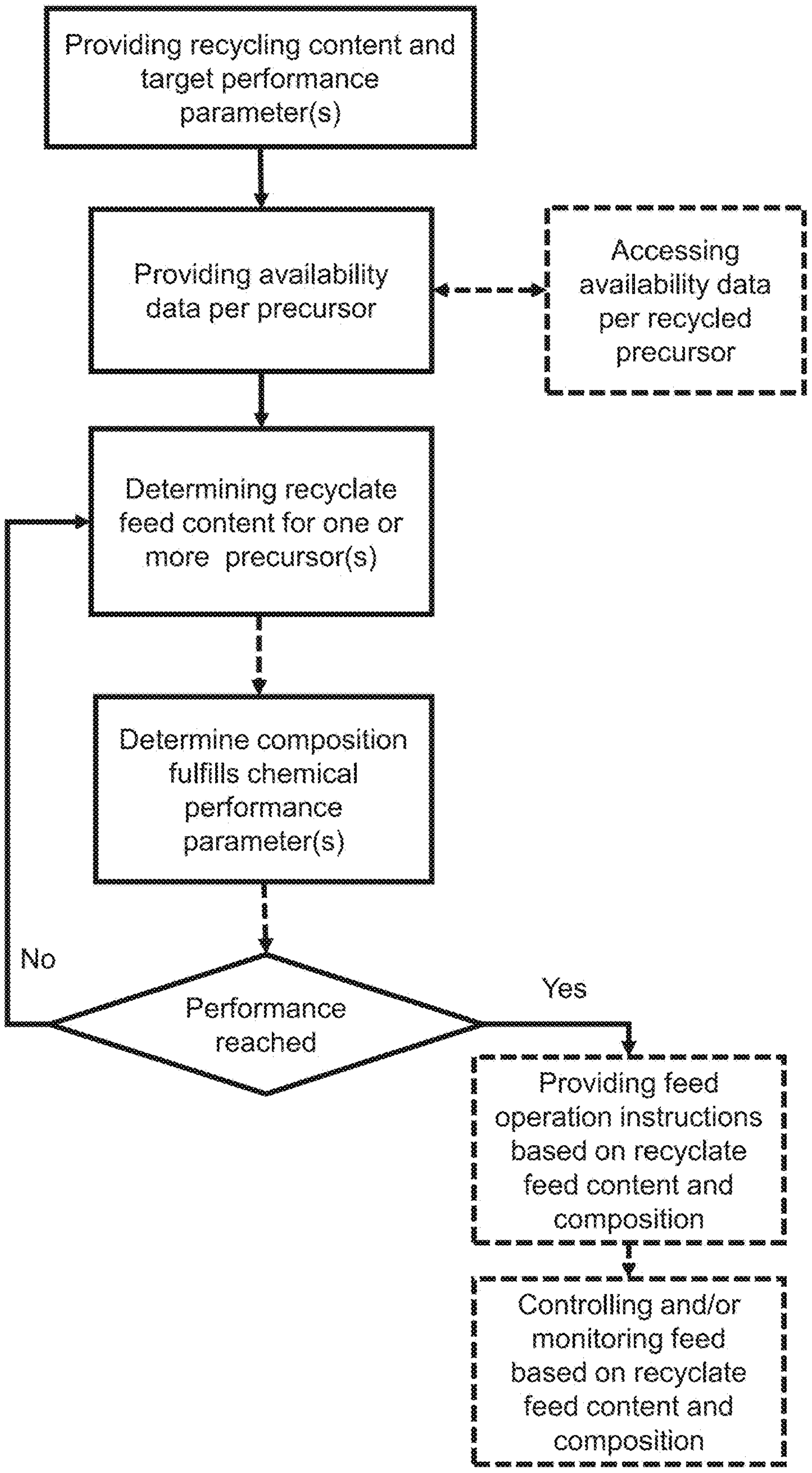
FIG. 18 illustrates another example of the method for providing a recyclate feed content for producing at least one component of the product including chemical performance check.
Figure 21:
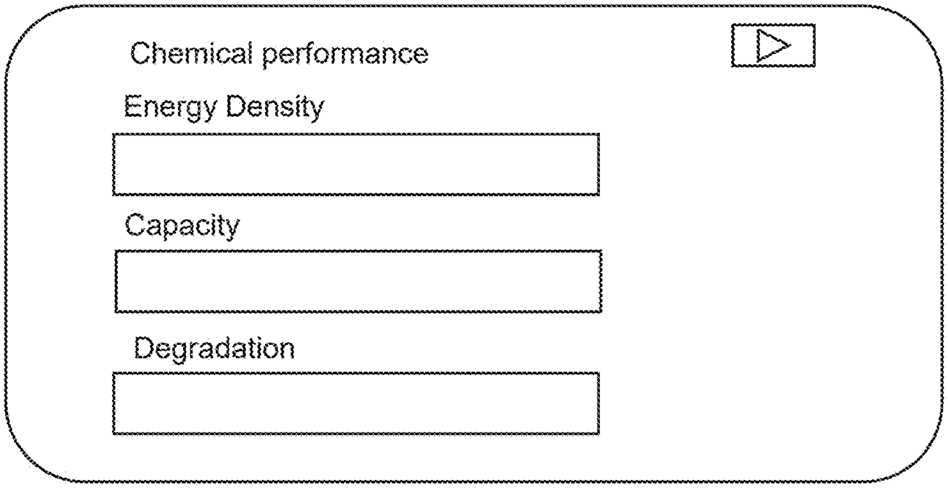

FIG. 18 illustrates another example of the method for providing a recyclate feed content for producing at least one component of the product including chemical performance check. A corresponding user interface is shown for illustrative purposes in FIG. 21, where the chemical performance and associated parameters may be displayed.

Recyclate feed content may be determined e.g. as described in the context of FIGS. 16 and 17. For such determination recycling content for the component or per precursor may be provided. In addition, target performance parameter(s) for the component may be provided. The recycling data may include recycling content and target performance parameter(s) associated with the expected performance of the produced component. The target performance parameter(s) may relate to the at least one component or the at least one component in relation to other components. For the example of the battery, the performance of an electrode active or anode active material may be provided. In case of a lithium-ion batteries such performance parameters may relate to energy density, charge density, degradation behavior, capacity or the like. Target performance parameter(s) may be provided via a user interface as for instance depicted in FIG. 22. For the example of the battery, charge density, capacity and degradation may be provided by a user. In other embodiments such data may be provided through an application programming interface or any other service providing such data.

In addition, availability data per recycled precursor may be accessed and provided. Recyclate feed content may be determined e.g. as described in the context of FIGS. 16 and 17. Determining the recyclate feed content may include the determination of the chemical performance associated with the component to be produced by using the recyclate feed content. From the determined recyclate feed content of the one or more precursor(s) the chemical composition of the at least one component may be determined considering virgin and recyclate feed content. For such composition the chemical performance of the at least one component to be produced may be determined. For the example of the batter, the energy density or capacity resulting from the chemical composition of the electrode or anode active material may be determined based on a first principles model, a data driven model or a combination of both.

Hence, based on the determined recyclate feed content the chemical performance parameter(s) associated with the component to be produced depending on the determined recyclate feed content may be determined. Such determined chemical performance parameter(s) may be compared to the provided target performance parameter(s) to determine, if the component produced with the feed composition fulfills the required chemical performance.

If the chemical performance is fulfilled for the determined recyclate feed content, operation instructions for controlling and/or monitoring the production system such as a precursor feed of at least one virgin precursor and/or at least one recycled precursor may be generated and provided. Further operation instructions for controlling and/or monitoring the operation of the selected plant may be determined e.g. based on the determined recyclate feed content, emission target(s), performance data and the selected production plant. The operation instructions for controlling and/or monitoring the operation of the selected plant may be provided to a production system. The production plant may be operated based on such operation instructions.

Figure 19:
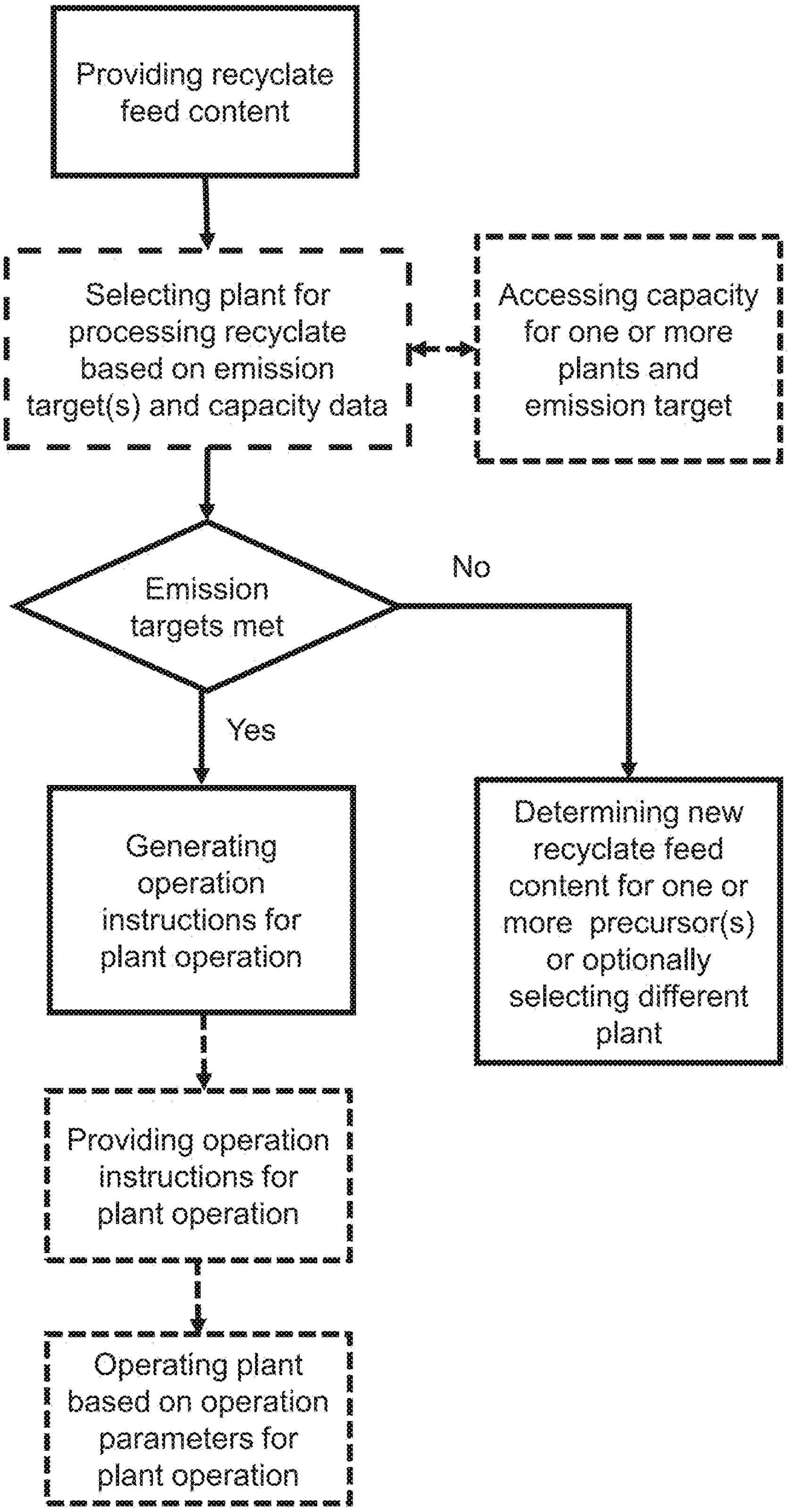
FIG. 19 illustrates another example of the method for providing a recyclate feed content for producing at least one component of the product including emission target check and optionally plant selection.

FIG. 19 illustrates another example of the method for providing a recyclate feed content for producing at least one component of the product including emission target check and optionally plant selection.

Recyclate feed content may be determined and provided as e.g. described in the context of FIGS. 16, 17 and 18. Optionally a plant for processing recyclate may be selected based on emission target(s) and capacity data as e.g. described in the context of FIGS. 16 and 17. From such selection the emissions related to the precursor material and the selected production plant may be determined to check emission targets are met.

If emission targets are not met, the recyclate feed content may be re-determined based on the total emission target or the recyclate feed content may be determined based on the at least one emission target for use of precursor(s). Optionally a different plant may be selected.

If emission targets are met, operation instructions for controlling a precursor feed of at least one virgin precursor and/or at least one recycled precursor based on the determined recyclate feed content and/or the selected production plant may be generated. The operation instructions for controlling and/or monitoring e.g. a precursor feed of at least one virgin precursor and/or at least one recycled precursor may be provided. Further operation instructions for controlling and/or monitoring operation of the selected plant may be determined based on the determined recyclate feed content and the selected production plant. The operation instructions for controlling and/or monitoring operation of the selected plant may be provided e.g. to the production system. The production plant may be controlled and/or monitored according to the operation instructions.

The present disclosure has been described in conjunction with embodiments as examples. However, other variations can be understood and effected by those persons skilled in the art and practicing the claimed invention, from the studies of the drawings, this disclosure and the claims. Notably, in particular, the any steps presented can be performed in any order, i.e. the present invention is not limited to a specific order of these steps. Moreover, it is also not required that the different steps are performed at a certain place or at one node of a distributed system, i.e. each of the steps may be performed at a different nodes using different equipment/data processing units.

As used herein “determining” also includes “initiating or causing to determine”, “generating”, “querying”, “accessing”, “correlating”, “matching”, “selecting” also includes “initiating or causing to generate, access, query, correlating, select and/or match” and “providing” also includes “initiating or causing to determine, generate, access, query, correlating, select and/or match, send and/or receive”. “Initiating or causing to perform an action” includes any processing signal that triggers a computing node to perform the respective action.

In the claims as well as in the description the word “comprising” or “including” does not exclude other elements or steps and the indefinite article “a” or “an” does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. A computer-implemented method for operating a recycling process for processing recycled material, the method comprising the steps of:

providing one or more recycled material identifier(s) and corresponding recycled material data associated with the recycled material;

determining at least one plant identifier associated with a plant for processing the recycled material as provided by recycled material data, including processing the recycled material data by at least one of (i) classification according to classification instructions providing material processing data associated with one or more material configuration(s) processable or to be processed by one or more plants, and (ii) matching the at least one recycled material identifier and the at least one plant identifier based on operation data, wherein the operation data is provided by computer-executable instructions executing in an at least partially decentral computing environment, the computer-executable instructions being configured to access the operation data of the plant based on the plant identifier, wherein the operation data includes static data relating to general specifications of the plant or dynamic data relating to current specifications of the plant;

providing plant assignment data comprising the at least one plant identifier and related recycled material identifier(s); and operating the recycling process by:

providing the plant assignment data to a plant operation system; and based on the plant assignment data and associated recycled material data, generating and providing one or more plant operation instructions that, when executed by the plant operation system, cause the plant operation system to monitor and/or control plant operations by monitoring and/or controlling a feed of recycled material to the plant, including providing a composition of the feed based on the plant assignment data and the associated recycled material data.

2. The method according to claim 1, wherein the recycled material comprises material provided by recycling products or at least components of products.

3. The method according to claim 1, wherein the recycled material identifier relates to one or more material identifier package(s) relating product identifiers according to at least one material configuration that is processable or to be processed by at least one recycling plant.

4. The method according to claim 1, wherein the recycled material identifier relates to one or more product identifier(s) and corresponding material configuration data of the products recycled to provide the recycled material.

5. The method according to claim 1, wherein the recycled material identifier relates to a material identifier package and corresponding material composition data associated with the recycled material.

6. The method according to claim 1, further comprising the step of providing the operation data associated with at least one operation property of the plant, wherein determining the at least one plant identifier includes selecting the plant identifier associated with the plant suitable for processing the recycled material associated with the recycled material data and/or the recycled material identifiers based on the operation data.

7. The method according to claim 1, wherein determining the at least one plant identifier includes classification by the classification instructions providing the material processing data associated with the one or more material configuration(s) processable or to be processed by at least one plant, the classification instructions being stored in the at least partially decentral computing environment and executable by the computer-executable instructions.

8. The method according to claim 1, wherein determining the at least one plant identifier includes matching the at least one recycled material identifier and the at least one plant identifier based on a quantity related to an amount of the recycled material and plant capacity data related to a capacity of the at least one plant, the plant capacity data being part of the operation data.

9. The method according to claim 1, wherein determining the at least one plant identifier includes matching of the at least one recycled material identifier and the at least one plant identifier based on process data associated with one or more recycling process(es) and/or material processing data associated with at least one material configuration processable or to be processed by the at least one plant, the process data and/or the material processing data being part of the operation data.

10. The method according to claim 1, wherein the recycled material data associated with the recycled material is provided by a decentral computing node associated with one or more recycling system(s), wherein the operation data is provided by a decentral computing node associated with one or more plant(s) and/or one or more recycling system(s), the decentral computing nodes forming at least part of the at least partially decentral computing environment.

11. The method according to claim 1, further comprising the step of providing transport and/or storing instructions based on the plant assignment data.

12. The method according to claim 1, further comprising using recycled material that is associated with the at least one recycled material identifier generated in the method of claim 1.

13. The method according to claim 1, wherein the recycled material is provided by recycling at least one component of a battery, the method further comprising generating transporting, storing and/or recycling instructions based on the plant assignment data generated in the method of claim 1 and providing the transporting, storing and/or recycling instructions.

14. The method according to claim 1, further comprising providing material location data associated with recycled material based on the recycled material identifier and plant location data based on the plant identifier, and determining transport instructions based on collection point data and the plant location data, wherein one or more transport route(s) are determined from the collection point data and the plant location data.

15. The method according to claim 1, further comprising determining storing instructions based on the operation data, including capacity data and a quantity relating to the amount of recycled material from products or components with one or more material configuration(s) processable or to be processed by at least one plant.

16. An apparatus for operating a recycling process for processing recycled material, the apparatus comprising:

one or more computing nodes; and one or more computer-readable media having thereon computer-executable instructions that are structured such that, when executed by the one or more computing nodes, cause the apparatus to perform the following steps:

providing one or more recycled material identifier(s) and corresponding recycled material data associated with the recycled material;

determining at least one plant identifier associated with a plant for processing the recycled material as provided by recycled material data, including processing the recycled material data by at least one of (i) classification according to classification instructions providing material processing data associated with one or more material configuration(s) processable or to be processed by one or more plants, and (ii) matching the at least one recycled material identifier and the at least one plant identifier based on operation data, wherein the operation data is provided by computer-executable instructions executing in an at least partially decentral computing environment, the computer-executable instructions being configured to access the operation data of the plant based on the plant identifier, wherein the operation data includes static data relating to general specifications of the plant or dynamic data relating to current specifications of the plant;

providing plant assignment data comprising the at least one plant identifier and related recycled material identifier(s); and operating the recycling process by:

providing the plant assignment data to a plant operation system; and based on the plant assignment data and associated recycled material data, generating and providing one or more plant operation instructions that, when executed by the plant operation system, cause the plant operation system to monitor and/or control plant operations by monitoring and/or controlling a feed of recycled material to the plant, including providing a composition of the feed based on the plant assignment data and the associated recycled material data.

17. A non-transitory computer-readable medium having stored thereon instructions which, when executed by one or more processors of a computing environment, cause the computing environment to perform operations for operating a recycling process for processing recycled material, the operations comprising:

(a) providing one or more recycled material identifier(s) and corresponding recycled material data associated with the recycled material;

(b) determining at least one plant identifier associated with a plant for processing the recycled material as provided by the recycled material data, including processing the recycled material data by at least one of:

(i) classification according to classification instructions providing material processing data associated with one or more material configuration(s) processable or to be processed by one or more plants; and (ii) matching the at least one recycled material identifier and the at least one plant identifier based on operation data, wherein the operation data is provided by computer-executable instructions executing in an at least partially decentral computing environment, the computer-executable instructions being configured to access the operation data of the plant based on the plant identifier, and wherein the operation data includes static data relating to general specifications of the plant or dynamic data relating to current specifications of the plant;

(c) providing plant assignment data comprising the at least one plant identifier and related recycled material identifier(s); and (d) operating the recycling process by providing, to a plant operation system, the plant assignment data and, based on the plant assignment data and associated recycled material data, generating and providing one or more plant operation instructions that, when executed by the plant operation system, cause the plant operation system to monitor and/or control plant operations by monitoring and/or controlling a feed of recycled material to the plant, including providing a composition of the feed based on the plant assignment data and the associated recycled material data.

* * * * *